(12) United States Patent
Ryu et al.

(10) Patent No.: US 11,424,871 B2
(45) Date of Patent: Aug. 23, 2022

(54) RESOURCE ALLOCATION METHOD AND APPARATUS IN WIRELESS COMMUNICATION SYSTEM

(71) Applicant: Samsung Electronics Co., Ltd., Suwon-si (KR)

(72) Inventors: Hyunseok Ryu, Suwon-si (KR); Anil Agiwal, Suwon-si (KR); Taehan Bae, Suwon-si (KR); Jeongho Yeo, Suwon-si (KR); Jinyoung Oh, Suwon-si (KR); Sungjin Park, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 16/862,068

(22) Filed: Apr. 29, 2020

(65) Prior Publication Data

US 2020/0351033 A1    Nov. 5, 2020

(30) Foreign Application Priority Data

May 2, 2019 (KR) .................. 10-2019-0051829
Jul. 4, 2019 (KR) .................. 10-2019-0080886
Nov. 7, 2019 (KR) .................. 10-2019-0142012

(51) Int. Cl.
*H04L 1/18* (2006.01)
*H04W 72/04* (2009.01)

(52) U.S. Cl.
CPC ....... *H04L 1/1861* (2013.01); *H04W 72/0453* (2013.01)

(58) Field of Classification Search
CPC ............. H04L 1/1861; H04L 1/1864; H04L 2001/0093; H04W 72/0453; H04W 72/02
See application file for complete search history.

(56) References Cited

U.S. PATENT DOCUMENTS

| 2018/0279275 A1 | 9/2018 | Chen et al. |
| 2020/0053713 A1 | 2/2020 | Bang et al. |
| 2021/0112375 A1* | 4/2021 | Lee .................. H04W 4/40 |

FOREIGN PATENT DOCUMENTS

KR    10-2020-0017327 A    2/2020

OTHER PUBLICATIONS

"ITL, Physical layer procedure for NR V2X, R1-1905101, 3GPP TSG RAN WG1 #96bis, Apr. 8-12, 2019, Xi'an, China" (Year: 2019).*
"LG Electronics, Discussion on physical layer procedures for NR sidelink, R1-1905443, 3GPP TSG RAN WG1 Meeting #96bis, Apr. 8-12, 2019, Xi'an, China" (Year: 2019).*

(Continued)

*Primary Examiner* — Charles C Jiang
*Assistant Examiner* — Thad N Defauw
(74) *Attorney, Agent, or Firm* — Jefferson IP Law, LLP

(57) ABSTRACT

An operating method of a terminal in a wireless communication system is provided. The method includes acquiring resource pool information for sidelink communication, receiving, from another terminal, a physical sidelink shared channel (PSSCH), and reporting, to the another terminal, a hybrid automatic request (HARQ) feedback information corresponding to the receiving of the PSSCH, based on physical sidelink feedback channel (PSFCH) configuration information included in the resource pool information.

16 Claims, 31 Drawing Sheets

IN-COVERAGE SCENARIO

(56) References Cited

OTHER PUBLICATIONS

"Lenovo, Motorola Mobility, Discussion on physical layer procedures for NR sidelink, R1-1904579, 3GPP TSG RAN WG1 Meeting #96bis, Apr. 8-12, 2019, Xi'an, China" (Year: 2019).*
ITL, Physical layer procedure for NR V2X, R1-1905101, 3GPP TSG RAN WG1 #96bis, Mar. 30, 2019, section 3; and figure 1, Xi'an, China.
LG Electronics, Discussion on physical layer procedures for NR sidelink, R1-1905443, 3GPP TSG RAN WG1 Meeting #96bis, Apr. 3, 2019, sections 2-2.1.4, Xi'an, China.
Lenovo et al., Discussion on physical layer procedures for NR sidelink, R1-1904579, 3GPP TSG RAN WG1 #96bis, Apr. 3, 2019, sections 2-2.2, Xi'an, China.
Intel Corporation, Design of physical layer procedures for NR V2X sidelink communication, R1-1904299, 3GPP TSG RAN WG1 RAN1#96bis, Apr. 3, 2019, sections 2-2 .4; and figures 1-3, Xi'an, China.
International Search Report dated Aug. 3, 2020, issued in International Application No. PCT/KR2020/005767.
Zte et al., "NR sidelink physical layer structure", R1-1904814, 3GPP TSG RAN WG1 #96bis Xi'an, China, Apr. 8-12, 2019.
NTT Docomo, Inc., "NR Sidelink Physical Layer Procedure", R1-1905425, 3GPP TSG RAN WG1 #96bis Xi'an, China, Apr. 8-12, 2019.
Asustek, "Discussion on sidelink structure in NR V2X", R1-1905088, 3GPP TSG RAN WG1 #96bis Xi'an, China, Apr. 8-12, 2019.
Extended European Search Report dated Apr. 5, 2022, issued in European Patent Application No. 20798719.9.

* cited by examiner

IN-COVERAGE SCENARIO

PARTIAL COVERAGE SCENARIO

Out-of-coverage SCENARIO

INTER-CELL V2X COMMUNICATION SCENARIO

UNICAST V2X COMMUNICATION

GROUPCAST V2X COMMUNICATION

FIG. 13E

RESOURCE ALLOCATION METHOD AND APPARATUS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0051829, filed on May 2, 2019, in the Korean Intellectual Property Office, of a Korean patent application number 10-2019-0080886, filed on Jul. 4, 2019, in the Korean Intellectual Property Office, and of a Korean patent application number 10-2019-0142012, filed on Nov. 7, 2019, in the Korean Intellectual Property Office, the disclosure of each of which is incorporated by reference herein in its entirety.

BACKGROUND

1. Field

The disclosure relates to a resource allocation method and an apparatus in a wireless communication system. More particularly, the disclosure relates to a resource allocation method and an apparatus for a user equipment (UE) to transmit and receive a sidelink feedback channel in a wireless communication environment where a sidelink feedback channel between UEs is present.

2. Description of Related Art

To meet the increase in demand for wireless data traffic after the commercialization of 4th generation (4G) communication systems, considerable efforts have been made to develop improved 5th generation (5G) communication systems or pre-5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high-frequency band (millimeter wave (mmWave)), e.g., a band of 60 GHz. In order to reduce the path loss of radio waves in such a super-high-frequency band and to increase a transmission distance of radio waves in 5G communication systems, various technologies have been discussed and are being studied, for example, beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. In addition, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, and the like. In recent years, technologies including a sensor network for connecting objects, machine to machine (M2M) communication, machine type communication (MTC), and the like, have been studied. In the IoT environment, intelligent Information technology (IT) services may be provided to collect and analyze data obtained from connected objects to create new value in human life. As existing IT techniques and various industries converge and combine with each other, the IoT may be applied to various fields, such as smart homes, smart buildings, smart cities, smart cars or connected cars, smart grids, health care, smart home appliances, high-quality medical services, and the like.

Various attempts are being made to apply 5G communication systems to the IoT network. For example, technologies related to sensor networks, M2M communication, MTC, and the like, are being implemented by using 5G communication technology including beam-forming, MIMO, array antennas, and the like. The application of Cloud-RAN as a big data processing technology described above may be an example of convergence of 5G communication technology and IoT technology.

As described above, various services are able to be provided due to the development of wireless communication systems, and thus, there is need for methods of effectively providing such services. For example, a method for resource allocation in a wireless communication system is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a resource allocation method and an apparatus for a user equipment (UE) to transmit and receive a sidelink feedback channel in a wireless communication environment where a sidelink feedback channel between UEs is present.

Additional aspects will be set forth in part in the description which follows and, in part, will be apparent from the description, or may be learned by practice of the presented embodiments.

In accordance with an aspect of the disclosure, an operating method of a terminal in a wireless communication system is provided. The method includes acquiring resource pool information for sidelink communication, receiving, from another terminal, a physical sidelink shared channel (PSSCH), and reporting, to the another terminal, a hybrid automatic request (HARQ) feedback information corresponding to the receiving of the PSSCH, based on physical sidelink feedback channel (PSFCH) configuration information included in the resource pool information.

The PSFCH configuration information may include at least one of information on duration from when the terminal receives the PSSCH from the another terminal to when the terminal reports the HARQ feedback information, information on a set of frequency resources for PSFCH in which the HARQ feedback information is reported, or information on a period of resources for transmission of the PSFCH, the duration is in units of slots, and the period is in units of slots.

In accordance with another aspect of the disclosure, a terminal in a wireless communication system is provided. The terminal includes a transceiver, and at least one processor configured to acquire resource pool information for sidelink communication, receive via the transceiver, from another terminal, a physical sidelink shared channel (PSSCH), and report via the transceiver, to the another terminal, a hybrid automatic request (HARQ) feedback information corresponding to the reception of the PSSCH, based on physical sidelink feedback channel (PSFCH) configuration information included in the resource pool information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13E is a diagram illustrating calculating of a bit number of feedback information transmitted to a sidelink feedback channel according to an embodiment of the disclosure;

Throughout the drawings, it should be noted that like reference numbers are used to depict the same or similar elements, features, and structure.

DETAILED DESCRIPTION

Figure 1A:
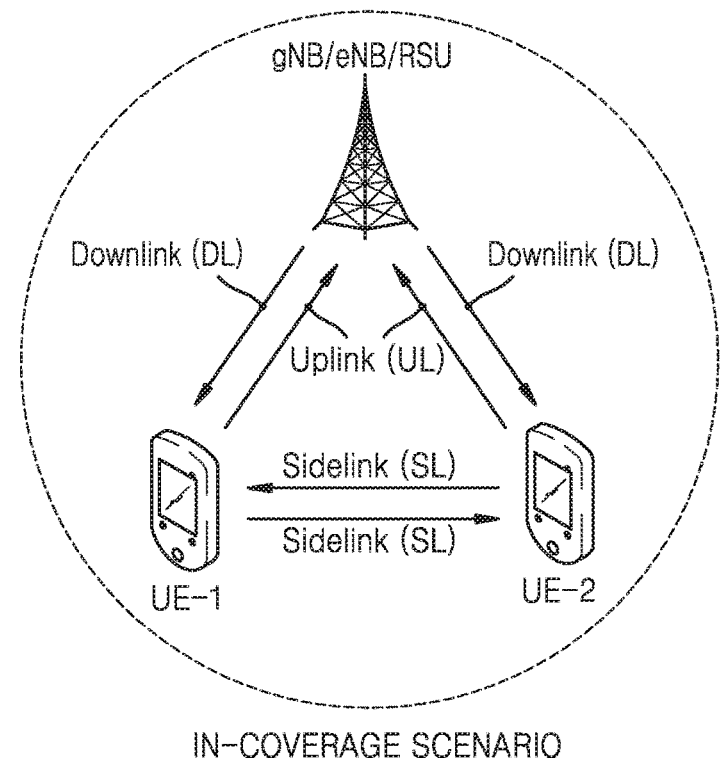
FIG. 1A is a diagram illustrating an in-coverage scenario according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. In addition, the size of each component does not completely reflect the actual size. In the drawings, like reference numerals denote like elements.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that this disclosure will be thorough and complete and will fully convey the concept of the embodiments of the disclosure to one of ordinary skill in the art, and the disclosure will only be defined by the appended claims.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" used in the embodiments of the disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. In addition, in the embodiments of the disclosure, the "unit" may include at least one processor.

Embodiments of the disclosure will be described mainly based on a new radio access network (RAN) (new radio (NR)) on the 5th generation (5G) mobile communication standard specified by the $3^{rd}$ generation partnership project (3GPP) that is a standardization organization for mobile communication standards, and a packet core (5G system, 5G core network, or next generation (NG) core) that is a core network. However, it will be obvious to one of ordinary skill in the art that the main subject matter of the disclosure is applicable to other communication systems having a similar technical background, with a slight modification within a range that is not significantly outside the scope of the disclosure.

In the 5G system, a network data collection and analysis function (NWDAF) that is a network function for providing a function of analyzing and providing data collected in a 5G network may be defined to support network automation. NWDAF may provide results of collecting/storing/analyzing information from the 5G network to an unspecified network function (NF), and the analysis results may be independently used in each NF.

Hereinafter, for convenience of description, some terms and names defined by the 3GPP long term evolution (LTE) standard (standard of 5G, NR, LTE, or similar system) may be used. However, the disclosure is not limited by such terms and names, and may be equally applied to systems conforming to other standards.

In addition, terms for identifying access nodes, terms denoting network entities, terms denoting messages, terms denoting interfaces between network entities, terms denoting various types of identification information, and the like, used herein are exemplified for convenience of description. Thus, the terms used in the disclosure are not limited and other terms denoting targets having the same technical meanings may be used.

To meet the increase in demand for wireless data traffic after the commercialization of $4^{th}$ generation (4G) communication systems, efforts have been made to develop improved 5G communication systems (or new radio (NR) systems). To achieve a high data rate, 5G communication systems have been designed to support resources in a super-high frequency band (mmWave) (for example, a frequency band of 28 GHz). In order to reduce the path loss of radio waves in such a super-high frequency band and to increase a transmission distance of radio waves in 5G communication systems, various technologies have been discussed and are being studied, for example, beamforming, massive multiple-input multiple-output (MIMO), full dimensional MIMO (FD-MIMO), array antennas, analog beam-forming, and large-scale antennas. In addition, the 5G communication systems support various subcarrier spacings including 15 kHz, 30 kHz, 60 kHz, and 120 kHz unlike LTE, wherein a physical control channel uses polar coding and a physical data channel uses low density parity check (LDPC). In addition, not only discrete Fourier transform spread orthogonal frequency division multiplexing (DFT-S-OFDM), but also cyclic prefix (CP)-OFDM is used as waveforms for uplink (UL) transmission. In LTE, hybrid automatic request (HARQ) retransmission in transport block (TB) units is supported, whereas in 5G, code block group (CBG)-based HARQ retransmission in which several CBs are grouped may be additionally supported.

In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, vehicle to everything (V2X) networks, cooperative communication, coordinated multi-points (CoMP), and interference cancellation.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, and the like. In recent years, technologies including a sensor network for connecting objects, machine to machine (M2M) communication, machine type communication (MTC), and the like, have been studied. In the IoT environment, intelligent Information technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, and the like.

Various attempts are being made to apply 5G communication systems to the IoT network. For example, technologies related to sensor networks, M2M communication, MTC, and the like, are being implemented by using 5G communication technology including beam-forming, MIMO, array antennas, and the like. The application of Cloud-RAN as a big data processing technology described above may be an example of convergence of 5G communication technology and IoT technology. As such, a plurality of services may be provided to a user in a communication system, and a method for providing the plurality of services in the same time section according to characteristics so as to provide the plurality of services to the user and an apparatus using the method are required. Various services provided in a 5G communication system have been studied and one of the services is a service satisfying requirements of low latency and high reliability.

In vehicle communication, standardization of LTE-based V2X in 3GPP Rel-14 and Rel-15 has been completed based on a D2D communication structure, and currently, attempts have been made to develop V2X based on 5G NR. In NR V2X, unicast communication between user equipments (UEs), group cast (or multicast) communication, or broadcast communication is to be supported. In addition, unlike LTE V2X that aims at providing basic safety information transmission and reception required for driving of a vehicle, NR V2X aims at providing further advanced services, such as platooning, advanced driving, extended sensor, and remote driving.

An NR V2X transmission UE may transmit sidelink control information and data information to an NR V2X reception UE. Thereafter, the NR V2X reception UE may transmit acknowledgement (ACK) or negative acknowledgement (NACK) regarding the received sidelink data information to the NR V2X transmission UE. ACK/NACK information may be referred to as sidelink feedback control information (SFCI). SFCI may be transmitted via a physical sidelink feedback channel (PSFCH) of a physical (PHY) layer.

Meanwhile, the NR V2X transmission UE may transmit a sidelink reference signal such that the NR V2X reception UE is able to obtain information about a sidelink channel state. Here, the sidelink reference signal may be a demodulation reference signal (DMRS) used by the NR V2X reception UE for channel estimation or a channel state information reference signal (CSI-RS) for obtaining channel state information. When CSI-RS is used, CSI-RS may be transmitted by using a time/frequency/code resource different from DMRS. The NR V2X reception UE that obtained sidelink channel state information via DMRS or CSI-RS transmitted by the NR V2X transmission UE may report the sidelink channel state information to the NR V2X transmission UE. Here, CSI reporting information may correspond to SFCI described above and may be transmitted via a sidelink feedback channel.

As for another example, HARQ-ACK/NACK information and CSI reporting information may be multiplexed and simultaneously transmitted via a sidelink feedback channel.

An embodiment of the disclosure is proposed to support the scenario described above and is for providing a method and an apparatus for an NR V2X UE to transmit and receive a sidelink feedback channel The disclosure relates to a resource allocation method of a feedback channel in a wireless communication system, and more particularly, to a resource allocation method and an apparatus for transmitting and receiving a sidelink feedback channel transmitted between UEs.

FIGS. 1A to 1D are diagrams of a system according to various embodiments of the disclosure.

FIG. 1A is a diagram illustrating an in-coverage scenario according to an embodiment of the disclosure.

Referring to FIG. 1A, an example when all V2X UEs, i.e., UE-1 and UE-2, are located within coverage of a base station are illustrated.

All V2X UEs may receive data and control information from the base station via downlink (DL) or transmit data and control information to the base station via UL. Here, the data and control information may be data and control information for V2X communication. Alternatively, the data and control information may be data and control information for general cellular communication. In addition, the V2X UEs may transmit/receive the data and control information for V2X communication via sidelink (SL).

Figure 1B:
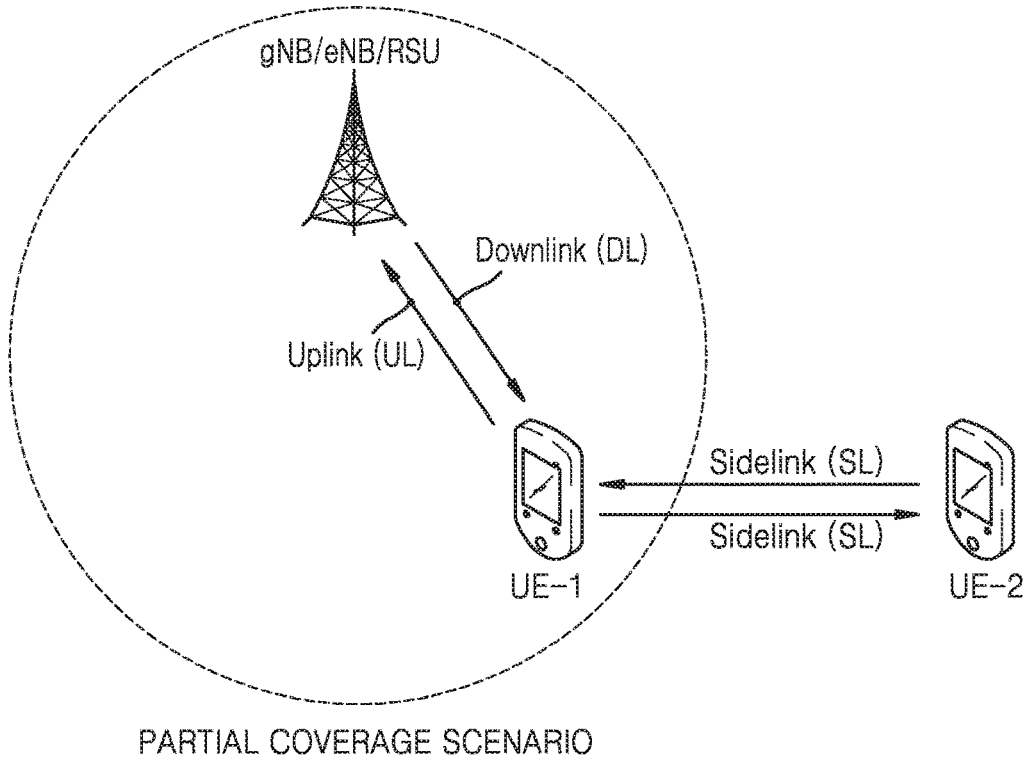
FIG. 1B is a diagram illustrating a partial coverage scenario according to an embodiment of the disclosure.

FIG. 1B is a diagram illustrating a partial coverage scenario according to an embodiment of the disclosure.

Referring to FIG. 1B, an example when UE-1 among V2X UEs is located within coverage of a base station and UE-2 is located outside the coverage of the base station is illustrated. The example of FIG. 1B may be related to partial coverage.

UE-1 located within the coverage of the base station may receive data and control information from the base station via DL or transmit data and control information to the base station via UL.

UE-2 located outside the coverage of the base station is unable to receive data and control information from the base station via DL and is unable to transmit data and control information to the base station via UL.

UE-2 and UE-1 may transmit/receive data and control information for V2X communication via SL.

Figure 1C:
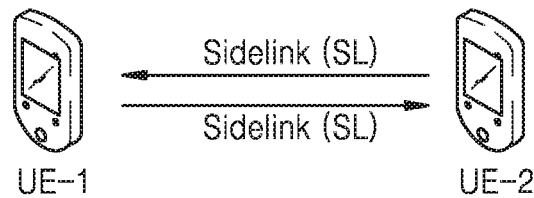
FIG. 1C is a diagram illustrating an out-of-coverage scenario according to an embodiment of the disclosure.

FIG. 1C is a diagram illustrating an out-of-coverage scenario according to an embodiment of the disclosure.

Referring to FIG. 1C, an example when all V2X UEs are located outside coverage of a base station is illustrated.

Thus, UE-1 and UE-2 are unable to receive data and control information from the base station via DL and unable to transmit data and control information to the base station via UL.

UE-1 and UE-2 may transmit/receive data and control information for V2X communication via SL.

Figure 1D:
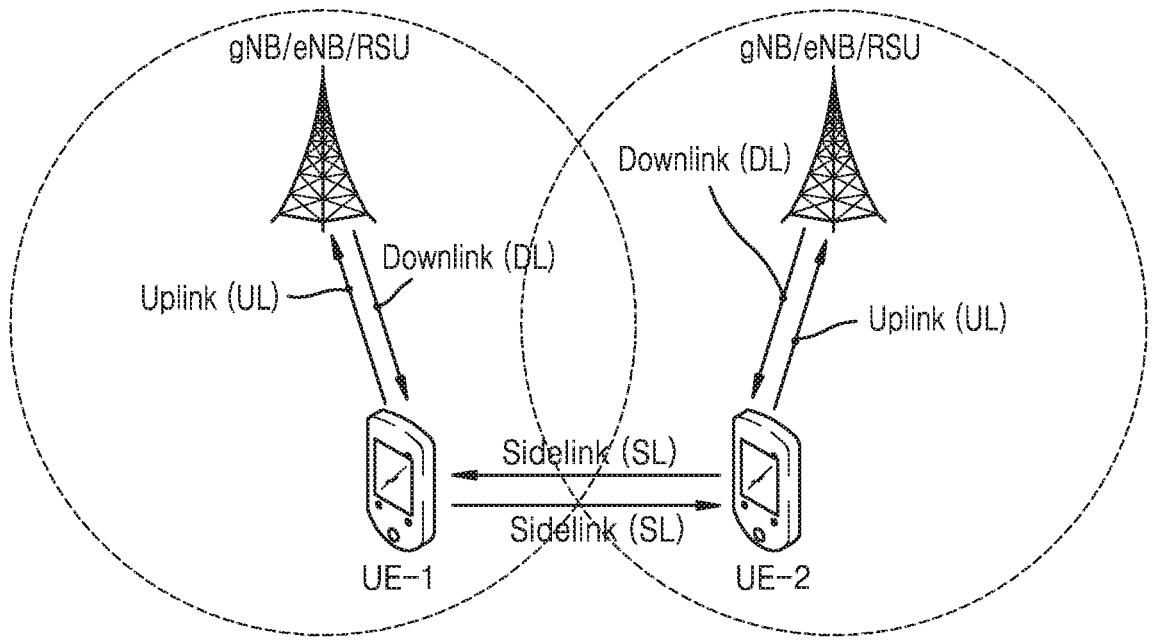
FIG. 1D is a diagram illustrating an inter-cell vehicle-to-everything (V2X) communication scenario according to an embodiment of the disclosure.

FIG. 1D is a diagram illustrating an inter-cell vehicle-to-everything (V2X) communication scenario according to an embodiment of the disclosure.

Referring to FIG. 1D, an example of a scenario where V2X communication is performed between UEs located in different cells is illustrated. More particularly, in FIG. 1D, a V2X transmission UE and a V2X reception UE access or are camped on (a radio resource control (RRC) disconnected state, i.e., RRC idle state) different base stations (RRC connected state). Here, UE-1 may be the V2X transmission UE and UE-2 may be the V2X reception UE. Alternatively, UE-1 may be the V2X reception UE and the UE-2 may be the V2X transmission UE. UE-1 may receive a V2X dedicated system information block (SIB) from a base station to which UE-1 is accessed (or camped on), and UE-2 may receive a V2X dedicated SIB from another base station to which UE-2 is accessed (or camped on). Here, information of the V2X dedicated SIB received by UE-1 and information of the V2X dedicated SIB received by UE-2 may be different from each other. Accordingly, it is required to unify the information to perform V2X communication between the UEs located in different cells.

In FIG. 1D, a V2X system including two UEs (UE-1 and UE-2) is illustrated for convenience of description, but an embodiment of the disclosure is not limited thereto. In addition, UL and DL between the base station and V2X UEs may be referred to as a Uu interface and SL between the V2X UEs may be referred to as a PC5 interface. Accordingly, UL and DL between the base station and V2X UEs may also be referred to as a Uu interface and SL between the V2X may also be referred to as a PC5 interface in the disclosure.

Meanwhile, in the disclosure, a UE may denote a vehicle supporting vehicle-to-vehicle (V2V) communication, a vehicle or handset (or smart phone) of a pedestrian supporting vehicle-to-pedestrian (V2P) communication, a vehicle supporting vehicle-to-network (V2N) communication, or a vehicle supporting vehicle-to-infrastructure (V2I) communication. In addition, in the disclosure, a UE may denote a road side unit (RSU) with a UE function, an RSU with a base station function, or an RSU with a part of a base station function and a part of a UE function.

In addition, in the disclosure, a base station may be pre-defined as a base station supporting both V2X communication and general cellular communication or as a base station supporting only V2X communication. In addition, here, the base station may denote a 5G base station (gNB), a 4G base station (eNB), or an RSU. Accordingly, unless otherwise specified in the disclosure, a base station and an RSU may be used in the same concept and thus may be used interchangeably.

Figure 2A:
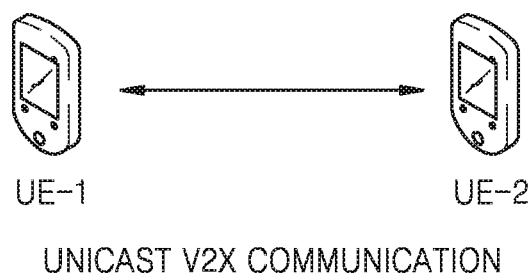
FIG. 2A is a diagram illustrating a unicast V2X communication method according to an embodiment of the disclosure.
Figure 2B:
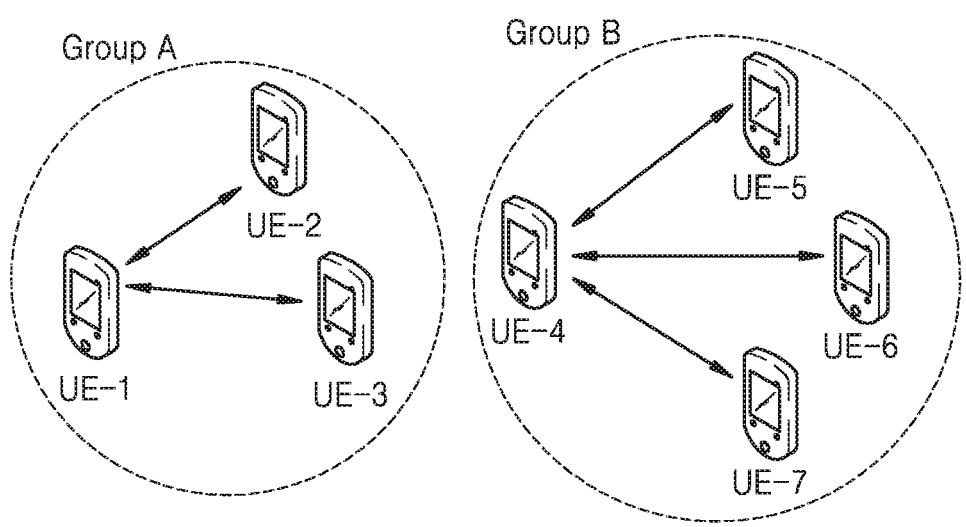
FIG. 2B is a diagram illustrating a groupcast V2X communication method according to an embodiment of the disclosure.

FIGS. 2A and 2B are diagrams illustrating a V2X communication method according to various embodiments of the disclosure.

FIG. 2A is a diagram illustrating a unicast V2X communication method according to an embodiment of the disclosure.

Referring to FIG. 2A, a UE-1 and a UE-2 may perform communication in a one-to-one manner, which may be referred to as unicast communication.

Here, the UE-1 and UE-2 may be a transmission (TX) UE or a reception (RX) UE.

FIG. 2B is a diagram illustrating a groupcast V2X communication method according to an embodiment of the disclosure.

Referring to FIG. 2B, UEs may perform one-to-many communication, which may be referred to as groupcast or multicast communication.

Here, the UEs may be a TX UE or an RX UE.

In FIG. 2B, UE-1, UE-2, and UE-3 form one group, i.e., group A, to perform groupcast communication and UE-4, UE-5, UE-6, and UE-7 form another group, i.e., group B, to perform groupcast communication. Each UE may perform groupcast communication only within a group to which it belongs, and may perform communication with a UE present in a different group by using unicast, groupcast, or broadcast. In FIG. 2B, two groups are formed but an embodiment of the disclosure is not limited thereto.

Meanwhile, although not shown in FIGS. 2A and 2B, V2X UEs may perform broadcast communication. The broadcast communication may indicate that all V2X UEs receive data and control information transmitted by a V2X transmission UE via SL. For example, in FIG. 2B, when UE-1 is a transmission UE for broadcast communication, all UEs (UE-2 through UE-7) may receive data and control information transmitted by UE-1.

SL broadcast, groupcast, and unicast communication methods according to an embodiment of the disclosure may be supported by in-coverage, out-of-coverage, and partial-coverage scenarios.

Unlike LTE V2X, NR V2X may consider support for a transmission type in which a vehicle UE transmits data only to a specific UE via unicast, and a transmission type in which a vehicle UE transmits data to a plurality of specific UEs via groupcast. For example, when a service scenario such as platooning that is a technology of grouping and moving two or more vehicles in a form of a group by connecting the two or more vehicles via one network is considered, such unicast and group cast technologies may be useful. More particularly, unicast communication may be required for a leader UE of a group connected via platooning to control one specific UE, and groupcast communication may be required for the leader UE to simultaneously control groups including a plurality of specific UEs.

In a V2X system, resource allocation may be performed via following methods.

Mode 1 Resource Allocation

Mode 1 resource allocation may denote a resource allocation method scheduled by a base station. More particularly, in the mode 1 resource allocation, the base station may allocate a resource used for SL transmission to RRC-connected UEs via a dedicated scheduling method. The scheduled resource allocation method may be effective in interference management and management of a resource pool (dynamic allocation or semi-persistence transmission) because the base station is able to manage resources of SL. When there is data to be transmitted to other UE(s), an RRC connected mode UE may transmit information notifying the base station that there is the data to be transmitted to the other UE(s) by using an RRC message or a media access control (MAC) control element (CE). For example, the RRC message may be SL UE information or UE assistance information, and MAC CE may be buffer status report (BSR) MAC CE or scheduling request (SR) including at least one of an indicator indicating BSR for V2X communication or information about a size of data buffered for SL communication. The mode 1 resource allocation method is applicable only when a V2X transmission UE is within coverage of the base station because SL transmission UE is scheduled for a resource by the base station.

Mode 2 Resource Allocation

Mode 2 resource allocation may denote a method, performed by a SL transmission UE, of autonomously selecting a resource (UE autonomous resource selection method). More particularly, the mode 2 resource allocation may denote a method by which a base station provides a SL transmission and reception resource pools for V2X to a UE via system information or RRC message (for example, RRC reconfiguration message or PC5-RRC message) and a transmission UE selects a resource pool and a resource according to a determined rule. The mode 2 resource allocation is applicable when V2X transmission and reception UEs are within coverage of the base station because the base station provides configuration information about the SL transmission and reception resource pools. When the V2X transmission and reception UEs are outside the coverage of the base station, the V2X transmission and reception UEs may perform the mode 2 resource allocation in preconfigured transmission and reception resource pools. The UE autonomous resource selection method may include zone mapping, sensing-based resource selection, and random selection.

In addition, even when V2X transmission and reception UEs are present in coverage of a base station, resource allocation or resource selection may be unable to be performed in a scheduled resource allocation or UE autonomous resource selection mode, and in this case, a UE may perform V2X SL communication via pre-configured SL transmission and reception resource pools (pre-configuration resource pool).

Figure 3:
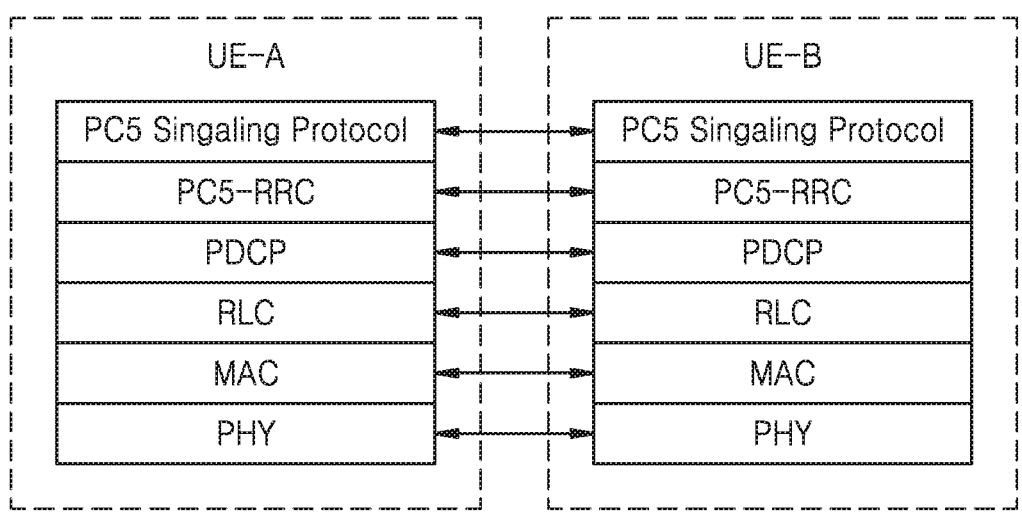
FIG. 3 is a diagram illustrating a protocol of a V2X user equipment (UE) according to an embodiment of the disclosure.

FIG. 3 is a diagram illustrating a protocol of a V2X UE according to an embodiment of the disclosure.

Referring to FIG. 3, although not shown in FIG. 3, application layers of a UE-A and a UE-B may perform service discovery. Here, service discovery may include discovery regarding which V2X communication method (i.e., unicast, groupcast, or broadcast communication method) is to be performed by each UE. In FIG. 3, it may be assumed that UE-A and UE-B determined to perform the unicast communication method via the service discovery performed in the application layer. NR V2X UEs may obtain information about source identification (ID) and destination ID for NR V2X unicast communication, during the service discovery.

When the service discovery is completed, a PC5 signaling protocol layer shown in FIG. 3 may perform a direct link setup procedure between UEs. Here, security configuration information for direct communication between UEs may be exchanged.

When the direct link setup procedure is completed, PC5-RRC configuration procedure between UEs may be performed in a PC5-RRC layer of FIG. 3. Here, information about capabilities of UE-A and UE-B may be exchanged and access stratum (AS) layer parameter information for unicast communication may be exchanged.

When the PC5-RRC configuration procedure is completed, UE-A and UE-B may perform unicast communication.

In the above embodiment of the disclosure, the unicast communication is described as an example but groupcast communication is similarly applicable. For example, when UE-A, UE-B, and UE-C perform the groupcast communication, service discovery, direct link setup, and PC5-RRC configuration procedures between UE-A and UE-B described above may be performed between UE-B and UE-C and between UE-A and UE-C.

More particularly, NR V2X UEs may obtain information about source ID and destination ID for NR V2X groupcast communication, during the service discovery described above. When the service discovery is completed, the PC5 signaling protocol layer shown in FIG. 3 may perform the direct link setup procedure between UEs. Here, the security configuration information for direct communication between UEs may be exchanged.

When the direct link setup procedure is completed, the PC5-RRC configuration procedure between UEs may be performed in the PC5-RRC layer of FIG. 3. Here, information about capabilities of UE-A, UE-B, and UE-C may be exchanged and AS layer parameter information for groupcast communication may be exchanged. However, when at least three UEs are present, a large signaling overhead and high communication latency may occur while exchanging AS layer parameter information and information about capabilities. Thus, as for another example, in the groupcast communication, the PC5-RRC configuration procedure between UEs may be omitted when the direct link setup procedure is completed.

When the PC5-RRC configuration procedure is completed (or when the direct link setup procedure is completed when the PC5-RRC configuration procedure is omitted), UE-A, UE-B, and UE-C may perform the groupcast communication.

Figure 4:
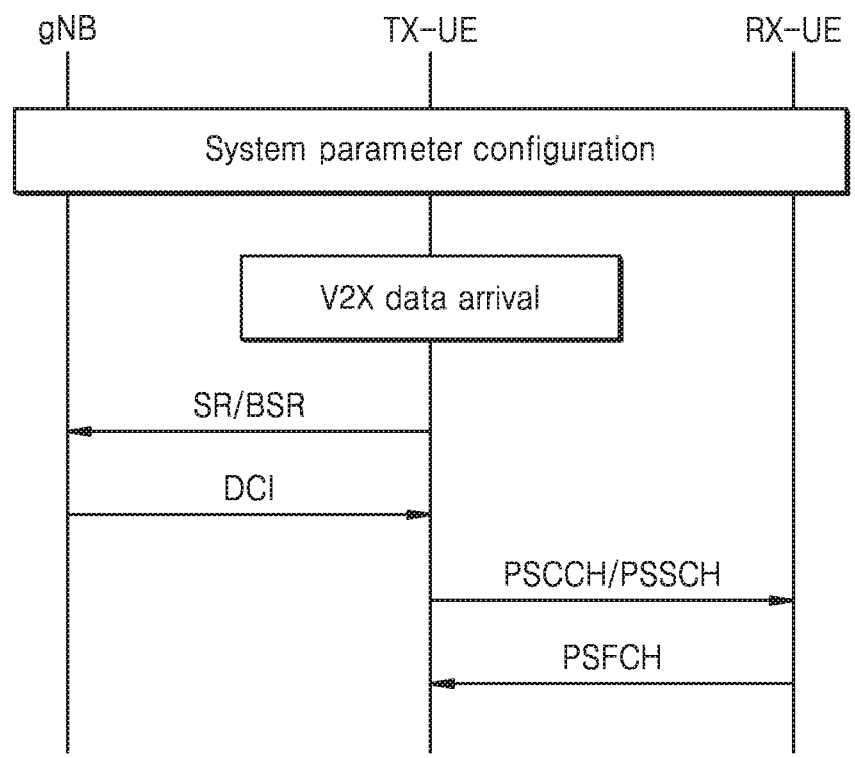
FIG. 4 is a diagram illustrating a V2X communication procedure according to an embodiment of the disclosure.

FIG. 4 is a diagram illustrating a V2X communication procedure according to an embodiment of the disclosure.

Referring to FIG. 4 illustrates a V2X communication procedure based on the mode 1 resource allocation described with reference to FIGS. 2A and 2B. In FIG. 4, a gNB may configure a V2X UE inside a cell with a parameter for V2X communication via system information. For example, the gNB may configure information about a resource pool where V2X communication is performable in its cell. Here, the resource pool may denote a transmission resource pool for V2X transmission or a reception resource pool for V2X reception. In addition, the resource pool may denote an SL control information resource pool for transmitting and receiving V2X control information, an SL data information resource pool for transmitting and receiving V2X data information, or an SL feedback information resource pool for transmitting and receiving V2X feedback information.

The V2X UE may be configured, by the gNB, with information about at least one resource pool. The gNB may configure, via the system information, unicast, groupcast, and broadcast communications to be performed in different resource pools. For example, a first resource pool may be used for unicast communication, a second resource pool may be used for groupcast communication, and a third resource pool may be used for broadcast communication. As for another example, the gNB may configure the unicast, groupcast, and broadcast communications to be performed in the same resource pool. The resource pool information configured by the gNB may include at least one piece of following information.

- Time axis information of a resource pool where a physical SL control channel (PSCCH) and a physical SL shared channel (PSSCH) are transmittable, More particularly, a slot index and period where PSCCH and PSSCH are transmittable, or a slot index where PSCCH and PSSCH are transmittable and a symbol index and period in a corresponding slot may be included.
- Frequency axis information of a resource pool where PSCCH and PSSCH are transmittable. More particularly, a resource block index where PSCCH and PSSCH are transmittable or an index of a sub-channel including two or more resource blocks may be included.
- Information about whether SL HARQ-ACK is operated may be included in resource pool configuration information.
  - When SL HARQ-ACK is operated, at least one piece of following information may be included.
  - Maximum retransmission number
  - HARQ-ACK timing: Duration from when a V2X reception UE received SL control information and data information from a V2X transmission UE to when the V2X reception terminal transmits corresponding HARQ-ACK/NACK to the V2X transmission UE. Here, the unit of time may be a slot or one or more OFDM symbols.
  - Physical SL feedback channel (PSFCH) format. When two or more PSFCH formats are operated, one PSFCH format may be used to transmit HARQ-ACK/NACK information configured of 1 or 2 bits. The other PSFCH format may be used to transmit HARQ-ACK/NACK information configured of 3 bits or more. Meanwhile, when the HARQ-ACK/NACK information is transmitted via PSFCH, ACK information and NACK information may each be transmitted via PSFCH. Here, an NR V2X reception UE may transmit ACK via PSFCH when decoding of PSSCH transmitted from an NR V2X transmission UE is successful. When the decoding failed, NACK may be transmitted via PSFCH. As another example, the NR V2X reception UE may not transmit ACK when the decoding of PSSCH transmitted from the NR V2X transmission UE is successful, and transmit NACK via PSFCH only when decoding failed.
  - Time/frequency/code resource configuring PSFCH or set of resources. In the case of a time resource, a slot index or a symbol index and period where PSFCH is transmitted may be included. In the case of a frequency resource, a frequency resource block (RB) where PSFCH is transmitted or a start point and an end point of a sub channel configured of two or more consecutive blocks (or a start point and a length of a frequency resource) may be included.
  - When SL HARQ-ACK is not operated, information related to the SL feedback channel may not be included.
- Information about whether blind retransmission is operated may be included in resource pool configuration information.
  - Unlike HARQ-ACK/NACK-based retransmission, in blind retransmission, an NR transmission UE does not receive feedback information regarding ACK or NACK from an NR reception UE, but repeatedly performs transmission. When the blind retransmission is operated, a blind retransmission number may be included in resource pool information. For example, when the blind retransmission number is set to 4, the NR transmission UE may always transmit same information four times when transmitting PSCCH/PSSCH to the NR reception UE. Here, SL control information (SCI) transmitted via PSCCH may include a redundancy version (RV) value.
- Information about a DMRS pattern usable in PSSCH transmitted from a corresponding resource pool.

A DMRS pattern usable in PSSCH may vary according to a speed of a UE. For example, when the speed is high, the number of OFDM symbols used for DMRS transmission in a time axis needs to be increased to improve the accuracy of channel estimation. In addition, when the speed is low, the accuracy of channel estimation is guaranteed even by using a low number of DMRS symbols, and thus the number of OFDM symbols used for DMRS transmission in the time axis needs to be decreased to reduce DMRS overhead. Accordingly, information about the resource pool may include information about the DMRS pattern usable in the corresponding resource pool. Here, one or more DMRS patterns may be configured in one resource pool and an NR V2X transmission UE may select and use one DMRS pattern from DMRS patterns configured based on its speed. In addition, the NR V2X transmission UE may transmit information about the selected DMRS pattern to an NR V2X reception UE via SCI of PSCCH. Upon receiving the information, the NR V2X reception UE may obtain DMRS pattern information, perform channel estimation on PSSCH, and obtain SL data information via demodulation and decoding processes.

Whether SL CSI-RS is operated
When SL CSI-RS is operated, at least one piece of following information may be included.
CSI-RS transmission start time point: A start time point when a V2X transmission UE needs to transmit CSI-RS to a V2X reception UE. Such a start time point may denote an index of a slot where CSI-RS is transmitted or denote an index of a symbol where CSI-RS is transmitted or both indices of slot and symbol.
CSI reporting timing: A time from when a V2X reception UE received CSI-RS from a V2X transmission UE (i.e., a received slot index or symbol index in a received slot) to when the V2X reception UE transmitted CSI reporting to the V2X transmission UE (i.e., a slot index where CSI reporting is transmitted or a symbol index in the transmitted slot index). Here, the unit of time may be a slot or one or more OFDM symbols.
When SL CSI-RS is not operated, the above information may not be included.

Parameter for SL transmission power control
It has been described that the information above may be included in the resource pool configuration for V2X communication, but an embodiment of the disclosure is not limited thereto. In other words, the above information may be configured in the V2X transmission UE or the V2X reception UE independently from the resource pool configuration.

As shown in FIG. 4, when data to be transmitted to the V2X reception UE occurs in the V2X transmission UE, the V2X transmission UE may request the gNB for an SL resource to be transmitted to the V2X reception UE by using scheduling request (SR) and/or buffer status report (BSR). Upon receiving BSR, the gNB identifies that a UE includes data for SL transmission and may determine a resource required for SL transmission based on BSR.

The gNB may transmit, to the V2X transmission UE, SL scheduling grant including at least one of resource information for SCI or resource information for SL data transmission. The SL scheduling grant is information granting dynamic scheduling in SL and may be DL control information (DCI) transmitted on a physical DL control channel (PDCCH). When a base station is an NR base station (e.g., gNB), the SL scheduling grant may include information indicating bandwidth part (BWP) where SL transmission is performed and a carrier indicator field (CIF) or carrier frequency indicator where SL transmission is performed, and when a base station is an LTE base station (e.g., eNB), the SL scheduling grant may include only CIF. In addition, the SL scheduling grant may further include resource allocation-related information of PSFCH transmitting feedback information (A/N information) regarding SL data. Such resource allocation-related information may include, when SL transmission is groupcast, information for allocating a plurality of PSFCH resources for a plurality of UEs in a group. In addition, resource allocation-related information of feedback information may be information indicating at least one of a plurality of feedback information resource candidate sets configured via higher layer signaling.

Upon receiving the SL scheduling grant, the V2X transmission UE transmits SCI scheduling SL data according to the SL scheduling grant to the V2X transmission UE on PSCCH and transmits SL data on PSSCH. The SCI may further include at least one of resource application information used for SL data transmission, modulation and coding scheme (MCS) information applied to SL data, group destination identification (ID) information, source ID information, unicast destination ID information, power control information for controlling SL power, timing advance (TA) information, DMRS configuration information for SL transmission, packet repetition transmission-related information (for example, the number of packet repetition transmission, resource allocation-related information during packet repetition transmission, or RV), or HARQ process ID. In addition, the SCI may further include information indicating a resource where feedback information (A/N information) regarding SL data is transmitted.

Upon receiving the SCI, the V2X reception UE receives SL data. Thereafter, the V2X reception UE may transmit ACK/NACK information indicating success or failure of decoding of SL data to the V2X transmission UE on PSFCH. Feedback information transmission on SL may be applied to unicast transmission or groupcast transmission, but does not exclude broadcast transmission. When SL transmission corresponds to groupcast transmission, UEs that received groupcast data may transmit feedback information by using different PSFCH resources. Alternatively, the UEs that received the groupcast data may transmit the feedback information by using the same PSFCH resource, and in this case, only NACK information may be fed back (i.e., a UE that received data may not perform feedback when ACK). Here, the PSFCH resource may include not only a resource distinguished in time and/or frequency domain, but also a resource distinguished by using a code, such as a scrambling code or an orthogonal cover code, and a resource distinguished by using different sequences (and a cyclic shift applied to a sequence).

In FIG. 4, a scenario in which the V2X transmission UE established UL connection with the gNB, and both the V2X transmission UE and the V2X reception UE are present within coverage of the gNB may be assumed. Although not shown in FIG. 4, when the V2X transmission UE did not establish the UL connection with the gNB (i.e., in an RRC idle state), the V2X transmission UE may perform a random access procedure for UL connection establishment with the gNB. In addition, although not shown in FIG. 4, in a scenario in which the V2X transmission UE is present within the coverage of the gNB and the V2X reception UE is present outside the coverage of the gNB, the V2X reception UE may be pre-configured with information for V2X communication described above. Meanwhile, the V2X transmission UE may be configured, by the gNB, with the information for V2X communication as shown in FIG. 4.

When the V2X transmission UE and the V2X reception UE are both present outside the coverage of the base station, the V2X transmission UE and the V2X reception UE may be pre-configured with the information for V2X communication described above. Here, being pre-configured may be interpreted as using a value embedded in a UE when the UE is released. Alternatively, being pre-configured may denote that the V2X transmission UE or reception UE pre-obtained the information about the V2X communication via RRC configuration by accessing the gNB or may denote most recently obtained information when the information about the V2X communication has been obtained via system information of the gNB.

In addition, although not shown in FIG. 4, it may be assumed that the V2X transmission UE completed service discovery, direct link setup procedure, and PC RRC configuration with the V2X reception UE via the procedure described with reference to FIG. 3, before transmitting SR/BSR to the gNB.

Figure 5:
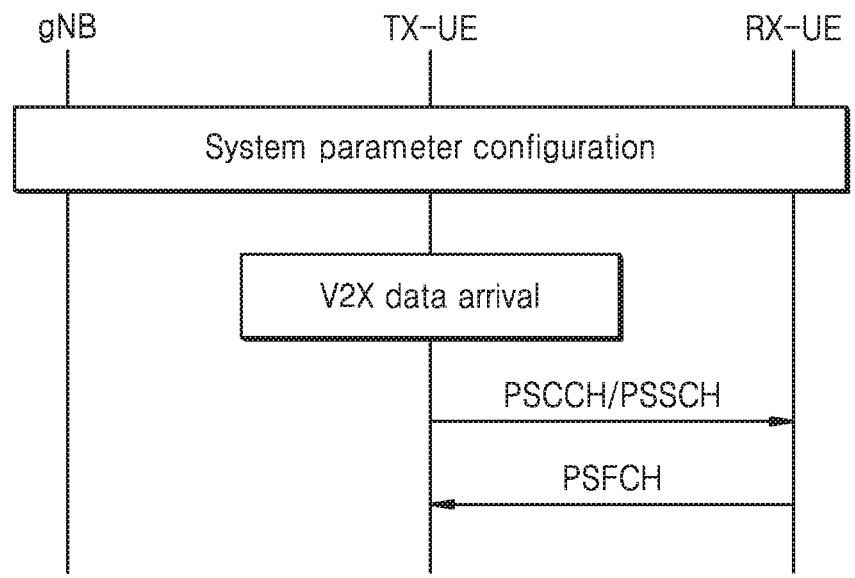
FIG. 5 is a diagram illustrating of a V2X communication procedure according to an embodiment of the disclosure.

FIG. 5 is a diagram illustrating of a V2X communication procedure according to an embodiment of the disclosure.

Referring to FIG. 5 illustrates a V2X communication procedure based on the mode 2 resource allocation described with reference to FIGS. 2A and 2B. In FIG. 5, a gNB may configure, to V2X transmission and reception UEs inside a cell, a parameter for V2X communication via system information. Here, the parameter may include at least one piece of the parameter information described with reference to FIG. 4.

As shown in FIG. 5, when data to be transmitted from a V2X transmission UE to a V2x reception UE occurred, the V2X transmission UE may transmit SCI to the V2X reception UE on PSCCH and SL data on PSSCH. SCI may further include at least one of resource application information used for SL data transmission, MCS information applied to SL data, group destination ID information, source ID information, unicast destination ID information, power control information for controlling SL power, TA information, DMRS configuration information for SL transmission, packet repetition transmission-related information (for example, the number of packet repetition transmission, resource allocation-related information during packet repetition transmission, or RV), or HARQ process ID. In addition, the SCI may further include information indicating a resource where feedback information (A/N information) regarding SL data is transmitted.

Upon receiving the SCI, the V2X reception UE may receive SL data. Thereafter, the V2X reception UE may transmit ACK/NACK information indicating success or failure of decoding of the SL data to the V2X transmission UE on PSFCH. Feedback information transmission on SL may be applied to unicast transmission or groupcast transmission, but does not exclude broadcast transmission. When SL transmission corresponds to groupcast transmission, UEs that received groupcast data may transmit feedback information by using different PSFCH resources. Alternatively, the UEs that received the groupcast data may transmit the feedback information by using the same PSFCH resource, and in this case, only NACK information may be fed back (i.e., a UE that received data may not perform feedback when ACK is determined). Here, the PSFCH resource may include not only a resource distinguished in time and/or frequency domain, but also a resource distinguished by using a code, such as a scrambling code or an orthogonal cover code, and a resource distinguished by using different sequences (and a cyclic shift applied to a sequence).

In FIG. 5, a scenario in which the V2X transmission and reception UEs are both present in coverage of the gNB may be assumed. Although not shown in FIG. 5, the example of FIG. 5 may be applied even when the V2X transmission and reception UEs are both present outside the coverage of the gNB. In this case, the V2X transmission and reception UEs may be pre-configured with information for V2X communication described above. In addition, although not shown in FIG. 5, the example of FIG. 5 may also be applied to a scenario in which one of the V2X transmission and reception UEs may be present in the coverage of the gNB and the other one may be present outside the coverage of the gNB. In this case, the UE present in the coverage of the gNB may be configured, by the gNB, with the information for V2X communication, and the UE present outside the coverage of the gNB may be pre-configured with the information for V2X communication. In the above example, the 'information for V2X communication' may be interpreted as information about at least one of parameters for V2X communication described with reference to FIG. 4. In addition, in the above example, being pre-configured may be interpreted as using a value embedded in a UE when the UE is released. Alternatively, being pre-configured may denote that the V2X transmission UE or reception UE pre-obtained the information about the V2X communication via RRC configuration by accessing the gNB or may denote most recently obtained information when the information about the V2X communication has been obtained via system information of the gNB.

Although not shown in FIG. 5, it may be assumed that the V2X transmission UE completed service discovery, direct link setup procedure, and PC5-RRC configuration with the V2X reception UE via the procedures described with reference to FIG. 3, before the V2X transmission UE transmitted PSCCH/PSSCH to the V2X reception UE.

In FIG. 5, unicast communication in which only one V2X reception UE is present is described, but the example of FIG. 5 may be applied to groupcast communication and broadcast communication where two or more V2X reception UEs are present.

Figure 6:
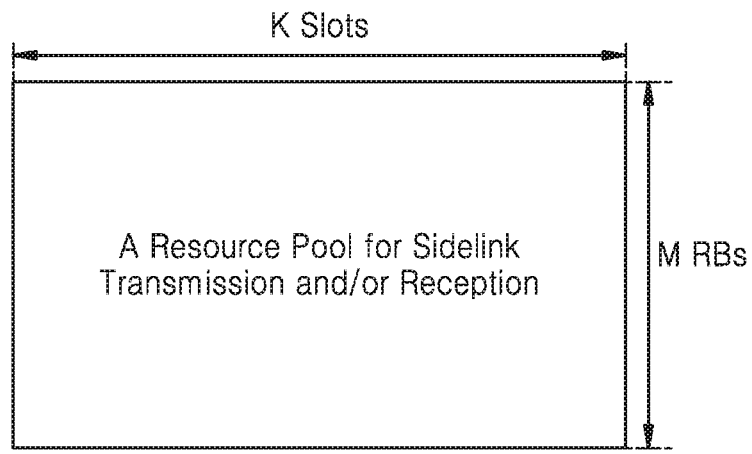
FIG. 6 is a diagram illustrating a sidelink resource pool for a V2X UE to perform V2X communication according to an embodiment of the disclosure.

FIG. 6 is a diagram illustrating an SL resource pool for a V2X UE to perform V2X communication according to an embodiment of the disclosure.

Referring to FIG. 6, the SL resource pool of FIG. 6 may include K slots in a time axis and M RBs in a frequency axis. One slot may include 14 OFDM symbols, but is not limited thereto. In other words, one slot included in the SL resource pool may include the number of OFDM symbols less than 14. In addition, the K slots included in the SL resource pool may include the same number of OFDM symbols (i.e., K slots may each include L symbols) or include different numbers of OFDM symbols. One RB may include 12 sub-carriers.

The K slots may be physically continuous or logically continuous in the time axis (when the K slots is logically continuous, the K slots may be physically discontinuous). Similarly, the M RBs may be physically continuous or logically continuous in the frequency axis (when the M RBs are logically continuous, the M RBs may be physically discontinuous).

Although not shown in FIG. 6, a V2X transmission UE may use the SL resource pool of FIG. 6 to transmit SL control information, data information, or feedback information. In addition, a V2X reception UE may use the SL resource pool of FIG. 6 to receive SL control information or data information and transmit SL feedback information.

Figure 7:
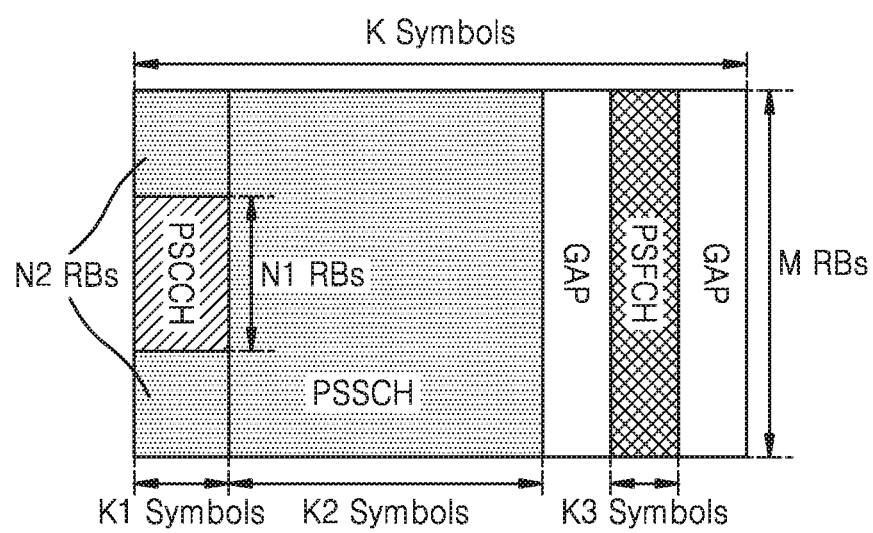
FIG. 7 is a diagram illustrating a multiplexing method of a sidelink control channel, a sidelink data channel, and a sidelink feedback channel in a sidelink resource pool according to an embodiment of the disclosure.

FIG. 7 is a diagram illustrating a multiplexing method of a SL control channel, an SL data channel, and an SL feedback channel in an SL resource pool according to an embodiment of the disclosure.

Referring to FIG. 7, PSCCH is multiplexed in a time axis and a frequency axis with PSSCH (that is, time division multiplexing (TDM) and frequency division multiplexing (FDM)). Here, PSCCH and PSSCH may be configured of different numbers of RBs in the frequency axis. In other words, as shown in FIG. 7, PSCCH may be configured of N1 RBs in the frequency axis and the PSSCH may be configured of M RBs in the frequency axis. Here, N1 may be smaller than M (N1<M). However, a case in which PSCCH and PSSCH are configured of the same number of RBs (M RBs) in the frequency axis or a case in which the number of RBs of PSCCH is greater than the number of RBs of PSSCH (i.e., N1>M) is not excluded.

Referring to FIG. 7, FDM is performed on PSCCH and PSSCH in K1 OFDM symbols in the time axis and only PSSCH may be transmitted in the remaining K2 OFDM symbols without PSCCH. In other words, PSCCH may be configured of N1 frequency blocks in the frequency axis and K1 OFDM symbols in the time axis. PSSCH may be configured of N2 frequency blocks for the length of K1 OFDM symbols and may be frequency-divided with PSCCH. PSSCH may not be frequency-divided with PSCCH during the length of K2 OFDM symbols and may be configured of M frequency blocks. Here, the sum of N2 and M1 may be equal to or different from M.

In FIG. 7, N1 frequency blocks configuring PSCCH and PSSCH configured of (M−N2) frequency blocks are illustrated as being physically continuous, but may not be physically continuous (i.e., may be logically continuous but physically discontinuous). K1 and K2 may be equal to or different from each other, and when K1 and K2 are different from each other, K1>K2 or K1<K2. A V2X transmission UE may add time/frequency allocation information of PSSCH to SL control information to be transmitted to PSCCH. A V2X reception UE may receive and decode PSCCH, and then obtain the time/frequency allocation information of PSSCH and decode PSSCH. In FIG. 7, PSSCH configured of K2 symbols is physically continuously positioned after K1 symbols configuring PSCCH, but may not be physically continuous (i.e., may be logically continuous but physically discontinuous).

FIG. 7 illustrates a case in which PSFCH is present in an SL resource configured of K OFDM symbols. In this case, one slot may include, in the time axis, PSCCH K1 symbols, PSSCH K2 symbols (when considering only symbols on which FDM is not performed with PSCCH. When FDM with PSCCH is considered, PSSCH K1+K2 symbols), a guard symbol (GAP), PSFCH K3 symbols, and a guard symbol (GAP). In other words, K1+K2+first guard symbol+ K3+second guard symbol=K. Here, the first guard symbol and the second guard symbol may be one or more OFDM symbols. The first guard symbol may be required for the V2X transmission UE to transmit PSCCH and PSSCH and to switch between transmission and reception for receiving PSFCH. On the other hand, in terms of the V2X reception UE, the first guard symbol may be required for the V2X reception UE to receive PSCCH and PSSCH and to switch between reception and transmission for transmitting PSFCH. Similarly, the second guard symbol may be required for the V2X transmission UE to receive PSFCH from the V2X reception UE and to switch between reception and transmission for transmitting PSCCH and PSSCH in a following SL resource. On the other hand, in terms of the V2X reception UE, the second guard symbol may be required for the V2X reception UE to transmit PSFCH to the V2X transmission UE and to switch between transmission and reception for receiving PSCCH and PSSCH in a following SL resource.

Although not shown in FIG. 7, one of the first guard symbol and the second guard symbol may be 0. For example, when the V2X transmission UE receives PSFCH and receives PSCCH and PSSCH from another UE in a following SL resource, switch between reception and transmission is not required, and thus the number of second guard symbol may be 0. In addition, a case in which at least one of K1, K2, or K3 is 0 may not be excluded.

In FIG. 7, the size of frequency RB of PSFCH is the same as that of PSSCH (i.e., M RBs), but the size of RB of PSFCH in the frequency axis may be the same as or different from the size of RB of PSCCH and PSSCH. After decoding PSSCH, the V2X reception UE may transmit a result of success (i.e., ACK/NACK information) to the V2X transmission UE with PSFCH.

In the above examples, time and frequency resources of PSFCH transmitted by one V2X UE may be defined each as K3 OFDM symbols and M RBs. Here, all V2X UEs may use same values of K3 and M regardless of a location of UE (in coverage of gNB, outside coverage of gNB, or partial coverage). As for another example, at least one value of K3 or M may be configured by the gNB or V2X UE. More particularly, the gNB may transmit information about an SL resource pool to V2X UEs present in its cell via SIB or RRC configuration. Here, the information about the SL resource pool may include at least one value of K3 or M. As for another example, V2X transmission and reception UE pairs performing unicast or groupcast communication may be configured with at least one value of K3 or M while exchanging AS layer parameters via PC5-RRC configuration as described with reference to FIG. 3. As for another example, at least one value of K3 or M may be pre-configured.

When PSFCH uses two or more formats (for example, when one PSFCH format is used to transmit SL feedback information less than or equal to 2 bits and another PSFCH format is used to transmit SL feedback information including more than 2 bits), at least one PSFCH format may use a fixed value for at least one of K3 or M.

Figure 8A:
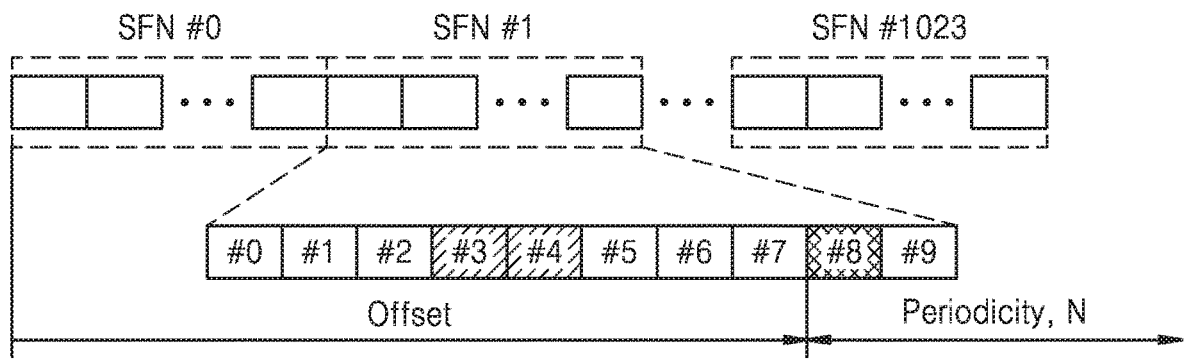
FIG. 8A is a diagram illustrating time axis resource allocation of a sidelink feedback channel according to an embodiment of the disclosure.
Figure 8B:
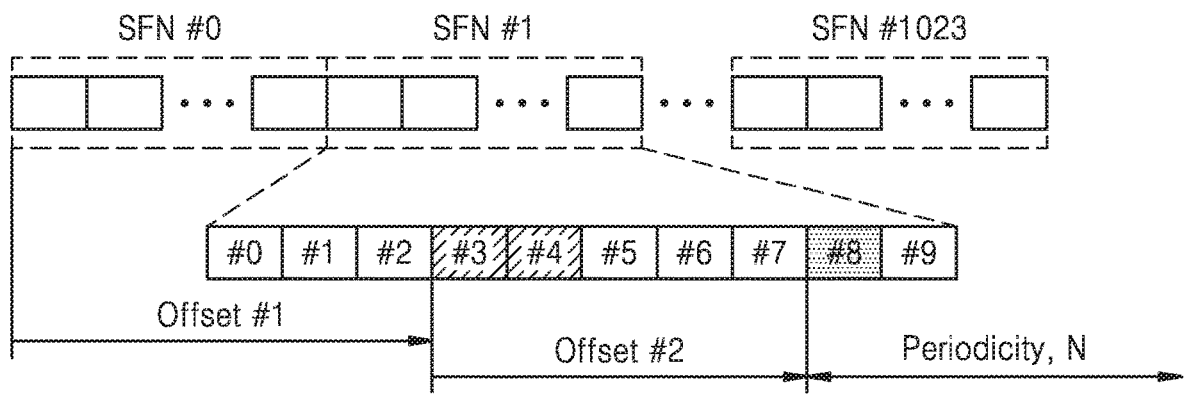
FIG. 8B is a diagram illustrating of time axis resource allocation of a sidelink feedback channel according to an embodiment of the disclosure.

FIGS. 8A and 8B are diagrams illustrating time axis resource allocation of a SL feedback channel according to various embodiments of the disclosure.

Time axis resource allocation of PSFCH may denote a start point of a resource in which PSFCH is transmittable and a period where the resource in which PSFCH is transmittable. More particularly, the start point of the resource in which PSFCH is transmittable may include an index of a slot in which PSFCH is transmittable, or the index of the slot in which PSFCH is transmittable and a symbol index in the slot.

Referring to FIG. 8A, a method of allocating a resource pool of PSFCH is illustrated, and illustrates a case in which the resource pool of PSFCH is allocated independently from resource pool configuration transmitting PSCCH and PSSCH. In other words, a resource of PSFCH starts from slot index 8 of a system frame '1' based on a system frame number (SFN) 0, and a time axis resource of such PSFCH is repeated with a period N. A V2X reception UE may transmit HARQ-ACK/NACK information based on such information to a V2X transmission UE via PSFCH from a slot where PSFCH is present.

When there is no gNB (i.e., when the V2X reception UE is present outside coverage of gNB), a start point of a resource pool where PSFCH is transmittable based on a direct frame number (DFN) 0 may be configured.

The allocation method with respect to the time axis resource of PSFCH described above is related to a system. In other words, a start slot and period of a PSFCH resource pool may be configured in a V2X system, and the V2X reception UE may not always have to use a corresponding resource.

Referring to FIG. 8A, the PSFCH resource pool in terms of system may start from slot '8' of an SFN 1 and a period may include N slots. A particular V2X reception UE may use a PSFCH resource only when its PSFCH is to be transmitted from a PSFCH resource pool configured in terms of a system. For example, a time point when a V2X reception UE is to transmit PSFCH may be a K slot after a time point when the V2X reception UE received PSCCH and PSSCH from a V2X transmission UE. Such a timing relationship 'K' of PSCCH/PSSCH and PSFCH may be configured for each PSFCH resource pool. In addition, a value 'K' may be different for each PSFCH resource pool or may be the same for all PSFCH resource pools.

In terms of a system, a period N of the PSFCH resource pool may be 1 or an integer greater than 1 Based on a relationship between N and K described above (i.e., N=K, N<K, or N>K), the PSFCH resource to be transmitted by the particular V2X reception UE may not be present in a corresponding slot. For example, when N is 4 in FIG. 8A, the PSFCH time axis resource may be present every 4 slots in terms of a system. In other words, the PSFCH time axis resource may be present, based on the slot 8 of the SFN 1, slots 2 and 6 of SFN 2, slots 0, 4, and 8 of SFN 3. Here, when it is assumed that K is 4 (i.e., when the V2X reception UE transmitted PSFCH after 4 slots after PSCCH/PSSCH is received from the V2X transmission UE) and the V2X reception UE received PSCCH/PSSCH in slot 9 of SFN 1 from the V2X transmission UE, the V2X reception UE needs to transmit HARQ-ACK/NACK information via PSFCH from slot 3 of SFN 2. However, because a corresponding slot does not include a PSFCH resource, the V2X reception UE may be unable to transmit PSFCH. In this case, the V2X reception UE may transmit PSFCH from an earliest PSFCH slot based on a slot where PSFCH is to be transmitted. In other words, in the above example, the V2X reception UE may transmit HARQ-ACK/NACK information via PSFCH in slot 6 of SFN 2.

FIG. 8B is a diagram illustrating of time axis resource allocation of an SL feedback channel according to an embodiment of the disclosure.

FIG. 8A illustrates a case in which a resource pool of PSFCH is allocated independently from resource pool configuration of transmitting PSCCH and PSSCH.

Referring to FIG. 8B, unlike FIG. 8A, a method of configuring a resource pool of PSFCH within a resource pool of transmitting PSCCH and PSSCH is illustrated. In other words, PSCCH and PSSCH resources may start from a slot index 3 of a system frame '1' based on an SFN '0'. Such a start point may be identified as an offset #1. Because PSFCH is present within the resource pool of PSCCH and PSSCH, a start point of PSFCH may be identified via an offset #2 based on a point where PSCCH/PSSCH starts. In other words, it may be identified that a PSFCH resource starts from a slot index '8' that is 5 slots after a slot index 3 of the system frame '1'. In addition, in FIG. 8B, a time axis resource of PSFCH is repeated with a period N. A V2X reception UE may transmit HARQ-ACK/NACK information based on such information to a V2X transmission UE via PSFCH from a slot where PSFCH is present.

The allocation method with respect to the time axis resource of PSFCH described above is related to a system. Thus, as described with reference to FIG. 8A, in terms of a system, a PSFCH resource may not be present in a slot in which a particular V2X reception UE needs to transmit PSFCH. In this case, as described with reference to FIG. 8A, the V2X reception UE may transmit PSFCH from an earliest PSFCH slot based on a slot in which PSFCH is to be transmitted.

Figure 9A:
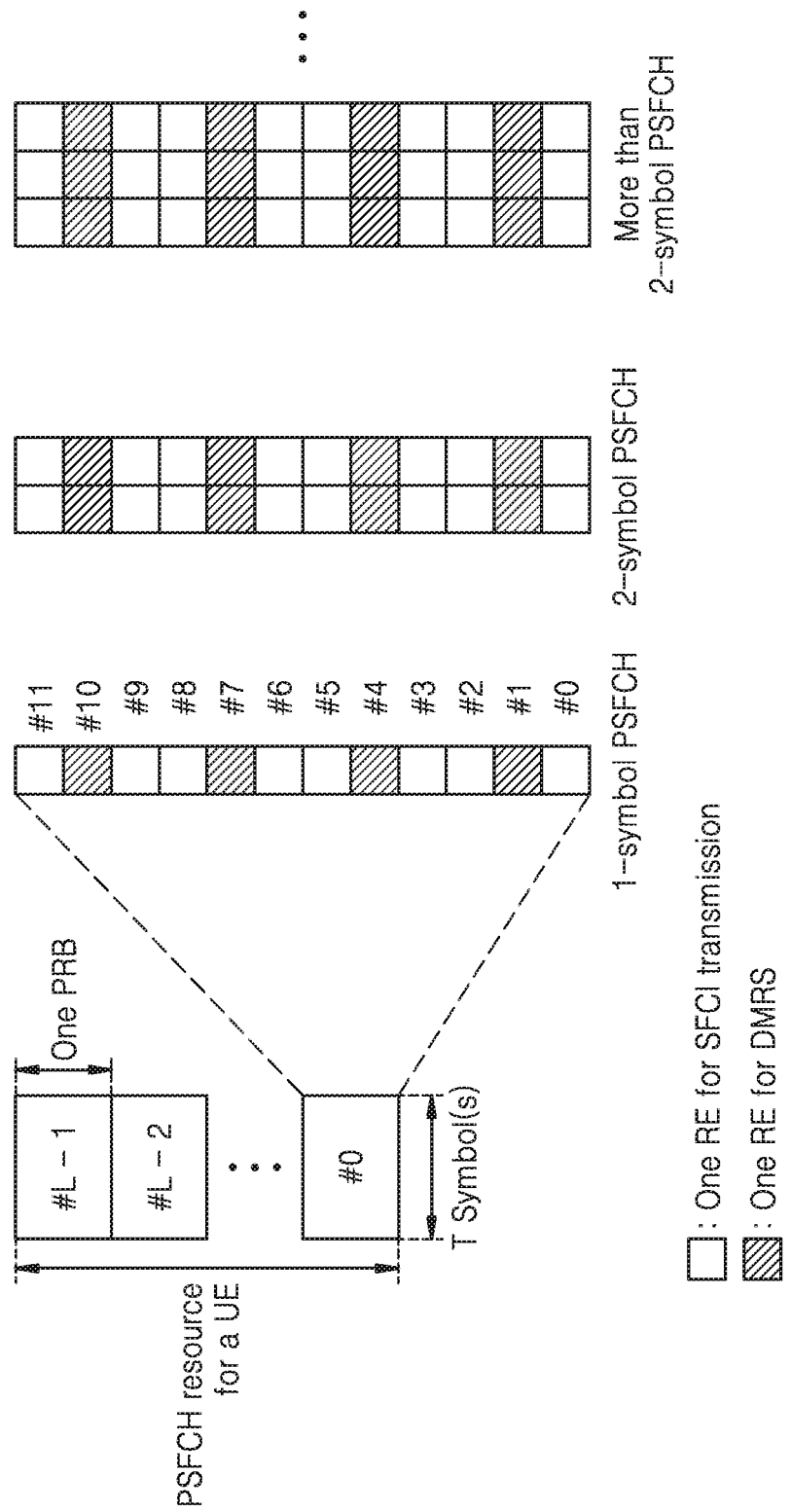
FIG. 9A is a diagram illustrating a resource structure of a sidelink feedback channel according to an embodiment of the disclosure.
Figure 9B:
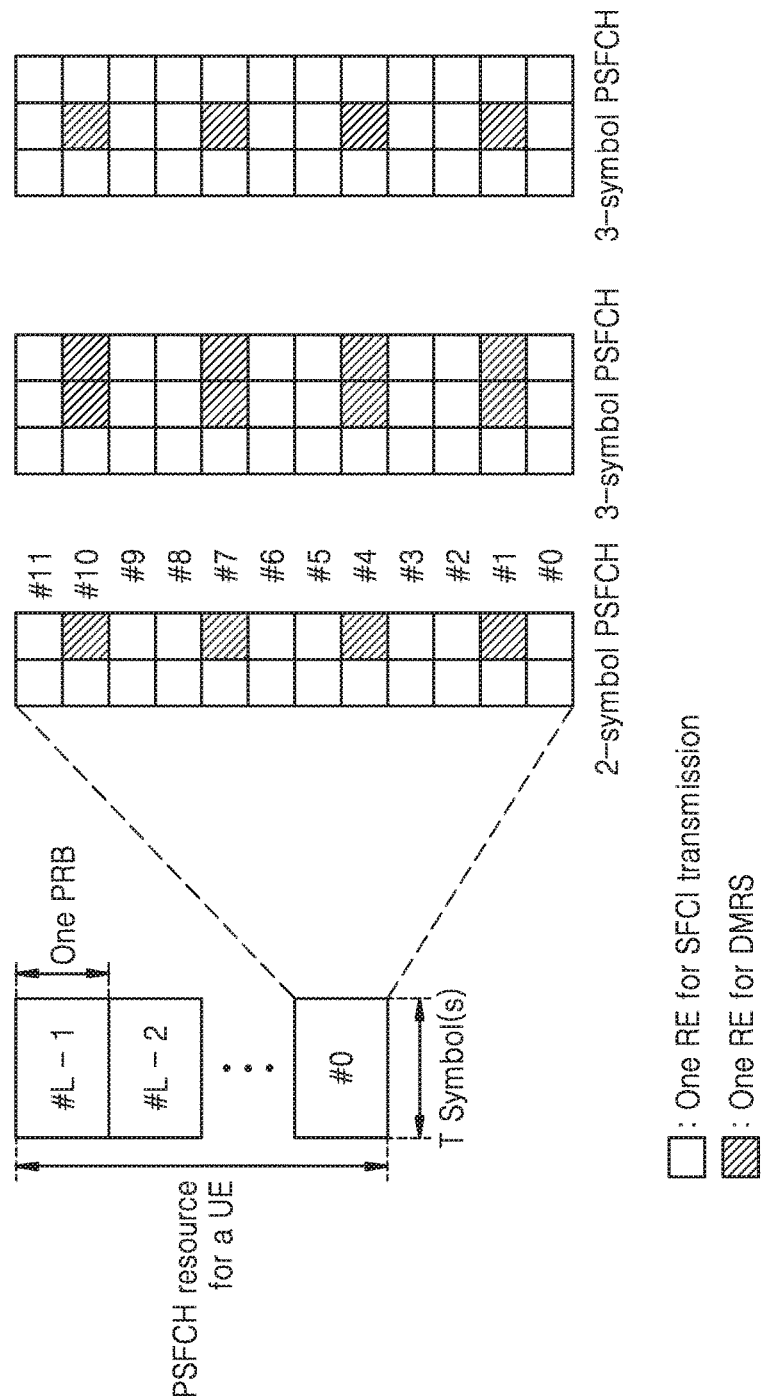
FIG. 9B is a diagram illustrating of a resource structure of a sidelink feedback channel according to an embodiment of the disclosure.

FIGS. 9A and 9B are diagrams illustrating a resource structure of an SL feedback channel according to various embodiments of the disclosure.

Referring to FIGS. 9A and 9B, a PSFCH resource structure of FIGS. 9A and 9B may denote a resource structure of PSFCH transmitted by a V2X reception UE to a V2X transmission UE during the unicast communication procedure shown in FIGS. 4 and 5. In addition, the PSFCH resource structure of FIGS. 9A and 9B may denote a resource structure of PSFCH used when V2X reception UEs in a group each transmit HARQ ACK information and NACK information to a V2X transmission UE (Option 2) in the groupcast communication described with reference to FIG. 4. In addition, the PSFCH resource structure of FIGS. 9A and 9B may denote a resource structure of PSFCH used when a plurality of V2X reception UEs in a group transmit only NACK information to a V2X transmission UE (Option 1) in the groupcast communication described with reference to FIG. 4.

In the unicast and groupcast communication described above, each V2X reception UE may transmit SL feedback control information (SFCI) to a V2X transmission UE by using the PSFCH resource structure of FIGS. 9A and 9B. Here, PSFCH used by one V2X reception UE for SFCI transmission may be configured of T symbols in a time axis and L RBs in a frequency axis as shown in FIGS. 9A and 9B. Values of T and L may include 1 and when T=L=1, each V2X reception UE may transmit, to the V2X transmission UE, PSFCH configured of one OFDM symbol and one RB in the time axis. Here, one RB may include 12 subcarriers or 12 resource elements (REs). In addition, in FIGS. 9A and 9B, when L>1, one PSFCH resource configured of L RBs may be considered as one PSFCH sub-channel. Here, the number of PSFCH sub-channels available to one V2X reception UE for SFCI transmission may be [x]. Here, a value of [x] may be 1 or greater than 1, and may be configured by a gNB via RRC or PC5-RRC (or the value of [x] may be pre-configured). Information about the value of [x] may be included in SL resource pool configuration information.

In FIGS. 9A and 9B, DMRS overhead is assumed to be ⅓ (i.e., four REs among 12 REs are used as DMRS), but is not limited thereto. For example, when the DMRS overhead is ¼, i.e., when 3 REs among 12 REs are used as DMRS, DMRS may be mapped to RE index #1, 5, and 9 (or #2, 6, and 10) and SFCI may be mapped to remaining RE indexes. In FIGS. 9A and 9B, a PSFCH structure regarding one RB including 12 REs is illustrated, but the same PSFCH structure may be applied to PSFCH including two or more RBs. In other words, when two RBs are assumed as a size of a PSFCH frequency resource transmitted by one V2X reception UE, DMRS may be mapped to RE index #1, 4, 7, 10, 13, 16, 19, and 22, and SFCI may be mapped to the remaining RE indexes. By using such a principle, a PSFCH structure configured of more than 2 RBs (L>2) may be expanded and determined.

Meanwhile, when PSFCH transmitted by one V2X reception UE includes two or more OFDM symbols in the time axis, PSFCH configured of one OFDM symbol may be repeated. In other words, as shown in FIG. 9A, PSFCH configured of two or more OFDM symbols may have a repeated structure of PSFCH configured of one OFDM symbol, and DMRS may be present in RE at the same location in each OFDM symbol. Although not shown in FIG. 9A, the locations of REs where DMRS is present in PSFCH configured of two or more OFDM symbols may vary for each OFDM symbol. Accordingly, DMRS overhead may be reduced, and for example, DMRS may be present only in an odd$^{th}$ OFDM symbols and DMRS may not be present in even$^{th}$ OFDM symbols. Alternatively, DMRS may be present only in the even$^{th}$ OFDM symbols and DMRS may not be present in the odd$^{th}$ OFDM symbols.

As for another example, in FIG. 9A, even when the number of OFDM symbols is increased, DMRS is present in the same RE in the frequency axis, but the locations of DMRS may vary for each OFDM symbol. For example, DMRS locations may be different in a first OFDM symbol and in a second OFDM symbol. In other words, comparing with the PSFCH structure configured of two OFDM symbols in FIG. 9A, DMRS may be located in the RE index #0 and 7 in the first OFDM symbol and DMRS may be located in the RE index #3 and 11 in the second OFDM symbol. Alternatively, DMRS locations may vary in the even$^{th}$ OFDM symbols and the odd$^{th}$ OFDM symbols, but the DMRS locations may be the same in the even$^{th}$ OFDM symbols (i.e., same in the second and fourth OFDM symbols) and the DMRS locations may be the same in the odd$^{th}$ OFDM symbols (i.e., same in the first and third OFDM symbols). In generalization, locations of DMRS REs in at least two OFDM symbols may be the same.

Although not shown in FIG. 9A, SFCI may be mapped to all REs of PSFCH without DMRS. In this case, channel estimation may be unable to be performed because there is no DMRS. However, when SFCI is transmitted based on a sequence, a receiving end is able to receive SFCI without channel estimation, and thus DMRS overhead may be reduced and a sequence length for SFCI transmission may be increased, thereby improving reception performance of PSFCH. A specific example about a sequence-based SFCI transmitting method will be described below with reference to FIG. 10.

FIG. 9B is a diagram illustrating of a resource structure of an SL feedback channel according to an embodiment of the disclosure.

Referring to FIG. 9B, another example of a PSFCH resource structure is illustrated to help a receiver of a transmission UE, which receives PSFCH, to configure automatic gain control (AGC). More particularly, the receiver of the transmission UE needs to configure an AGC range to receive PSFCH. Here, a reception UE transmitting PSFCH may be located adjacent to or far from the transmission UE receiving PSFCH. For example, a UE-A may be located adjacent to the transmission UE receiving PSFCH and a UE-B may be located far from the transmission UE receiving PSFCH. Here, PSFCH transmitted by the UE-A may be received by the transmission UE with high reception power and PSFCH transmitted by the UE-B may be received by the transmission UE with low reception power. When the transmission UE receiving PSFCH configures AGC according to PSFCH of the UE-A, PSFCH transmitted by the UE-A may be quantized at a wide interval. In this case, because PSFCH transmitted by the UE-B has a low reception signal level, PSFCH may unable to be represented by a quantized value. Thus, PSFCH transmitted by the UE-B may not be appropriately received. Similarly, when the transmission UE receiving PSFCH configures AGC according to PSFCH of the UE-B, because PSFCH transmitted by the UE-B has a low reception signal level, a reception signal of PSFCH transmitted by the UE-A may be outside the AGC range and thus may be distorted. Accordingly, PSFCH transmitted by the UE-A may not be appropriately received. In this regard, the receiver of the transmission UE may perform AGC range configuration with sufficient time to obtain many samples during PSFCH reception.

To perform such AGC range configuration, as shown in FIG. 9B, DMRS may not be mapped to a first symbol and SFCI may be mapped. More particularly, as shown in FIG. 9A, when DMRS is mapped to a first symbol and the first symbol is used for AGC range configuration, channel estimation performance using DMRS may deteriorate. Accordingly, when the first symbol is used for AGC range configuration, DMRS may not be mapped to the first symbol as shown in FIG. 9B. As for another example, instead of mapping SFCI to the first symbol, a sequence for helping the transmission UE receiving PSFCH to perform AGC configuration may be transmitted. In other words, a preamble for AGC training may be transmitted from the first symbol of PSFCH. Locations of DMRS mapped to the remaining symbols may be dependent on one of methods described with reference to FIG. 9A, except that DMRS is not mapped to the first symbol. For example, the locations of REs where DMRS is present for each OFDM symbol may be the same or different from each other.

As for another example, in FIG. 9B, an AGC preamble may be transmitted in the first symbol and only SFCI may be transmitted in the second symbol without DMRS. In this case, SFCI may be transmitted in a form of a sequence. For example, in the case of HARQ ACK transmission configured of 1 bit, sequence-A may be used for ACK information transmission and sequence-B may be used for NACK information transmission. Such sequence-based transmission does not require channel estimation for demodulation and decoding, and thus a resource structure of a feedback channel described above may be possible. A sequence-based SFCI transmitting method will be described below with reference to FIG. 10.

Figure 10:
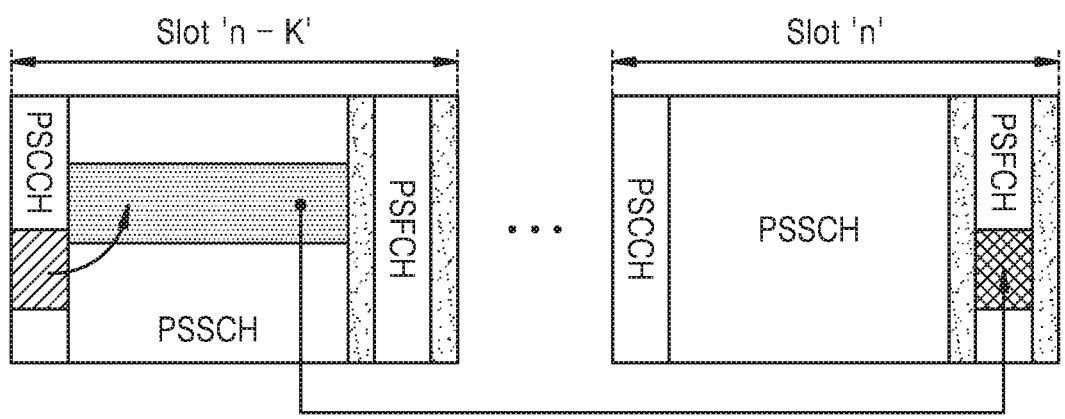
FIG. 10 is a diagram illustrating frequency resource allocation of a sidelink feedback channel according to an embodiment of the disclosure.

FIG. 10 is a diagram illustrating frequency resource allocation of an SL feedback channel according to an embodiment of the disclosure.

Referring to FIG. 10, a V2X transmission UE may transmit PSCCH and PSSCH in a slot n−K. A V2X reception UE may obtain SL control information by decoding PSCCH and obtain information about time/frequency/code resources of PSSCH from the SL control information. In FIG. 10, PSCCH and PSSCH are transmitted in the same slot, but an embodiment of the disclosure is not limited thereto. In other words, PSCCH may be transmitted from the slot n−K, but PSSCH may be transmitted from a slot thereafter. In this case, a time relationship between PSCCH and PSSCH is fixed (for example, PSSCH is transmitted 4 ms after PSCCH is received) or may be configured by a gNB. As for another example, the V2X transmission UE may indicate the time relationship between PSCCH and PSSCH in the SL control information transmitted by the V2X transmission UE. Upon obtaining the SL control information, the V2X reception UE may decode PSSCH via the time relationship between PSCCH and PSSCH and the frequency/code resources of PSSCH.

After receiving and decoding PSCCH and PSSCH transmitted from the V2X transmission UE, the V2X reception UE may feed the V2X transmission UE back with information about whether the decoding of PSSCH is successful (i.e., HARQ-ACK/NACK) via PSFCH. Accordingly, the V2X reception UE needs to determine frequency and time resources of PSFCH for transmitting HARQ-ACK and HARQ-NACK information. In addition, in order for the V2X transmission UE to receive PSFCH from the V2X reception UE, the V2X transmission UE needs to determine the information about the frequency and time resources of PSFCH transmitted by the V2X reception UE.

Various methods of allocating a frequency resource of PSFCH may be present based on a subject that allocates a resource or a design of signaling for resource allocation.

As an example of the subject that allocates a resource, the V2X reception UE may self-select a resource of PSFCH to be transmitted. More particularly, the gNB may configure a PSFCH resource pool to V2X reception UEs in a cell via system information and RRC configuration. When there is no gNB, the PSFCH resource pool may be pre-configured. The V2X reception UEs may each directly select a PSFCH resource to be transmitted from the PSFCH resource pool configured by the gNB or pre-configured. For example, the V2X reception UE may select the PSFCH resource via a sensing operation. However, in this case, because PSFCH is transmittable only when sensing is successful, an HARQ operation may be delayed. Here, the sensing operation may denote an operation of decoding SL control information transmitted via an SL control channel or an operation of decoding the SL control information and measuring reference signal received power (RSRP) via DMRS transmitted to an SL data channel.

As another example of the subject that allocates a resource, the gNB may directly allocate a frequency resource of PSFCH via DCI to the V2X transmission UEs that are to transmit PSFCH. Alternatively, the gNB may configure a set of frequency resources of PSFCH usable by each V2X reception UE as RRC, and indicate which frequency resource is to be used in the set of frequency resources via DCI. Such a method may be applied only when the V2X reception UEs are in an RRC connected state with the gNB. Accordingly, because the V2X reception UEs in the RRC disconnected state need to perform random access to establish RRC connection with the gNB, signaling overhead may be increased. In addition, such a method is not usable when the V2X reception UE is present outside coverage.

As another example of the subject that allocates a resource, the gNB may directly allocate the frequency resource of PSFCH to the V2X transmission UEs that are to receive PSFCH (i.e., the V2X transmission UEs transmitting PSCCH and PSSCH) via DCI. Alternatively, the gNB may configure a set of frequency resources of PSFCH usable by each V2X transmission UE as RRC, and indicate which frequency resource is to be used among the set of frequency resources via DCI. Such a method may be used in the mode 1 resource allocation method described with reference to FIGS. 2A and 2B. However, in the mode 1 resource allocation method, the gNB may transmit frequency resource allocation information of PSCCH and PSSCH to the V2X transmission UE via DCI. Accordingly, when the frequency resource allocation information of PSFCH is included in DCI, an amount of resource allocation information transmitted via DCI may be increased. In addition, as described above, such a method is applicable only in the mode 1 resource allocation method and is not usable in the mode 2 resource allocation method.

In this regard, in FIG. 10, an association between a frequency resource of PSSCH transmitted by the V2X transmission UE (i.e., received by the V2X reception UE) and a frequency resource of PSFCH transmitted by the V2X reception UE (i.e., received by the V2X transmission UE) needs to be introduced, and at least one of following methods may be used.

Method 1) A start physical resource block (PRB) index of PSSCH transmitted by a V2X transmission UE from slot n–K may be associated with a start PRB index of PSFCH transmitted by a V2X reception UE from slot n. Such methods will be described below with reference to FIGS. 11, 12, 13A to 13E, 14, and 15.

For example, when the start PRB index of PSSCH is M in slot n–K, the start PRB index of PSFCH in slot n may also be M. As for another example, when the start PRB index of PSSCH in slot n–K is M, PSFCH may start from M+offset (or M–offset) in slot n. Here, a unit of offset is PRB and an offset value may be a fixed value identically used for all V2X UEs or a value differently configured for each resource pool. For example, the offset value may be 10 in a first resource pool and the offset value may be 20 in a second resource pool. Here, K may be a value equal to or greater than 0

Similarly, a last PRB index of PSSCH transmitted by a V2X transmission UE from slot n–K may be associated with a start PRB index of PSFCH transmitted by a V2X reception UE from slot n.

Method 2) A start PRB index of PSCCH transmitted by a V2X transmission UE from slot n–K may be associated with a start PRB index of PSFCH transmitted by a V2X reception UE from slot n. The method 2 will be described below with reference to FIGS. 16, 17, 18, and 19.

The method 2 is similar to the method 1, but unlike method 1, the start PRB index of PSFCH may be associated with PSCCH instead of PSSCH. For example, when the start PRB index of PSCCH is M in slot n–K, the start PRB index of PSFCH in slot n may also be M. As for another example, when the start PRB index of PSCCH in slot n–K is M, PSFCH may start from M+offset (or M–offset) in slot n. Here, a unit of offset is PRB and an offset value may be a fixed value identically used for all V2X UEs or a value differently configured for each resource pool. For example, the offset value may be 10 in a first resource pool and the offset value may be 20 in a second resource pool. Here, K may be a value equal to or greater than 0.

Method 3) Unlike the methods 1 and 2, a start PRB index of PSFCH may not be associated with any of PSSCH and PSCCH.

For example, a V2X transmission UE may transmit a start PRB index of PSFCH to a V2X reception UE via SL control information. Such information may be a value configured or indicated by a gNB to the V2X transmission UE. In other words, the gNB may transmit, via system information or RRC configuration, or indicate, via DCI, the start PRB index of PSFCH to the V2X transmission UE. Upon receiving the start PRB index of PSFCH, the V2X transmission UE may transmit the corresponding information to the V2X reception UE via SL control information. Here, the number of PRBs configuring PSFCH may be always fixed. Alternatively, the number of PRBs may also be received from the gNB via DCI together with the start PRB index of PSFCH and transmitted to the V2X reception UE by being included in the SL control information.

As for another example, a start PRB index (or last PRB index) of PSFCH may be inferred by a V2X reception UE via destination ID or source ID transmitted via PSCCH or PSSCH. In addition, a V2X transmission UE may transmit, to the V2X reception UE, information about the number of PRBs configuring PSFCH, via SCI. Alternatively, the number of PRBs configuring PSFCH may be always fixed.

As for another example, a gNB may transmit, to a V2X transmission UE, a set of start PRB indexes of PSFCH via system information or RRC configuration, and upon receiving the set of start PRB indexes of PSFCH, the V2X transmission UE may select one of values included in the set and transmit the selected value to a V2X reception UE via SL control information.

As described in the above examples, a frequency resource of PSFCH may require, in addition to information about a start PRB of a frequency, information about the number of RBs configuring PSFCH. The information about the number of PRBs configuring PSFCH may use at least one of following methods in addition to the above methods.

A PSFCH format 1 may transmit HARQ-ACK or HARQ-NACK information configured of 1 bit or 2 bits. When 1-bit HARQ-ACK/NACK information is transmitted, a sequence 1 may denote HARQ-ACK information and a sequence 2 may denote HARQ-NACK information. When 2-bit HARQ-ACK/NACK information is transmitted, 4 sequences may be used, wherein a sequence 1 may denote (ACK, ACK), a sequence 2 may denote (ACK, NACK), a sequence 3 may denote (NACK, NACK), and a sequence 4 may denote (NACK, ACK). Thus, the PSFCH format 1 may be referred to as using sequence-based transmission. On the other hand, HARQ-ACK/NACK information of two or more bits may be transmitted. In this case, channel coding may be used and such a format may be referred to as a PSFCH format 2. For convenience of description, two PSFCH formats are described, but more PSFCH formats may be present based on a type of SL feedback information transmitted to PSFCH and based on a bit size of SL feedback information transmitted to PSFCH.

The same number of PRBs may be used regardless of a PSFCH format. In this case, a value of PRB is fixed and pre-identified by all V2X UEs. As for another example, different fixed values may be used based on PSFCH formats. In other words, the PSFCH format 1 may use one PRB and the PSFCH format 2 may use four PRBs.

As for another example, the number of PRBs used in PSFCH may be different based on configuration of gNB or pre-configuration. For example, the gNB may include presence or absence of PSFCH to resource pool configuration information and when PSFCH is present in a corresponding resource pool, may include information about the number of PRBs configuring PSFCH.

In groupcast or unicast communication, HARQ-ACK/NACK information transmitted by one V2X reception UE may be transmitted via one PSFCH resource or two PSFCH resources. When transmitted via one PSFCH resource, the above-described methods may be applied. However, when transmitted via two PSFCH resources (i.e., when one PSFCH resource is used for HARQ-ACK transmission and the remaining PSFCH resource is used for HARQ-NACK transmission), a method for notifying start points of two PSFCH resources is required.

When the two PSFCH resources are continuously present, a start PRB index of a first PSFCH resource may be derived from a start PRB index of PSSCH as described above. In other words, the start PRB index of the first PSFCH may be, in the above example, M or M+offset (or M−offset). Thereafter, the start PRB index of the second PSFCH resource may be determined based on the number of PRBs configuring the first PSFCH resource. For example, when it is assumed that the number of PRBs configuring the first PSFCH resource is [X1], the start PRB index of the second PSFCH resource may be M+[X1] or M+offset+[X1] (or M−offset−[X1]). Here, [X1] may be a fixed value or may be configured from a gNB or a V2X transmission UE.

When the two PSFCH resources are not continuous, the start PRB index of the first PSFCH resource may be derived from the start PRB index of PSSCH as described above, and the start PRB index of the second PSFCH resource may be configured via a separate offset. For example, the start PRB index of the first PSFCH may be, in the above example, M or M+offset1 (or M−offset1). In addition, the start PRB index of the second PSFCH resource may be M+offset2 or M+offset1+offset2 (or M−offset1−offset2). Here, offset1 denotes a difference between the start PRB index of PSSCH and the start PRB index of first PSFCH resource, and offset2 denotes a difference between the start PRB index of the first PSFCH resource and the start PRB index of the second PSFCH resource.

As for another example, the start PRB index of the second PSFCH resource may be M+[X1]+offset2 or M+offset1+[X1]+offset2 (or M−offset1−[X1]−offset2). Here, [X1] indicates the number of PRBs configuring the first PSFCH resource and may be a fixed value or configured by the gNB or V2X transmission UE. In addition, in the above example, offset1 may denote a difference between the start PRB index of PSSCH and the start PRB index of first PSFCH resource. In addition, offset2 denotes a difference between the start PRB index of the first PSFCH resource and the start PRB index of the second PSFCH resource.

Figure 11:
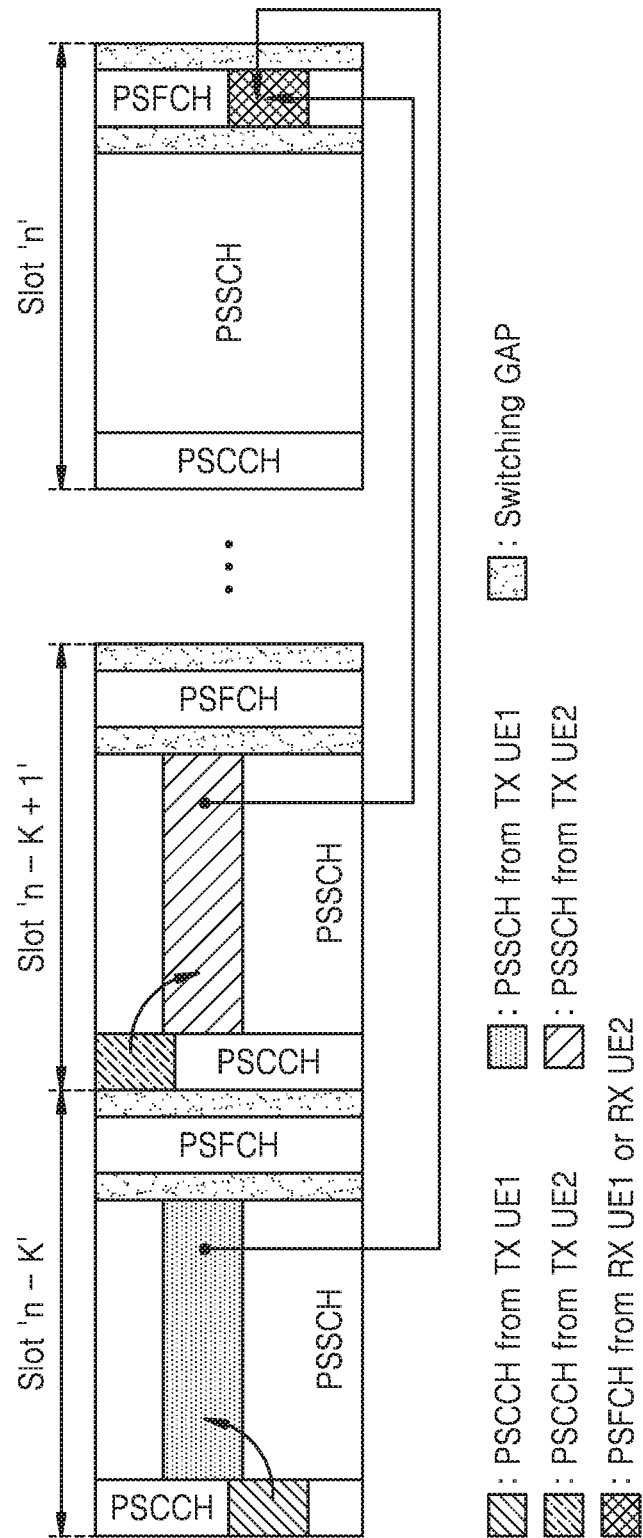
FIG. 11 is a diagram illustrating of frequency resource allocation of a sidelink feedback channel according to an embodiment of the disclosure.

FIG. 11 is a diagram illustrating of frequency resource allocation of an SL feedback channel according to an embodiment of the disclosure.

Referring to FIG. 11, it illustrates a case in which start PRB indexes of PSSCH transmitted by different V2X transmission UEs are the same. In other words, a start PRB index of PSSCH transmitted by a first V2X transmission UE to a first V2X reception UE in slot n−K and a start PRB index of PSSCH transmitted by a second V2X transmission UE to a second V2X reception UE in slot n−K+1 are the same. Because PSSCH transmitted in different slots use the same start PRB index, start PRB indexes of PSFCH become the same and thus collision between PSFCH may occur when the methods described with reference to FIG. 10 are applied. Such an issue may occur not only when different V2X transmission UEs transmit PSSCH to different V2X reception UEs as shown in FIG. 11, but also when different V2X transmission UEs transmit PSSCH to the same V2X reception UE (i.e., PSCCH/PSSCH transmitted by the first V2X transmission UE and PSCCH/PSSCH transmitted by the second V2X transmission UE are transmitted to the first V2X reception UE). One of following methods may be used to resolve such collision of PSFCH.

Method 1) A Start PRB Index of PSSCH and V2X UE ID Indicate a Start PRB Index of PSFCH V2X UE ID may denote destination ID or source ID, or both destination ID and source ID. [X1] bit of destination ID configured of [X] bits may be transmitted via PSCCH and the remaining [X2] bit may be included in MAC PDU transmitted via PSSCH, wherein [X]=[X1]+[X2]. [Y1] bit of source ID configured of [Y] bits may be transmitted via PSCCH and the remaining [Y2] bit may be included in MAC PDU transmitted via PSSCH, wherein [Y]=[Y1]+[Y2]. Here, [X2] and [Y2] may be 0 bit. This indicates that destination ID and source ID are transmitted only via PSCCH. Alternatively, [X1] and [Y1] may be 0 bit. This indicates that destination ID and source ID are transmitted only via PSSCH.

A V2X reception UE may decode PSCCH transmitted from different V2X transmission UEs in different slots, and obtain a part of V2X UE ID information (when bits of destination ID or source ID are divided and transmitted via MAC PDU of PSCCH and PSSCH) or the entire V2X UE ID (when the bits of destination ID and source ID are transmitted only via PSCCH). When decoding of PSCCH is successful, the V2X reception UE may obtain information about a frequency resource of PSSCH and obtain the part of V2X UE ID (when the bits of destination ID or source ID are divided and transmitted via MAC PDU of PSCCH and PSSCH) or the entire V2X UE ID (when the bits of destination ID and source ID are transmitted only via PSCCH).

The destination ID is ID for identifying a reception UE of PSSCH transmitted by a V2X transmission UE. In addition, the source ID is ID for identifying a transmission UE of PSSCH transmitted by a V2X transmission UE. The method 1 may be sub-divided as following methods based on whether source ID or destination ID is used to identify a start PRB index of PSFCH.

Method 1-1) When the Source ID is Used

Because different V2X transmission UEs may transmit different PSSCH to the same V2X reception UE, when a start PRB index of PSSCH transmitted from different slots via destination ID is offset, the same destination ID is used and thus collision of PSFCH may still occur. Accordingly, a start PRB index of PSFCH may be offset by using source ID.

More particularly, as shown in FIG. 11, PSCCH-1 or PSSCH-1 transmitted by the first V2X transmission UE in slot n−K has source ID 1. PSCCH-2 or PSSCH-2 transmitted by the second V2X transmission UE in slot n−K+1 has source ID 2. Because different source IDs are used even when PSCCH-1 and PSSCH-2 have the same start PRB index, a start PRB index of PSFCH transmitted in slot n may be different. In other words, different source IDs may provide different offsets to a start PRB index of PSFCH.

Here, a relationship between source ID and the offset of the start PRB index of PSFCH may be pre-configured or may be configured by a gNB or a higher layer of a UE. As for another example, source ID may be converted into a decimal number and interpreted as an offset. More particularly, source ID may be configured of 4 bits and source ID 1=0011 and source ID 2=1011. In this case, when source ID 1 is converted into a decimal number, source ID 1=3 and source ID 2=11. Accordingly, PSFCH corresponding to PSSCH-1 transmitted by the first V2X transmission UE may have offset 3 and PSFCH corresponding to PSSCH-2 transmitted by the second V2X transmission UE may have offset 11. For convenience of description, source ID is configured of 4 bits, but the number of bits of source ID may be greater (for example, 24 bits). In this case, an offset value becomes very high, and thus may be outside an index range of a frequency resource in a corresponding resource pool. Here, a modulo operation may be performed. In addition, in the above example, all bits configuring source ID represent an offset value by being converted into a decimal number, but a partial bit (for example, most significant bit (MSB) [K1] bit or least significant bit (LSB) [L1] bit) of source ID may be converted into a decimal number to be interpreted as an offset.

Method 1-2) When Destination ID is Used

One V2X transmission UE may transmit PSSCH to different V2X reception UEs in different slots. In this case, source ID may be the same but destination ID may be different, and thus collision of PSFCH may still occur when a start PRB index of PSFCH is determined by using source ID. Accordingly, the start PRB index of PSFCH may be offset by using destination ID and the methods described with respect to when source ID is used may be used.

Figure 12:
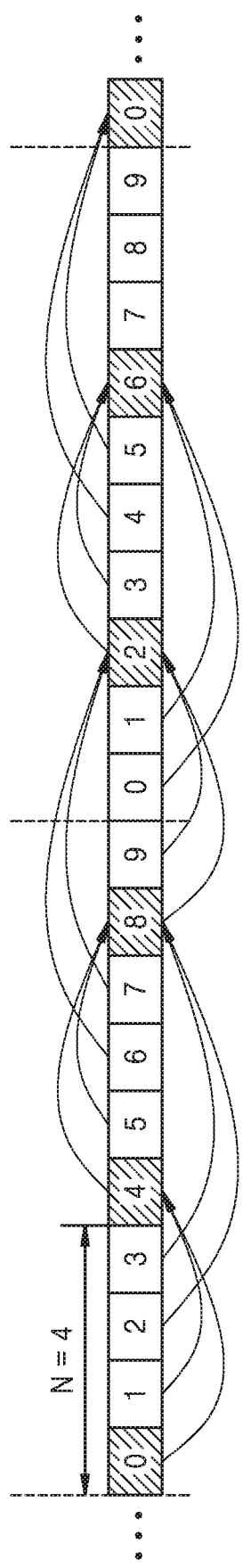
FIG. 12 is a diagram illustrating of time axis resource allocation of a sidelink feedback channel according to an embodiment of the disclosure.
Figure 13A:
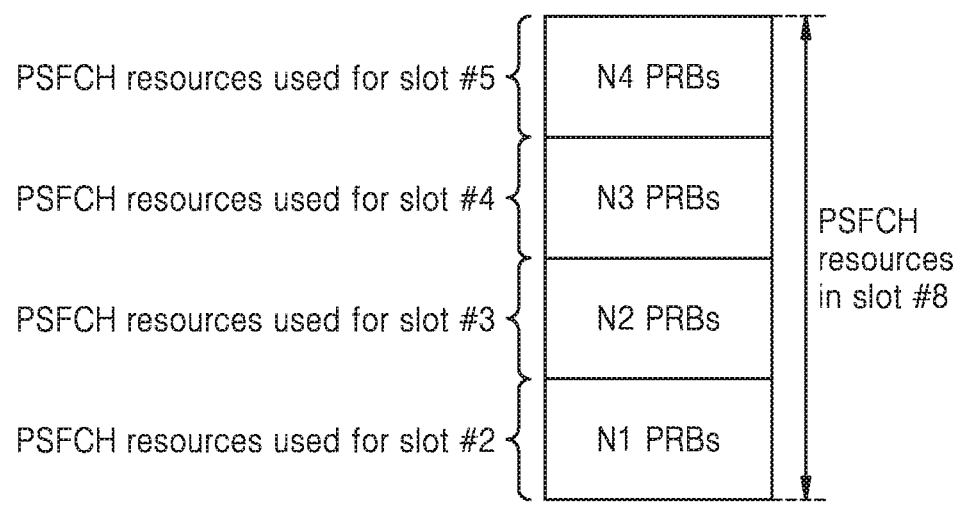
FIG. 13A is a diagram illustrating of frequency resource allocation of a sidelink feedback channel according to an embodiment of the disclosure.

Method 2) A Start PRB Index of PSSCH and an Index of a Slot where PSSCH is Transmitted Indicate a Start PRB Index of PSFCH As shown in FIG. 13A, a frequency resource of PSFCH may be grouped into frequency resources usable in each slot. In other words, HARQ-ACK/NACK information is transmittable in slot #8 in FIG. 12 when V2X reception UE received PSSCH in slot 2, slot 3, slot 4, and slot 5. Accordingly, the number of groups into which frequency sources are divided in a slot where PSFCH is transmittable may be determined based on a value of K and a value of N or based on one of the values K and N (in FIG. 12, K is 3 and N is 4, and in FIG. 13A, frequency resources of PSFCH are divided into 4 groups). As shown in FIG. 13A, frequency resources of PSFCH usable by each group (i.e., the number of PRBs configuring PSFCH) may be the same or different from each other. The start PRB index of PSFCH may be determined based on such grouping and an association with a start PRB index of PSSCH described with reference to FIGS. 8A and 8B. Accordingly, even when different PSSCHs are transmitted by using the same start PRB index in different slots, the start PRB indexes of PSFCHs are configured differently and thus collision of PSFCH may be prevented.

FIG. 12 is a diagram illustrating of time axis resource allocation of an SL feedback channel according to an embodiment of the disclosure.

Referring to FIG. 12, a time axis resource of PSFCH has a period of 4 slots (N=4) starting from a slot 0. Accordingly, PSFCH may be present in slot 0, slot 4, slot 8, slot 2, and slot 6. In addition, in FIG. 12, a time relationship, i.e., K, between PSSCH transmitted by a V2X transmission UE (i.e., PSSCH received by a V2X reception UE) and PSFCH to be transmitted by the V2X reception UE is assumed to be 3 slots. In other words, the V2X reception UE is unable to decode PSSCH transmitted from the V2X transmission UE and transmit PSFCH by preparing HARQ-ACK information and HARQ-NACK information within a time shorter than 3 slots. Thus, as shown in FIG. 12, HARQ-ACK/NACK information corresponding to PSSCH received by the V2X reception UE in slot 0 and slot 1 may be transmitted in slot 4. HARQ-ACK/NACK information corresponding to PSSCH received by the V2X reception UE in slot 2, slot 3, slot 4, and slot 5 may be transmitted in slot 8. In addition, HARQ-ACK/NACK information corresponding to PSSCH received by the V2X reception UE in slot 6, slot 7, slot 8, and slot 9 may be transmitted in slot 2.

FIG. 13A is a diagram illustrating of frequency resource allocation of an SL feedback channel according to an embodiment of the disclosure.

Referring to FIG. 13A, frequency resources of PSFCH are grouped to solve a collision issue of PSFCH described with reference to FIG. 11. As shown in FIG. 13A, frequency resources of PSFCH may be grouped into frequency resources usable in each slot. In other words, HARQ-ACK/

NACK information is transmittable in slot #8 in FIG. 12 when a V2X reception UE received PSSCH in slot 2, slot 3, slot 4, and slot 5. Accordingly, the number of groups into which frequency sources are divided in a slot where PSFCH is transmittable may be determined based on one of a value of K and a value of N or based on both the values K and N (in FIG. 12, K is 3 and N is 4, and in FIG. 13A, frequency resources of PSFCH are divided into 4 groups). As shown in FIG. 13A, frequency resources of PSFCH usable by each group (i.e., the number of PRBs configuring PSFCH) may be the same or different from each other. A start PRB index of PSFCH may be determined based on such grouping and an association with a start PRB index of PSSCH described with reference to FIGS. 8A and 8B. Accordingly, even when different PSSCHs are transmitted by using the same start PRB index in different slots, the start PRB indexes of PSFCHs are configured differently and thus a collision of PSFCH may be prevented.

Figure 13B:
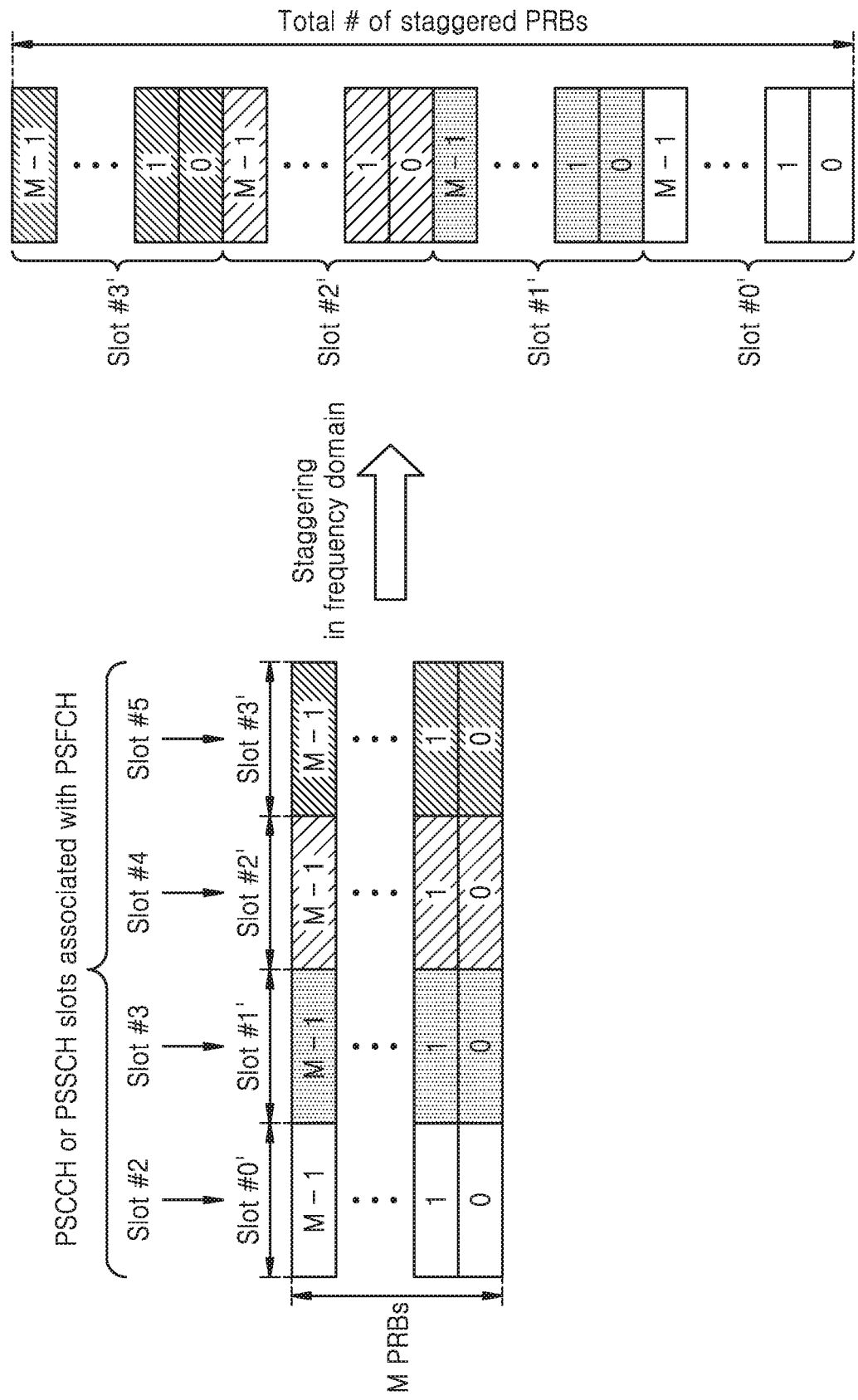
FIG. 13B is a diagram illustrating a specific example of frequency resource allocation of a sidelink feedback channel according to an embodiment of the disclosure.

FIG. 13B is a diagram illustrating a specific example of frequency resource allocation of an SL feedback channel according to an embodiment of the disclosure.

Referring to FIG. 13B, it is a specific embodiment of the disclosure of FIG. 13A, and as shown in FIG. 12, a PSFCH resource associated with PSCCH or PSSCH received by a reception UE in slot indexes 2, 3, 4, and 5 is present in a slot index 8. The total number of PSCCH or PSSCH reception slots associated with the PSFCH transmission resource is defined as L (L=4 in FIGS. 12 and 13A). In addition, the number of PRBs configuring each of PSCCH or PSSCH reception slots associated with the PSFCH transmission resource may be defined as M. Here, M may be defined as the total number of PRBs configuring one SL resource pool, and the total number of PRBs in a frequency axis in the SL resource pool may be the same throughout all slots configuring the SL resource pool. In the above embodiments of the disclosure, sets of PSCCH or PSSCH reception slots associated with the PSFCH transmission resource (in other words, slots 2, 3, 4, and 5 shown in FIGS. 12, 13A, and 13B) may be physically continuous or logically continuous (when continuous logically, discontinuous physically). In addition, M PRBs configuring each PSCCH or PSSCH reception slot may be physically continuous or logically continuous.

PSCCH or PSSCH reception slot indexes 2, 3, 4, and 5 associated with the PSFCH transmission resource in FIG. 13B may respectively be interpreted as slot indexes 0', 1', 2', and 3'. In general, when it is assumed that physically continuous or discontinuous L PSCCH or PSSCH reception slots associated with the PSFCH transmission resource are present, the PSCCH or PSSCH reception slots may be interpreted as slot indexes 0' through (L-1)' in a time order. In FIG. 13B, L=4 and thus the PSCCH or PSSCH reception slots may be respectively interpreted as slot indexes 1' through 3' in a time order.

As shown in FIGS. 10 and 11, when a transmission frequency resource of PSFCH is associated with a reception frequency resource of PSCCH or PSSCH, a location of the reception frequency resource of PSCCH or PSSCH received by each reception UE may be mapped to a location of a frequency resource for transmitting PSFCH. Thus, the number of PSFCH transmission resources equal to the total number of receivable resource of PSCCH or PSSCH may be required. For example, when a minimum transmission resource unit transmittable by one transmission UE is 1 PRB, maximum M PSCCH or PSSCH may be received in the slot index 1' of FIG. 13B. Accordingly, the total number of frequency resources of PSCCH or PSSCH associated with the frequency resource of PSFCH may be (4×M) PRBs. In generalization, the total number of frequency resources of PSCCH or PSSCH associated with PSFCH transmission may be (L×M) PRBs. Here, as described above, L may denote the total number of PSCCH or PSSCH reception slots associated with the PSFCH transmission resource.

(L×M) PRB indexes indicating start locations of frequency resources receivable by PSCCH or PSSCH described above may be mapped to start points of frequency resources for PSFCH transmission as shown in FIG. 13B. In other words, PRB indexes 0 through M-1 of the slot index 0', PRB indexes 0 through M-1 of the slot index 1', PRB indexes 0 through M-1 of the slot index 2' and PRB indexes 0 through M-1 of the slot index 3' may be mapped in the stated order in a frequency axis. Based on such a mapping rule, a reception UE that received PSCCH or PSSCH as the PRB index 0 of the slot index 2' as a start point and a reception UE that received PSCCH or PSSCH as the PRB index 0 of the slot index 3' as a start point may consider a PSFCH frequency resource mapped to corresponding slot index and PRB index as a start point of a frequency resource for PSFCH transmission.

In generalization, when an index of a PSCCH or PSSCH reception slot (i.e., slot 2 (or slot 0') slot 3 (or slot 1'), slot 4 (or slot 2'), or slot 5 (or slot 3') in FIG. 13B) associated with a frequency resource for PSFCH transmission is defined as 'l' and an index of PRB in each slot is defined as 'm', a start index of PSFCH frequency resource in a slot where PSFCH is transmitted may be determined by 'l+m+offset'. Here, an offset value is a parameter for reducing inter-cell interference and is assumed that offset=0 in FIG. 13B, but the offset value may have different values for each cell. The offset value may be configured by a gNB to a UE via system information or RRC configuration, or may be derived via cell ID detected by the UE from a synchronization signal of the gNB (or virtual cell ID configured by the gNB). For example, a UE that obtained '0' from a value of 0, 1, or 2 obtained via cell ID mod 3 operation may apply offset=0, and a UE that obtained '1' may apply offset=z, and a UE that obtained '2' may apply offset=2z. Here, z is a fixed value and may be known by all gNB and UEs.

A reception UE needs to verify the number of PRBs required for PSFCH transmission in addition to a start point (i.e., a start PRB index) of a frequency resource for PSFCH transmission. Here, it may be assumed that the reception UE verified the number of PRBs required for PSFCH before PSFCH transmission. For example, the number of PRBs required for PSFCH transmission may be a fixed value (i.e., 2 PRBs) or may be configured via system information, RRC, or PC5-RRC of a gNB.

As described above, when a minimum resource unit usable by one UE for PSCCH or PSSCH transmission is 1 PRB, (L×M) start indexes of PSFCH frequency resources may be required. Here, when the number of PRBs required for PSFCH transmission is 1, (L×M) PSFCH frequency resources may be required. However, when the number of PRBs required for PSFCH is 'R' that is greater than 1, (L×M×R) PRBs may be required for PSFCH frequency resources. In this case, PSFCH frequency resources may be insufficient in a slot where PSFCH is transmitted. For example, when SL BWP is set to 20 MHz and one SL resource pool is configured in SL BWP, 100 PRB may be present in the SL resource pool. When a minimum transmission resource of PSCCH or PSSCH is assumed to be 1 PRB and the number of PRBs required for PSFCH transmission is assumed to be 1, 400(=4×100) PSFCH frequency resources may be required in FIG. 13B. Because one resource pool is configured of 100 PRBs, in the above example, 300 UEs may be unable to perform PSFCH transmission. In the above example, when the number of PRBs required for PSFCH is increased to 2, 800(=4×100×2) PSFCH frequency resources are required, and thus the PSFCH frequency resources may further be insufficient.

Figure 13C:
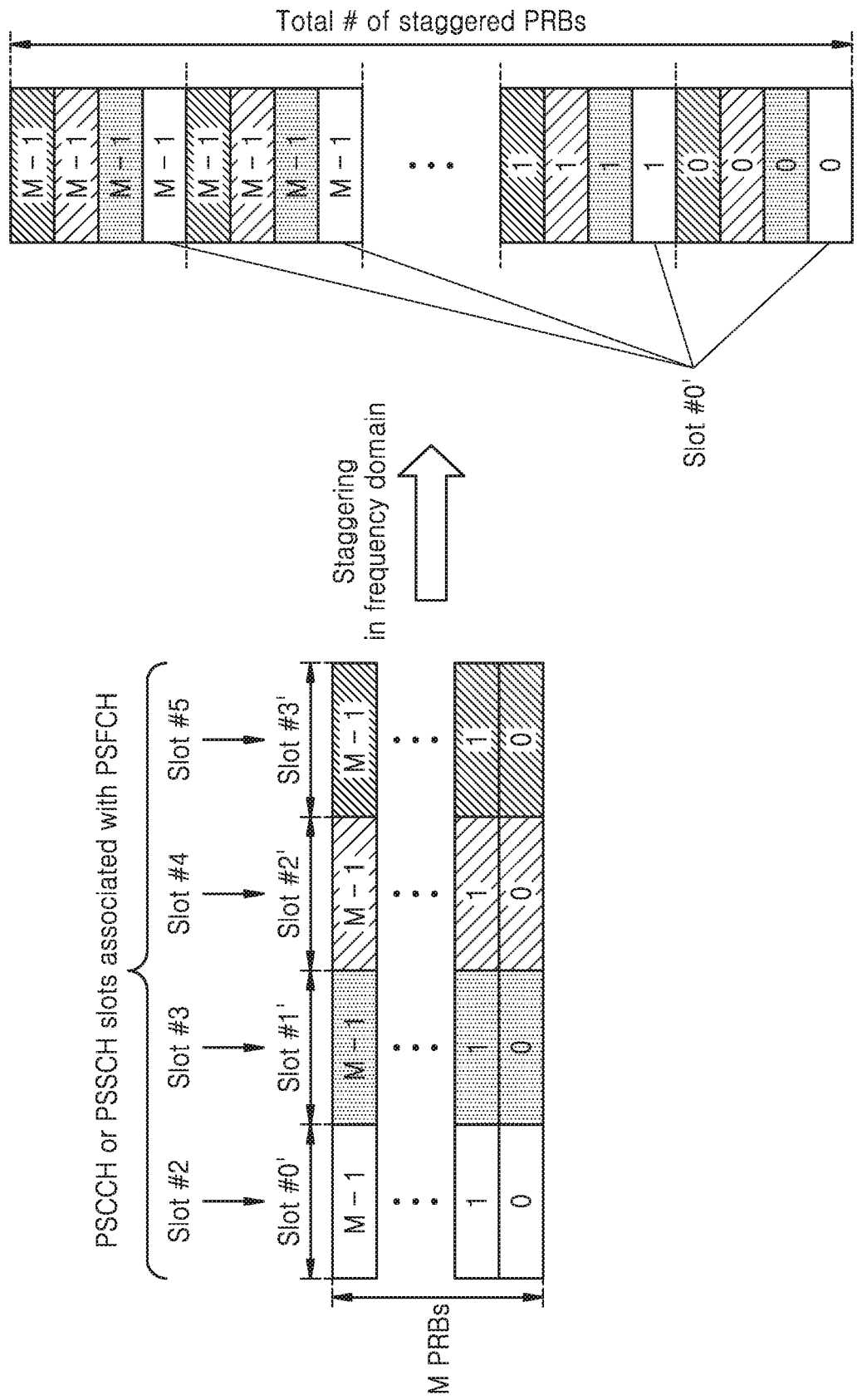
FIG. 13C is a diagram illustrating of frequency resource allocation of a sidelink feedback channel according to an embodiment of the disclosure.

FIG. 13C is a diagram illustrating of frequency resource allocation of an SL feedback channel according to an embodiment of the disclosure.

Referring to FIG. 13C, it illustrates another example about mapping between a start index of a frequency resource for PSFCH transmission and a start index of a frequency resource where PSCCH or PSSCH is receivable.

In FIG. 13B, frequency resource indexes of a first slot where PSCCH or PSSCH is received are first sequentially mapped to a start index of a PSFCH frequency resource, and then frequency resource indexes of a next slot are sequentially mapped to the start index of the PSFCH frequency resource. However, in FIG. 13C, indexes of first frequency resources of slots where PSCCH or PSSCH is received are first mapped to a start index of a PSFCH frequency resource, and then next frequency resources are sequentially mapped. A mapping structure of FIG. 13C is different from that of FIG. 13B, but PSFCH frequency resources may be insufficient as in FIG. 13B.

The insufficiency of PSFCH frequency resource described with reference to FIGS. 13B and 13C may become severe when a minimum resource unit of PSCCH or PSSCH transmitted by a transmission UE is small (i.e., 1 PRB) and/or when a minimum resource unit of PSFCH transmitted by a transmission UE is large (i.e., 2 PRBs or greater). The insufficiency may be resolved by increasing the minimum resource unit of PSCCH or PSSCH and decreasing the minimum resource unit of PSFCH transmitted by the reception UE. For example, a PRB group (PRBG) may be generated by grouping two or more PRBs that are physically continuous or logically continuous. Here, PRBG may be referred to as a sub-channel and one sub-channel may be defined as a minimum resource unit for PSCCH, PSSCH, or PSFCH transmission. A PSCCH sub-channel indicating a minimum resource unit of PSCCH, a PSSCH sub-channel indicating a minimum resource unit of PSSCH, and a PSFCH sub-channel indicating a minimum resource unit of PSFCH may be configured of the same or different numbers of PRBs. For example, the PSCCH sub-channel may be configured of 2 PRBs, the PSSCH sub-channel may be configured of 4 PRBs, and the PSFCH sub-channel may be configured of 1 PRB. However, this is only an example and the numbers of PRBs configuring the PSCCH, PSSCH, and PSFCH sub-channels may be respectively defined as, $\alpha$, $\beta$, $\gamma$. Here, values of $\alpha$, $\beta$, $\gamma$ may be fixed values for each PSCCH, PSSCH, and PSFCH, or may be configured by a gNB. Alternatively, the values may be configured via PC5-RRC or may be pre-configured. As described above, in order to resolve the insufficiency of PSFCH resources, $\alpha > \beta$ (when a PSFCH resource is associated with a PSCCH resource) or $\beta > \gamma$ (when a PSFCH resource is associated with a PSSCH resource) needs to be satisfied.

For example, it may be assumed that the PSCCH sub-channel or PSSCH sub-channel is configured of a PRBs (for convenience of description, it is assumed that the numbers of PRBs configuring the PSCCH sub-channel and PSSCH sub-channel are the same), and the PSFCH sub-channel is configured of $\gamma$PRBs. In addition, as shown in FIGS. 13B and 13C, when it is assumed that each slot configuring an SL resource pool is configured of total M PRBs, it may be considered that slots where PSCCH or PSSCH is receivable (for example, slot 2 (or slot 0'), slot 3 (or slot 1'), slot 4 (or slot 2'), and slot 5 (or slot 3') of FIGS. 13B and 13C) are each configured of M/αPSCCH or PSSCH sub-channels. Here, when M/α is not an integer, rounding down or rounding up may be performed (that is, [M/α] or) [M/α]. Accordingly, total (L×M/α) frequency resources where PSCCH or PSSCH sub-channel is receivable may be present, and thus (L×M/α×γ) PSFCH frequency resources are required in a slot where PSFCH resource is present. In order to resolve the insufficiency of PSFCH frequency resources described above, a condition of L×M/α×γ≤M needs to be satisfied. More particularly, when L=4, M=100, α=4, and γ=1, the condition is satisfied because a left side is 100 and a right side is 100 in the above equation, and thus the insufficiency of PSFCH frequency resources may not occur. However, when L=4, M=100, α=4, and γ=2, the condition is not satisfied because a left side is 200 and a right side is 100 in the above equation, and thus the insufficiency of PSFCH frequency resources may still occur.

Figure 13D:
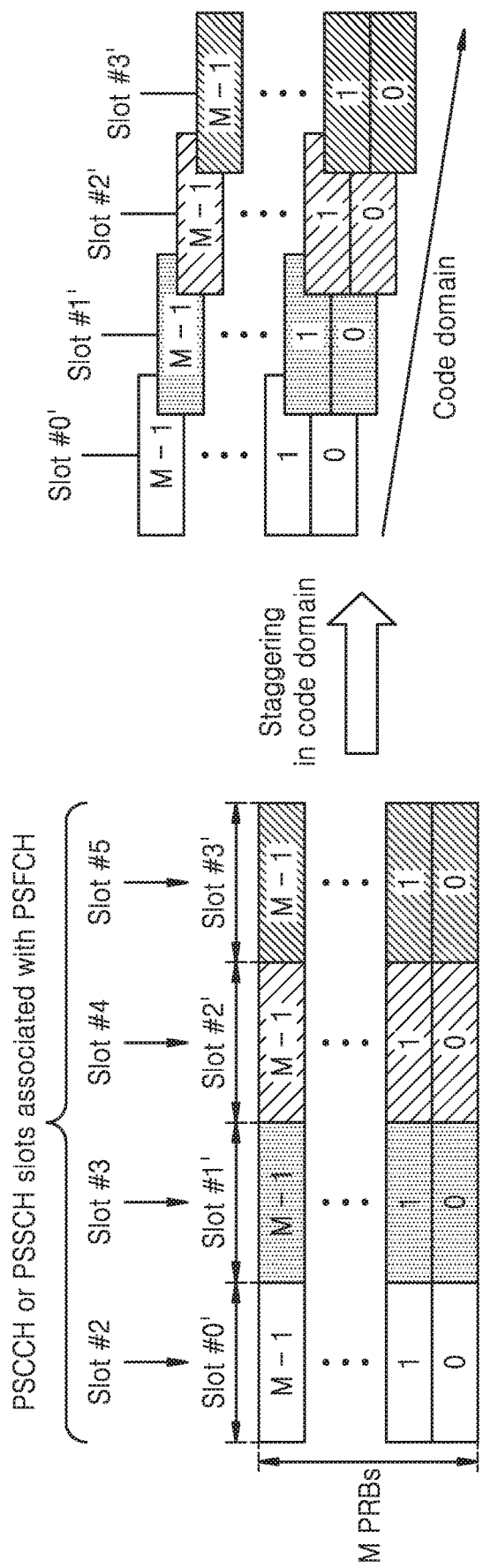
FIG. 13D is a diagram illustrating of frequency resource allocation of a sidelink feedback channel according to an embodiment of the disclosure.

FIG. 13D is a diagram illustrating of frequency resource allocation of an SL feedback channel according to an embodiment of the disclosure.

Referring to FIG. 13D, it illustrates another example about mapping between a start index of a frequency resource for PSFCH transmission and a start index of a frequency resource where PSCCH or PSSCH is receivable.

Unlike FIGS. 13B and 13C, in FIG. 13D, a start index of a frequency resource where PSCCH or PSSCH is receivable in one slot is mapped to a start index of a frequency resource of PSFCH, and a slot index where PSCCH or PSSCH is receivable is mapped to an index of a code resource of PSFCH. In other words, according to FIG. 13D, resource indexes mapped to total (L×M) PRBs may be represented by using M PRBs in a frequency axis and L codes in a code axis. More particularly, when an index of a PSCCH or PSSCH reception slot associated with a frequency resource for PSFCH transmission is defined as '1' and an index of PRB in each slot is defined as 'm', a start index of a PSFCH frequency resource may be determined according to 'm+offset'. In addition, the start index of PSFCH frequency resource is determined according to 'm+offset' regardless of the index of each PSCCH or PSSCH reception slot, and the index of each PSCCH or PSSCH reception slot may be mapped to a code resource. Here, an offset value is a parameter for reducing inter-cell interference and is assumed that offset=0 in FIG. 13D, but the offset value may have different values for each cell. The offset value may be configured by a gNB to a UE via system information or RRC configuration, or may be derived via cell ID detected by the UE from a synchronization signal of the gNB (or virtual cell ID configured by the gNB). For example, a UE that obtained '0' from a value of 0, 1, or 2 obtained via cell ID mod 3 operation may apply offset=0, and a UE that obtained '1' may apply offset=z, and a UE that obtained '2' may apply offset=2z. Here, z is a fixed value and may be known by all gNB and UEs.

A reception UE needs to verify the number of PRBs required for PSFCH transmission in addition to a start point (i.e., a start PRB index) of a frequency resource for PSFCH transmission. It may be assumed that the reception UE verified the number of PRBs required for PSFCH before PSFCH transmission. For example, the number of PRBs required for PSFCH transmission may be a fixed value (i.e., 2 PRBs) or may be configured via system information, RRC, or PC5-RRC of the gNB.

The above example may be applied to the concept of PSCCH, PSSCH, and PSFCH sub-channels. For example, total (L×M/α) PSFCH resource indexes may be represented by using M/αsub-channels in a frequency axis and L codes in a code axis of each slot where PSCCH or PSSCH is receivable. As described above, when the number of PRBs configuring the PSFCH sub-channel is γ, (M/α×γ) PSFCH frequency resources may be present in the frequency axis in the slot where PSFCH resource is present. Because slots configuring an SL resource pool may include total M PRBs in the frequency axis, the insufficiency of PSFCH resources may not occur when a condition of M/α×γ≤M is satisfied. In other words, the insufficiency of PSFCH resources does not occur when α≥γ. Because the size of a bit of SFCI transmitted to PSFCH is very small compared to the size of a bit transmitted to PSCCH or PSSCH (for example, the size of bit of SFCI transmitted to PSFCH is 1 or 2 and the size of bit transmitted to PSCCH or PSSCH is tens to thousands of bits), α may always be greater than or equal to γ. Accordingly, the above condition may be always satisfied and thus the insufficiency of PSFCH resources may not occur.

The examples described with reference to FIGS. 13A through 13D may be applied when a frequency resource of PSCCH or PSSCH transmitted by one transmission UE is associated with a transmission frequency resource of PSFCH transmitted by one reception UE. Unlike the above, in groupcast communication, a frequency resource of PSCCH or PSSCH transmitted by one transmission UE may be associated with transmission frequency resources of PSFCH transmitted by two or more reception UEs. For example, groupcast communication configured of three UEs may be assumed (UE-A, UE-B, and UE-C). Here, the UE-A may be a transmission UE transmitting PSCCH or PSSCH, and the UE-B and UE-C may be reception UEs receiving PSCCH or PSSCH. PSCCH or PSSCH transmitted by the UE-A is received by the UE-B and the UE-C, and upon receiving PSCCH or PSSCH, the UE-B and the UE-C transmit PSFCH to the UE-A. Here, the UE-B and the UE-C may transmit HARQ feedback information by using one of two methods below.

Option 1: NACK information may be transmitted only when decoding of received PSSCH is failed. In other words, when the decoding of PSSCH received from the UE-A is successful, the UE-B and UE-C do not transmit ACK information and may transmit NACK information only when the decoding of PSSCH is failed. Here, UEs transmitting NACK information may transmit the NACK information only when a specific condition is satisfied. More particularly, instead of always transmitting NACK information when the decoding of PSSCH is failed, the UE-B and UE-C may determine an additional condition. Such a condition may be a distance to the UE-A or RSRP. For example, when the NACK information needs to be transmitted to the UE-A because the UE-B failed to decode PSSCH but the condition of distance or RSRP is not satisfied, the UE-B may not transmit the NACK information to the UE-A. When the condition of distance is used, the UE-A that is a transmission UE may transmit its location information to reception UEs (i.e., the UE-B and the UE-C) within a group, and upon receiving the location information, the UE-B and the UE-C may measure a distance between the UE-A and itself by using the location information received from the UE-A and its location information measured by itself. Each reception UE may perform a comparison operation with a distance measured by itself by using a threshold value regarding a distance received from a higher layer. When the distance measured by itself is greater than the threshold value, each reception UE may not transmit NACK information to the UE-A. When the distance measured by itself is smaller than the threshold value, each reception UE may transmit the NACK information to the UE-A. When the condition of RSRP is used, reception UEs (i.e., UE-B and UE-C) in a group may measure RSRP by using a reference signal (for example, DMRS or SL CSI-RS) transmitted by a transmission UE. Each reception UE may perform a comparison operation with RSRP measured by itself by using a threshold value regarding RSRP received from a higher layer. When the RSRP measured by itself is greater than the threshold value, NACK information is not transmitted to the UE-A. When the RSRP measured by itself is smaller than the threshold value, each reception UE may transmit the NACK information to the UE-A.

In option 1, all reception UEs in a group may transmit PSFCH by using the same time/frequency resource. Accordingly, when a PSFCH frequency resource is associated with a frequency resource of PSCCH or PSSCH, reception UEs transmitting PSFCH may transmit PSFCH by using one of the methods described with reference to FIGS. 13A through 13D.

Option 2: Unlike option 1 described above, reception UEs (a UE-B and a UE-C) in the same group performing groupcast communication may each transmit ACK information and NACK information to a UE-A. In other words, a reception UE that successfully decoded PSSCH may transmit ACK information via PSFCH and a reception UE that failed to decode PSSCH may transmit NACK information via PSFCH.

In option 2, information transmitted by reception UEs to a transmission UE (UE-A) may be different (i.e., the UE-B may transmit NACK information and the UE-C may transmit ACK information). Accordingly, in order for the UE-A to accurately decode different pieces of feedback information, the reception UEs in the group need to use different PSFCH transmission resources. In addition, when the UE-B and the UE-C transmit the same information by using the same PSFCH transmission resource (i.e., when both UEs transmit ACK or NACK), it is unable for the UE-A to determine which reception UE transmitted the feedback information. Accordingly, a reception frequency resource of PSCCH or PSSCH needs to be associated with two or more PSFCH frequency resources. Meanwhile, the condition of distance or RSRP described in option 1 may be additionally applied to option 2. In other words, the reception UEs in the group may transmit ACK or NACK information to the transmission UE only when the condition of distance or RSRP is satisfied.

The methods described with reference to FIGS. 13A through 13D are related to when a reception frequency resource of PSCCH or PSSCH is associated to one PSFCH frequency resource, and thus the methods are unable to be applied to option 2. Accordingly, a new method for applying the methods described with reference to FIGS. 13A through 13D to option 2 is required.

More particularly, it has been described in FIGS. 13B and 13C that the condition of L×M/α×γ≤M needs to be satisfied to resolve the insufficiency of PSFCH resources. However, such a condition is applicable only when a PSCCH or PSSCH frequency resource and one PSFCH resource are associated with each other (for example, option 1). In option 2, as described above, the PSCCH or PSSCH frequency resource is associated with two or more PSFCH resources (i.e., reception UEs in a group use different PSFCH resources), and thus the number of reception UEs in the group needs to be considered. Accordingly, when the number of reception UEs in one group is defined as G, a condition of G×L×M/αxγ≤M needs to be satisfied to resolve the insufficiency of PSFCH resources. Applying the example of L=4, M=100, α=4, γ=2 described with reference to FIGS. 13B and 13C, when the number of reception UEs in a group is G=5, a left side is 5×4×100/4×2=1000 and a right side is 100 in the above equation and thus the condition is not satisfied.

In this regard, when the methods of FIGS. 13B and 13C are used, reception UEs in a group may share the same PSFCH frequency resource and may transmit PSFCH by using different codes. For example, groupcast communication may be configured of UE-1 through UE-5, wherein UE-1 is a transmission UE and the remaining UEs may be reception UEs. In FIG. 13B, the UE-1 transmits PSCCH or PSSCH including a start frequency index 0 in a slot index 0' and the reception UEs (the UE-2 through UE-5) receive the PSCCH or PSSCH. The UE-2 through UE-5 may determine that a PSFCH frequency resource having a slot index 0' and a start frequency index 0 is a start frequency index capable of transmitting PSFCH. Here, the UE-2 through UE5 may use the same PSFCH frequency resource but apply different codes. More particularly, the UE-2 through UE-5 may have unique UE ID. Here, the UE ID may be a source ID of each reception UE or a higher layer ID capable of identifying each UE included in the same group in groupcast communication. Each reception UE is aware of its UE ID and may select a code according to the UE ID. Here, the code may denote a root index for determining a sequence or may denote a cyclic shift. As for another example, the code may denote orthogonal cover code (OCC) in a time axis or OCC in a frequency axis. Each reception UE may select a code resource usable by itself via a modular operation between its UE ID and a specific number 'C'. For example, the UE-2 may obtain '0' via a modular operation between its UE ID and 'C', and the UE-3 may obtain '1' via a modular operation between its UE ID and 'C'. Upon obtaining '0', the UE-2 may select a code corresponding to '0' and upon obtaining '1', the UE-3 may select a code corresponding to '1'. The UE-2 and the UE-3 may transmit the selected code via PSFCH to be transmitted after multiplying the code in the time axis or frequency axis. Accordingly, the UE-1 may receive PSFCH transmitted from the UE-2 through UE-5 via different codes in the same PSFCH frequency resource.

In the above example, 'C' may be a fixed value or variable value based on a method of forming a group in groupcast communication. More particularly, information of group members may be exchanged before groupcast communication is performed such that UEs in the group are aware of group destination ID. For example, in the above example, when the UE-1 is a transmission UE and the UE-2 through UE-5 are reception UEs, the UE-1 may be aware of group destination ID to be received by the reception UEs before groupcast transmission. In this case, 'C' may vary based on the number of group members configuring the group and may be set during a process of exchanging information of the group members before groupcast communication is performed. For example, 'C' may be set via PC5-RRC or may be set in resource pool information performing the groupcast communication. Meanwhile, the information of group members may be unknown before the groupcast communication is performed. In this case, the number of group members may be unknown because there is no information of group members. In this case, a fixed value may be used for 'C'. As for another example, a gNB may set 'C' via system information or RRC within coverage of the gNB. Such information may be included in resource pool configuration information for groupcast communication.

In order to solve the insufficiency of PSFCH resources occurred in FIGS. 13B and 13C, PSFCH resources associated with each slot where PSCCH or PSSCH is received are distinguished by using different codes in FIG. 13D. A method of selecting a PSFCH resource to be transmitted by each UE may also be applied to FIG. 13D via a modular operation between UE ID of UE and 'C' in the above example. For example, groupcast communication may be configured of UE-1 through UE-5, wherein UE-1 is a transmission UE and the remaining UEs may be reception UEs. In FIG. 13D, the UE-1 transmits PSCCH or PSSCH including a start frequency index 0 in a slot index 0' and the reception UEs (the UE-2 through UE-5) receive the PSCCH or PSSCH. The UE-2 through UE-5 may determine that a PSFCH frequency resource with a start frequency index 0 is a start frequency index capable of transmitting PSFCH and verify that PSFCH is to be transmitted by using a code 0 because PSCCH or PSSCH is received in a slot index 0'. Here, the UE-2 through UE-5 may use the same code corresponding to the slot index 0' and the same PSFCH frequency resource, and also apply different codes for distinguishing each UE. More particularly, the UE-2 through UE-5 may have unique UE ID. Here, the UE ID may be a source ID of each reception UE or a higher layer ID capable of identifying each UE included in the same group in groupcast communication. Each reception UE is aware of its UE ID and may select a code according to the UE ID. Here, the code may denote a root index for determining a sequence or may denote a cyclic shift. As for another example, the code may denote OCC in a time axis or OCC in a frequency axis. Each reception UE may select a code resource usable by itself via a modular operation between its UE ID and a specific number 'C'. For example, the UE-2 may obtain '0' via a modular operation between its UE ID and 'C', and the UE-3 may obtain '1' via a modular operation between its UE ID and 'C'. Upon obtaining '0', the UE-2 may select a code corresponding to '0' and upon obtaining '1', the UE-3 may select a code corresponding to '1'. The UE-2 and the UE-3 may transmit the selected code via PSFCH to be transmitted after multiplying the code in the time axis or frequency axis. Accordingly, the UE-1 may receive PSFCH transmitted from the UE-2 through UE-5 via different codes in the same PSFCH frequency resource.

In order for SL transmission and reception UEs to correctly transmit and receive PSFCH in FIGS. 12 through 13D, the number of bits of HARQ-ACK/NACK information included in PSFCH needs to be known, and the number of bits may be determined based on a combination of at least one parameters below.

A period of slot where a PSFCH resource is present (i.e., a period of a PSFCH resource in a time axis, N in FIG. 12)

Bundling of HARQ-ACK/NACK information: In FIG. 12, HARQ-ACK/NACK information corresponding to PSSCH received by a V2X reception UE in slots 2 through 5 may be transmitted in slot 8, and HARQ-ACK/NACK bits transmitted in slot 8 may be a value determined via an AND operation of HARQ-ACK/NACK bits in PSSCHs received in slots 2 through 5 (i.e., NACK is determined when even one is NACK).

Usage and configuration of CBG unit retransmission: When CBG unit retransmission is used, HARQ-ACK/NACK feedback may be possible in CBG units as one TB is divided into two or more CBGs. In this case, HARQ-ACK/NACK feedback information of 2 or more bits may be transmitted via PSFCH for one TB.

Number of TBs included in PSSCH: When one PSSCH transmits two TBs, the number of bits of HARQ-ACK/NACK information may be 2 bits (when the CBG unit retransmission is not used).

Number of actually transmitted and received PSSCH: In FIG. 12, HARQ-ACK/NACK feedback information of PSSCHs received in slots 2 through 5 is transmitted in slot 8,. When the SL channel quality is bad, a reception UE may be unable to receive one or more PSSCHs. In this case, the reception UE may generate HARQ-ACK/NACK information based on the number of actually received PSSCHs.

A minimum signal processing time K of a UE for preparing PSSCH processing and PSFCH transmission and a timing relationship between PSSCH reception time point and a PSFCH transmission time point: In FIG. 12, K is 3. A reception UE receiving PSSCH may receive PSSCH in slot 'n' and a PSFCH resource may be present in slot 'n+x'. Here, a reception UE transmitting PSFCH may transmit HARQ-ACK/NACK information of PSSCH described above via PSFCH present in slot 'n+k' by using a smallest value of 'x' among integers greater than or equal to K. In other words, in FIG. 12, a reception UE that received PSSCH in slot 2 (n=2) may be considered. Because a PSFCH resource is present in slot 4 (n+x=4) and slot 8 (n+x=8), in the above example, x=2 (when n+x=4) or x=6 (when n+x=8). When K=3, because the reception UE needs to use the smallest value of 'x' among the integers greater than or equal to K=3, the reception UE may select x=6 to transmit PSFCH in slot 8 in the above example. As for another example, a reception UE that received PSSCH in slot 1 (n=1) in FIG. 12 may be considered. Because a PSFCH resource is present in slot 4 (n+x=4) and slot 8 (n+x=8), in the above example, x=3 (when n+x=4) or x=7 (when n+x=8). When K=3, because the reception UE needs to use the smallest value of 'x' among the integers greater than or equal to K=3, the reception UE may select x=3 to transmit PSFCH in slot 4 in the above example.

A value of K may be determined by an SL UE via at least one combination of the above methods or may be configured via system information, RRC, or PC5-RRC of a gNB.

Method 1) The value of K may be fixed regardless of a size of subcarrier (for example, K=2). This is because, considering processing time capability of a UE, a minimum processing time exceeding 28 symbols in all subcarrier spacing is not defined.

Method 2) The value of K may be determined based on the size of subcarrier being used. For example, K=2 in the case of 15 kHz and 30 kHz, and K=3 in the case of 60 kHz and 120 kHz.

Method 3) The value of K may be configured according to an SL resource pool or pre-configured according to the SL resource pool. As for another example, the value of K may be differently configured according to unicast or groupcast communication in the SL resource pool.

Method 4) The value of K may be determined according to at least one combination of following factors, such as processing capability of a UE and a time interval of PSSCH and PSFCH.

A time point when PSSCH transmission ends, i.e., a last symbol time

A time point when PSFCH transmission starts, i.e., a first symbol time

Processing capability of a UE

A slot boundary time point

The above methods may be modified as follows. When a reception UE received PSSCH in slot n, HARQ-ACK/NACK feedback information of PSSCH may be transmitted in fastest PSFCH among PSFCHs of which an interval of PSSCH and PSFCH in a time axis is greater than or equal to y symbol. y may be a value pre-configured by a transmission UE or a value configured in an SL resource pool where corresponding PSSCH or PSFCH is transmitted. For such configuration, the SL reception UE may exchange its processing capability with the SL transmission UE and in addition, the configuration may vary based on a subcarrier spacing.

As for another example, processing capability of a UE may be divided into two operations of general processing capability (capability type 1) and improved processing capability (capability type 2) such that different values of K are applied based on a subcarrier. More particularly, information about processing capability of SL transmission and reception UEs may be exchanged during a process of establishing RRC configuration of an SL UE and a gNB or establishing PC5-RRC connection between SL UEs. As shown in Table 1, a UE having general processing capability (capability type 1) may apply K=2 when subcarrier spacing (SCS) used in SL transmission and reception is 15 kHz or 30 kHz, and a UE having improved processing capability (capability type 2) may apply K=1 when SCS used in SL transmission and reception is 15 kHz or 30 kHz.

TABLE 1

| SCS | K for Processing Capability Type 1 | K for Processing Capability Type 2 |
| --- | --- | --- |
| 15 kHz | 2 | 1 |
| 30 kHz | 2 | 1 |
| 60 kHz | 3 | 2 |
| 120 kHz | 3 | 2 |

It may be assumed that N=2 and K=1 to describe an example about a size of bits of HARQ-ACK/NACK information configuring PSFCH. In other words, a PSFCH resource is configured in a time axis for each N=2 slot in an SL resource pool and a reception UE has capability of transmitting HARQ-ACK/NACK feedback information regarding PSSCH received in 'n' slot, in 'n+1' slot (K=1). Here, a slot where actual HARQ-ACK/NACK feedback information is transmittable may be determined as shown in FIG. 13E.

Figure 13E:
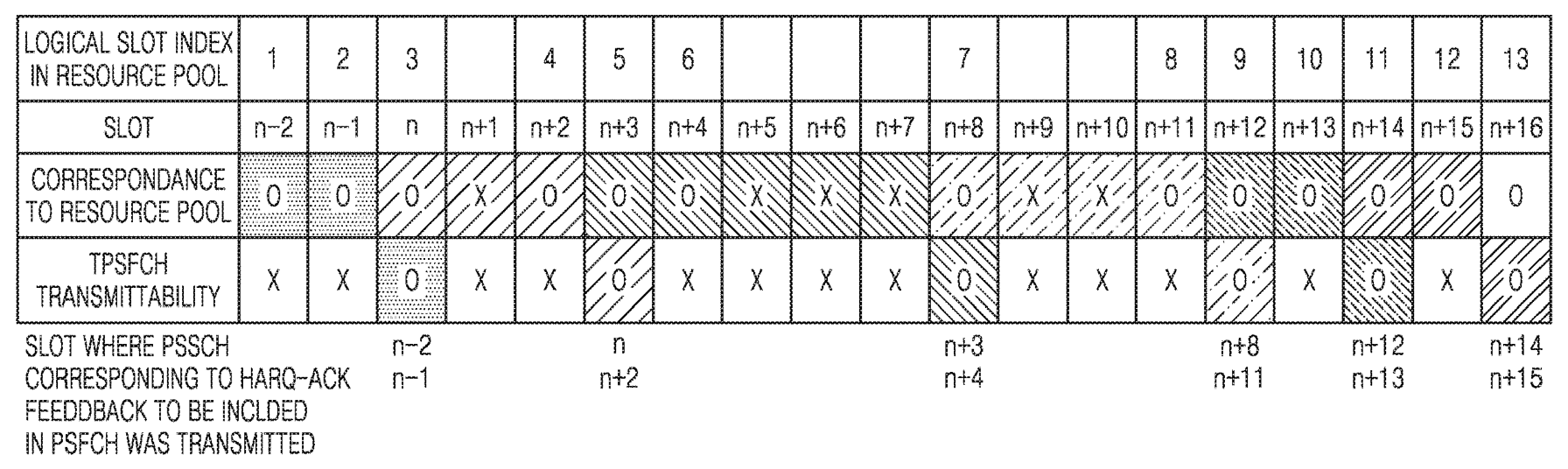

FIG. 13E is a diagram illustrating calculating of a bit number of feedback information transmitted to a sidelink feedback channel according to an embodiment of the disclosure.

Referring to FIG. 13E, a first row denote logical indexes as indexes of slots configuring an SL resource pool. Here, logical slot indexes are assigned only to the lots included in the SL resource pool and are not assigned to slots not included in the SL resource pool. In other words, because 4th, 8th, 9th, 10th, 12th, and 13th slots are not included in the SL resource pool, logical slot indexes are not assigned thereto. Meanwhile, a second row of FIG. 13E illustrates indexes of physical slots, and a slot index may be assigned according to an order of slots regardless of whether the slots are included in the SL resource pool. A third row of FIG. 13E shows whether a corresponding slot is included in the SL resource pool, wherein 0 indicates that a corresponding slot is included in the SL resource pool and X indicates that a corresponding slot is not included in the SL resource pool. A fourth row of FIG. 13E indicates whether PSFCH transmission is possible, wherein 0 indicates a slot capable of PSFCH transmission and X indicates a slot incapable of PSFCH transmission. Here, the slot capable of PSFCH transmission may be included in the SL resource pool, may be determined according to a value of N calculated based on a logical slot index, and assumes N=2 (i.e., a PSFCH resource may be present for each 2 slots based on the logical slot index). A fifth row of FIG. 13E may denote a slot where PSSCH corresponding to HARQ-ACK/NACK information transmitted to PSFCH is received. For example, PSFCH transmitted in a physical slot index n may include HARQ feedback information regarding PSSCH transmitted in slot n−1 and slot n−2.

As shown in the fifth row of FIG. 13E, the number of bits of HARQ-ACK/NACK feedback information transmitted by each reception UE via PSFCH from the slot capable of PSFCH may be 2 bits. In other words, each reception UE may determine the number of bits of HARQ-ACK/NACK feedback information to be included in PSFCH when transmitting PSFCH from a certain slot based on slots included in the SL resource pool, slots where PSFCH resources are present, a period N where a PSFCH resource is configured, and a value of K configured or determined according to processing capability of a UE. More particularly, the number of bits of the HARQ-ACK/NACK feedback information may be determined according to Equation 1 below.

Number of bits of HARQ-ACK to be included in PSFCH transmitted from physical slot n=number of slots included in SL resource pool among slots from physical slot $$(k-K+1) \text{ to physical slot } (n-K) \quad \text{Equation 1}$$

In Equation 1, a physical slot index k may be an index of a slot where a PSFCH resource configured immediately before PSFCH transmittable from a physical slot n is included.

As for another example, when values of N and K are provided, the maximum number of bits of HARQ-ACK feedback information transmitted by a reception UE from one PSFCH may be fixed (i.e., all reception UEs transmit HARQ-ACK feedback information configured of the same number of bits). Such a fixed size of the maximum number of bits of HARQ-ACK feedback information may be defined as the maximum number of bits of HARQ-ACK feedback information transmitted by one reception UE from one PSFCH, and may be determined by Equation 2 below.

$$\text{Maximum number of bits of HARQ-ACK/NACK feedback information transmittable by reception UE from one PSFCH} = N+K-1 \quad \text{Equation 2}$$

As for another example, when feedback information is transmitted in SL unicast or groupcast communication, the number of bits of feedback information may be calculated by using the number of slots included in an SL resource pool, N, K, and the number of slots where PSSCH associated with HARQ-ACK feedback information transmitted via PSFCH from a slot transmitting PSFCH is transmittable. In the above examples, the number of bits of HARQ-ACK feedback information transmitted by a reception UE may become greater than a certain value or above, according to a combination of values of N and K. In this case, because PSFCH needs to transmit more number of bits, a reception error rate of PSFCH may be increased. Accordingly, the reception UE may transmit only last K bits among bits of feedback information to be transmitted (i.e., transmit only HARQ-ACK/NACK feedback information regarding recently received PSSCH) and may not transmit remaining bits.

Meanwhile, a PSFCH resource may be present in a particular slot but an SL slot where PSSCH associated with HARQ-ACK/NACK feedback information is to be transmitted may not be present in the particular slot. In other words, there may be a case where the PSFCH resource of the particular slot does not have a bit of feedback information to be transmitted, according to values of N and K, and configuration of an SL resource pool. In this case, a reception UE may consider that there is no PSFCH resource even when the PSFCH resource is configured in a corresponding slot. In other words, despite that a PSFCH resource is configured to be present, the reception UE may not perform transmission of PSFCH by ignoring the PSFCH resource. In this case, the reception UE may perform transmission and reception of control information and/or PSSCH in a corresponding slot.

When HARQ-ACK/NACK is mentioned in the embodiments of the disclosure, PSSCH may be unicast or groupcast PSSCH configured or indicated to transmit HARQ-ACK/NACK. In other words, a suggested technique may not be applied to PSSCH where HARQ-ACK/NACK is not required to be transmitted (PSSCH where HARQ-ACK/NACK is not configured). In addition, in the embodiments of the disclosure, control information scheduling PSSCH may denote PSCCH but is not limited thereto. In other words, the control information is not necessarily transmitted only via PSCCH (for example, the control information may be transmitted via PSSCH). In addition, the control information may be one piece of control information, but a plurality of pieces of control information may schedule one PSSCH.

Figure 14:
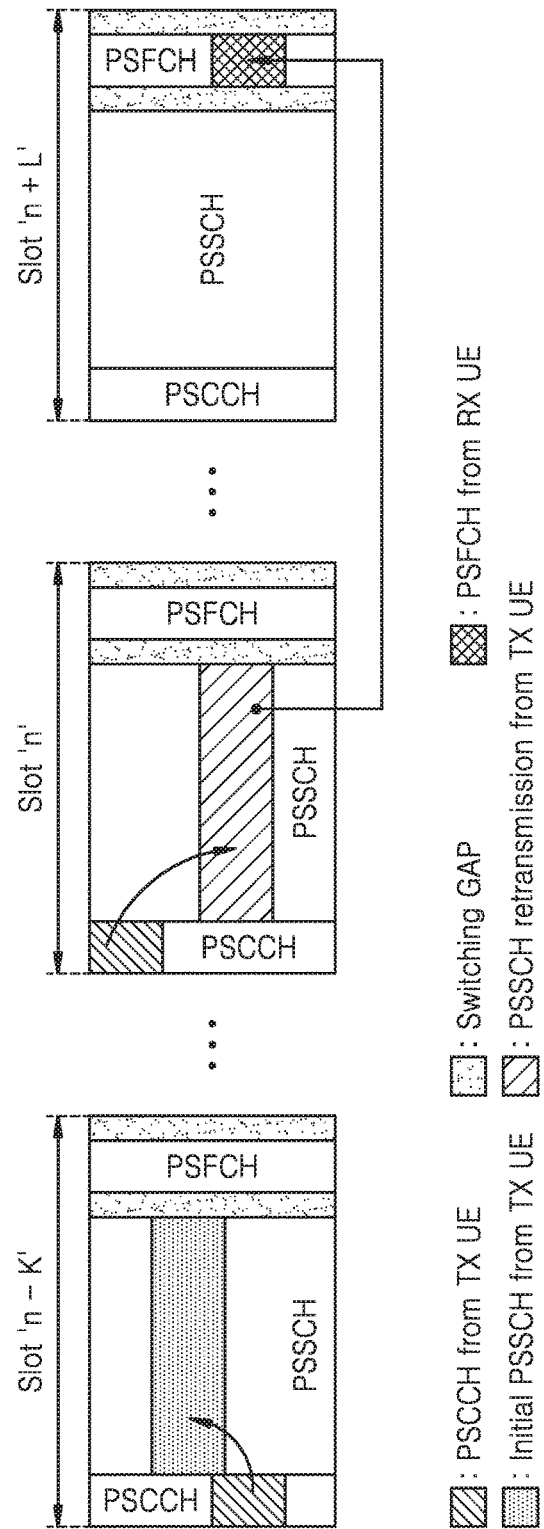
FIG. 14 is a diagram illustrating of frequency resource allocation of a sidelink feedback channel according to an embodiment of the disclosure.

FIG. 14 is a diagram illustrating of frequency resource allocation of an SL feedback channel according to an embodiment of the disclosure.

Unlike FIG. 10, FIG. 14 illustrates a case in which the same TB is repeatedly transmitted through two or more slots via slot aggregation or blind retransmission. As described with reference to FIG. 10, FIG. 14 illustrates that a start PRB index of last PSSCH (or a last PRB index of last PSSCH) transmitted by a V2X transmission UE may be associated with a start PRB index of PSFCH transmitted by a V2X reception UE.

Referring to FIG. 14, the V2X transmission UE may transmit PSCCH and PSSCH in slot n−K and repeatedly transmit PSCCH and PSSCH in slot n. The V2X reception UE may obtain SL control information by decoding PSCCH and obtain information about time/frequency/code resources of PSSCH from the SL control information. In addition, the V2X reception UE may obtain information about a redundancy version (RV) and a new data indicator (NDI) from the SL control information. Based on such information, the V2X reception UE may determine whether TB transmitted in the slot n is new TB or TB repeatedly transmitted in the slot n−K.

In addition, the V2X transmission and reception UEs may be configured with information about the number of aggregated slots (when slot aggregation is configured) or the maximum number of repetitive transmission (when blind retransmission is configured). Through such information, the V2X transmission UE and the V2X reception UE may determine a slot where last PSSCH of a certain TB is transmitted or whether PSSCH in a corresponding slot is last transmission.

Accordingly, as shown in FIG. 14, when the start PRB index of PSSCH is M in slot n, the start PRB index of PSFCH in slot n+L may also be M. As for another example, when the start PRB index of PSSCH in slot n is M, PSFCH may start from M+offset (or M−offset) in slot n+L. Here, a unit of offset is PRB and an offset value may be a fixed value identically used for all V2X UEs or a value differently configured for each resource pool. For example, the offset value may be 10 in a first resource pool and the offset value may be 20 in a second resource pool.

Similarly, a last PRB index of PSSCH transmitted by the V2X transmission UE from slot n may be associated with a start PRB index of PSFCH transmitted by the V2X reception UE from slot n+L.

In FIG. 14, PSCCH and PSSCH are transmitted in the same slot, but an embodiment of the disclosure is not limited thereto. The information about the number of RBs configuring PSFCH may use at least one of the methods described with reference to FIG. 10.

FIG. 14 illustrates PSSCH that is repeatedly transmitted via at least two slots (repetitive transmission via blind retransmission or via slot aggregation). Here, in a slot where PSSCH is transmitted, PSCCH including control information of corresponding PSSCH may also be transmitted. In FIG. 14, because the start PRB index of the last transmitted PSSCH and the start PRB index of PSFCH are associated with each other, when the V2X reception UE is unable to decode the last transmitted PSSCH, the V2X reception UE may be unable to obtain information about the start PRB index of PSFCH. In this regard, the V2X reception UE may determine the start PRB index of PSFCH by using the start PRB index of last PSSCH that is received by itself (or successfully decoded by itself).

Meanwhile, PSSCH may be transmitted always at the same frequency location regardless of the number of repetitive transmissions or the number of slots used in slot aggregation. In this case, the V2X reception UE may determine the start PRB index of PSFCH from the start PRB index of corresponding PSSCH, based on arbitrary PSSCH among PSSCHs that are received by itself (or successfully decoded by itself).

In groupcast or unicast communication, HARQ-ACK/NACK information transmitted by one V2X reception UE may be transmitted via one PSFCH resource or two PSFCH resources. When transmitted via one PSFCH resource, the methods described in FIG. 14 may be applied. However, when transmitted via two PSFCH resources (i.e., when one PSFCH resource is used for HARQ-ACK transmission and the remaining PSFCH resource is used for HARQ-NACK transmission), a method for notifying start points of two PSFCH resources is required.

When two PSFCH resources are present continuously, the start PRB index of the first PSFCH resource may be derived from the start PRB index of the last PSSCH as described with reference to FIG. 14 (or derived from the start PRB index of the last PSSCH that is successfully received by a V2X UE). In other words, the start PRB index of the first PSFCH may be, in the above example, M or M+offset (or M−offset). Thereafter, the start PRB index of the second PSFCH resource may be determined based on the number of PRBs configuring the first PSFCH resource. For example, when it is assumed that the number of PRBs configuring the first PSFCH resource is [X1], the start PRB index of the second PSFCH resource may be M+[X1] or M+offset+[X1] (or M−offset−[X1]). Here, [X1] may be a fixed value or may be configured from a gNB or a V2X transmission UE.

When two PSFCH resources are not present continuously, the start PRB index of the first PSFCH resource may be derived from the start PRB index of the last PSSCH as described with reference to FIG. 14 (or derived from the start PRB index of the last PSSCH that is successfully received by a V2X UE). In addition, the start PRB index of the second PSFCH resource may be configured via a separate offset. For example, the start PRB index of the first PSFCH may be, in the above example, M or M+offset1 (or M−offset1). In addition, the start PRB index of the second PSFCH resource may be M+offset2 or M+offset1+offset2 (or M−offset1−offset2). Here, offset1 denotes a difference between the start PRB index of PSSCH and the start PRB index of first PSFCH resource, and offset2 denotes a difference between the start PRB index of the first PSFCH resource and the start PRB index of the second PSFCH resource.

As for another example, the start PRB index of the second PSFCH resource may be M+[X1]+offset2 or M+offset1+[X1]+offset2 (or M−offset1−[X1]−offset2). Here, [X1] indicates the number of PRBs configuring the first PSFCH resource and may be a fixed value or configured by the gNB or V2X transmission UE. In addition, in the above example, offset1 may denote a difference between the start PRB index of PSSCH and the start PRB index of first PSFCH resource. In addition, offset2 denotes a difference between the start PRB index of the first PSFCH resource and the start PRB index of the second PSFCH resource.

Although not described in FIG. 14, one of the methods described with reference to FIGS. 13B through 13D may be applied to FIG. 14.

Figure 15:
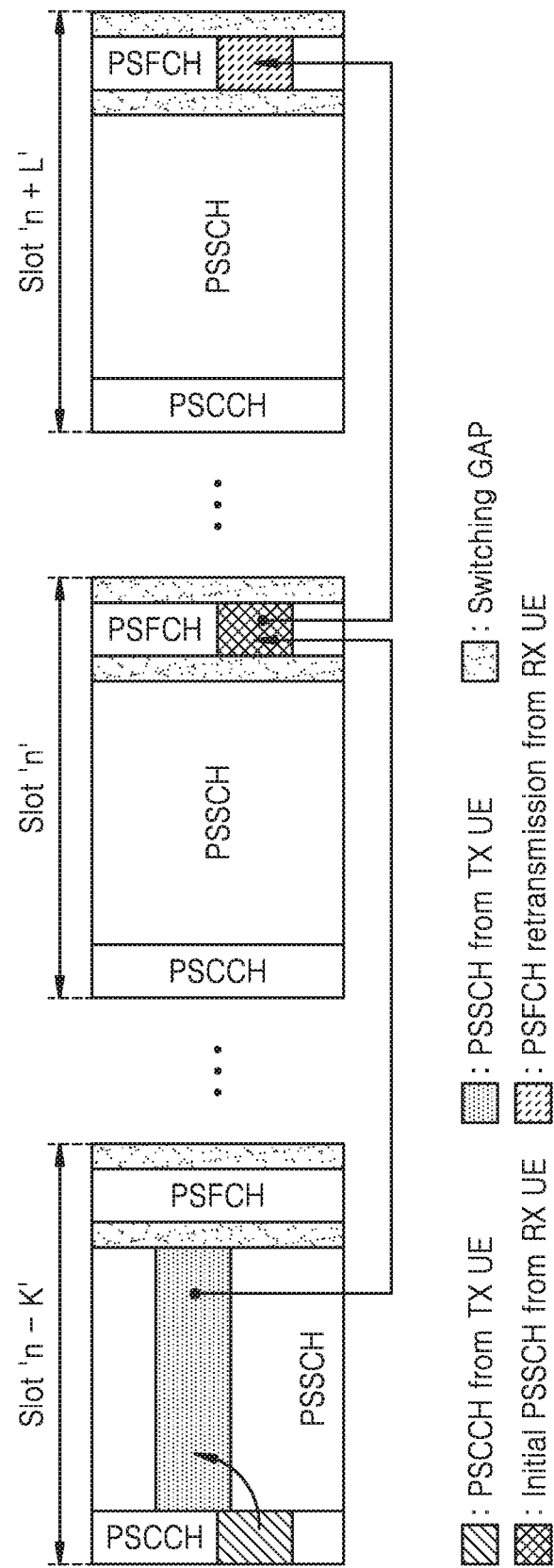
FIG. 15 is a diagram illustrating of frequency resource allocation of a sidelink feedback channel according to an embodiment of the disclosure.

FIG. 15 is a diagram illustrating of frequency resource allocation of an SL feedback channel according to an embodiment of the disclosure.

Unlike FIGS. 10 through 14, FIG. 15 illustrates a case in which PSFCH is repeatedly transmitted. In this case, a start PRB index (or a last PRB index) of PSSCH may indicate a start PRB index of PSFCH that is initially transmitted via one of the methods described with reference to FIGS. 10 through 14.

Referring to FIG. 15, it may be assumed that a V2X transmission UE receiving PSFCH and a V2X reception UE transmitting PSFCH pre-verified the number of repetitive transmission of PSFCH. For example, the number of repetitive transmission of PSFCH may be included in resource pool configuration information and configured by a gNB or pre-configured when there is no gNB.

Accordingly, one of following methods may be used as a method of configuring a start PRB index of PSFCH that is transmitted $X^{th}$, wherein X is an integer greater than 1.

For example, a PRB index that is the same as a start PRB index of PSFCH that is initially transmitted may be used. As for another example, when an offset value is applied in determining the start PRB index of PSFCH that is initially transmitted, the offset value may be identically applied. More particularly, when the start PRB index of PSFCH that is initially transmitted is M+offset (or M−offset), the start PRB index of PSFCH that is transmitted second may be M+offset+offset (or M−offset−offset). In the above example, M denotes the start PRB index or last PRB index of PSSCH.

As for another example, different offset values may be used every PSFCH transmission. In other words, when the start PRB index of PSFCH that is initially transmitted is M+offset1 (or M−offset1), the start PRB index of PSFCH that is transmitted second may be M+offset1+offset2 (or M−offset1−offset2). Here, offset1 and offset 2 may be configured by the gNB or may be pre-configured when there is no gNB.

The number of PRBs configuring PSFCH may be the same for initial transmission and retransmission of PSFCH. As for another example, the number of PRBs used for initial transmission of PSFCH and the number of PRBs used for retransmission of PSFCH may be different from each other. For example, when the number of PRBs used for initial transmission is Y1, the number of PRBs used for second transmission may be Y1+Z1. Here, Z1 may be a fixed value or a value that is configured by the gNB or pre-configured. The number of PRBs of PSFCH that is transmitted third may be Y1+Z1+Z2. Here, Z2 and Z1 may be the same value or different values. Similarly, Z2 may be a fixed value or a value that is configured by the gNB or pre-configured. The methods described above may be applied to the number of PRBs of PSFCH that is transmitted fourth.

Although not described in FIG. 15, one of the methods described with reference to FIGS. 13B through 13D may be applied to FIG. 15.

Figure 16:
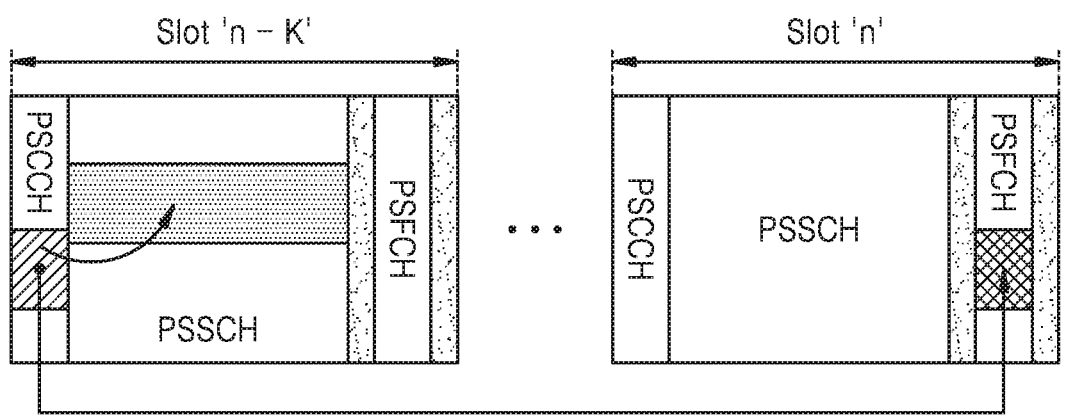
FIG. 16 is a diagram illustrating of frequency resource allocation of a sidelink feedback channel according to an embodiment of the disclosure.

FIG. 16 is a diagram illustrating of frequency resource allocation of an SL feedback channel according to an embodiment of the disclosure.

In FIG. 10, a frequency resource of PSSCH is associated with a frequency resource of PSFCH. However, unlike FIG. 10, in FIG. 16, a frequency resource of PSCCH is associated with a frequency resource of PSFCH.

Referring to FIG. 16, a V2X transmission UE may transmit PSCCH and PSSCH in a slot n−K. A V2X reception UE may obtain SL control information by decoding PSCCH and obtain information about time/frequency/code resources of PSSCH from the SL control information. In FIG. 16, PSCCH and PSSCH are transmitted in the same slot, but an embodiment of the disclosure is not limited thereto. In other words, PSCCH may be transmitted from the slot n−K, but PSSCH may be transmitted from a slot thereafter. In this case, a time relationship between PSCCH and PSSCH is fixed (for example, PSSCH is transmitted 4 ms after PSCCH is received) or may be configured by a gNB. As for another example, the V2X transmission UE may indicate the time relationship between PSCCH and PSSCH in the SL control information transmitted by the V2X transmission UE. Upon obtaining the SL control information, the V2X reception UE may decode PSSCH via the time relationship between PSCCH and PSSCH and the frequency/code resources of PSSCH.

A start PRB index of PSCCH transmitted by the V2X transmission UE from slot n−K may be associated with a start PRB index of PSFCH transmitted by the V2X reception UE from slot n. For example, when the start PRB index of PSCCH is M in slot n−K, the start PRB index of PSFCH in slot n may also be M. As for another example, when the start PRB index of PSCCH in slot n−K is M, PSFCH may start from M+offset (or M−offset) in slot n. Here, a unit of offset is PRB and an offset value may be a fixed value identically used for all V2X UEs or a value differently configured for each resource pool. For example, the offset value may be 10 in a first resource pool and the offset value may be 20 in a second resource pool.

Similarly, a last PRB index of PSCCH transmitted by the V2X transmission UE from slot n−K may be associated with a start PRB index of PSFCH transmitted by the V2X reception UE from slot n.

The information about the number of RBs configuring PSFCH may use at least one of the methods described with reference to FIGS. 8A through 10.

In FIG. 16, one piece of SL control information is transmitted in one slot, but alternatively, two pieces of SL control information may be transmitted in one slot. For example, the SL control information may be divided into two groups, wherein first SL control information includes essential information (for example, destination ID and information related to a sensing operation) and in addition, may include time/frequency/code resource allocation information about when second SL control information for decoding the second SL control information is transmitted. The second SL control information may include time/frequency/code resource allocation information of a SL data channel for decoding the SL data channel. In this case, a start PRB index of PSFCH may be associated with a start PRB index (or last PRB index) of PSSCH where the first SL control information is transmitted. As for another example, the start PRB index of PSFCH may be associated with a start PRB index (or last PRB index) of PSSCH where the second SL control information is transmitted.

In groupcast or unicast communication, HARQ-ACK/NACK information transmitted by one V2X reception UE may be transmitted via one PSFCH resource or two PSFCH resources. When transmitted via one PSFCH resource, the above-described methods may be applied. However, when transmitted via two PSFCH resources (i.e., when one PSFCH resource is used for HARQ-ACK transmission and the remaining PSFCH resource is used for HARQ-NACK transmission), a method for notifying start points of two PSFCH resources is required.

When the two PSFCH resources are continuously present, a start PRB index of a first PSFCH resource may be derived from a start PRB index of PSSCH as described above. In other words, the start PRB index of the first PSFCH may be, in the above example, M or M+offset (or M−offset). Thereafter, the start PRB index of the second PSFCH resource may be determined based on the number of PRBs configuring the first PSFCH resource. For example, when it is assumed that the number of PRBs configuring the first PSFCH resource is [X1], the start PRB index of the second PSFCH resource may be M+[X1] or M+offset+[X1] (or M−offset−[X1]). Here, [X1] may be a fixed value or may be configured from a gNB or a V2X transmission UE.

When the two PSFCH resources are not continuous, the start PRB index of the first PSFCH resource may be derived from the start PRB index of PSCCH as described above, and the start PRB index of the second PSFCH resource may be configured via a separate offset. For example, the start PRB index of the first PSFCH may be, in the above example, M or M+offset1 (or M−offset1). In addition, the start PRB index of the second PSFCH resource may be M+offset2 or M+offset1+offset2 (or M−offset1−offset2). Here, offset1 denotes a difference between the start PRB index of PSCCH and the start PRB index of first PSFCH resource, and offset2 denotes a difference between the start PRB index of the first PSFCH resource and the start PRB index of the second PSFCH resource.

As for another example, the start PRB index of the second PSFCH resource may be M+[X1]+offset2 or M+offset1+[X1]+offset2 (or M−offset1−[X1]−offset2). Here, [X1] indicates the number of PRBs configuring the first PSFCH resource and may be a fixed value or configured by the gNB or V2X transmission UE. In addition, in the above example, offset1 may denote a difference between the start PRB index of PSCCH and the start PRB index of first PSFCH resource. In addition, offset2 denotes a difference between the start PRB index of the first PSFCH resource and the start PRB index of the second PSFCH resource.

Although not described in FIG. 16, one of the methods described with reference to FIGS. 13B through 13D may be applied to FIG. 16.

Figure 17:
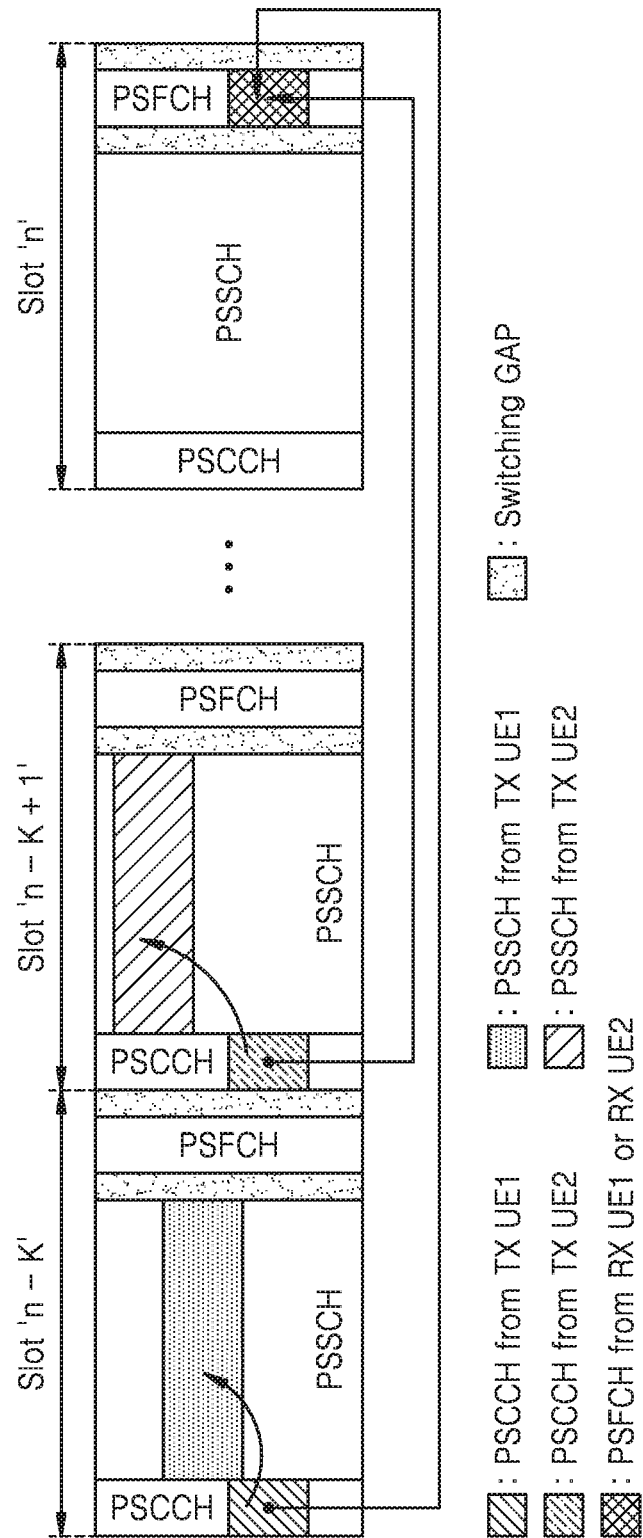
FIG. 17 is a diagram illustrating of frequency resource allocation of a sidelink feedback channel according to an embodiment of the disclosure.

FIG. 17 is a diagram illustrating of frequency resource allocation of an SL feedback channel according to an embodiment of the disclosure.

Referring to FIG. 17, it illustrates a case in which start PRB indexes of PSCCH transmitted by different V2X transmission UEs are the same. In other words, a start PRB index of PSCCH transmitted by a first V2X transmission UE to a first V2X reception UE in slot n−K and a start PRB index of PSCCH transmitted by a second V2X transmission UE to a second V2X reception UE in slot n−K+1 are the same. Because PSCCH transmitted in different slots use the same start PRB index, start PRB indexes of PSFCH become the same and thus collision between PSFCH may occur when the methods described with reference to FIG. 16 are applied. Such an issue may occur not only when different V2X transmission UEs transmit PSCCH to different V2X reception UEs as shown in FIG. 17, but also when different V2X transmission UEs transmit PSCCH to the same V2X reception UE (i.e., PSCCH/PSSCH transmitted by the first V2X transmission UE and PSCCH/PSSCH transmitted by the second V2X transmission UE are transmitted to the first V2X reception UE). One of following methods may be used to resolve such collision of PSFCH.

Method 1) A start PRB index of PSCCH and V2X UE ID indicate a start PRB index of PSFCH Method 1-1) When the source ID is used Method 1-2) When destination ID is used Method 2) A start PRB index of PSCCH and an index of a slot where PSSCH is transmitted indicate a start PRB index of PSFCH Detailed operations of the above methods are identical to operations described with reference to FIG. 11.

Although not described in FIG. 17, one of the methods described with reference to FIGS. 13B through 13D may be applied to FIG. 17.

Figure 18:
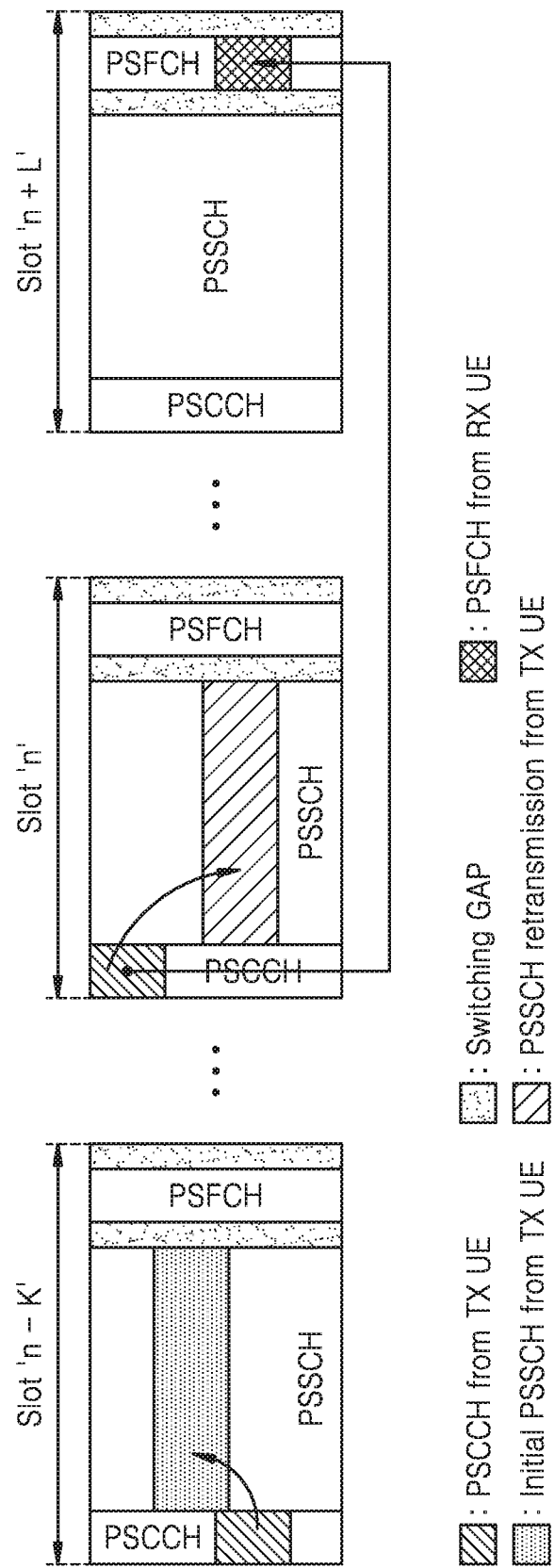
FIG. 18 is a diagram illustrating of frequency resource allocation of a sidelink feedback channel according to an embodiment of the disclosure.

FIG. 18 is a diagram illustrating of frequency resource allocation of an SL feedback channel according to an embodiment of the disclosure.

Unlike FIGS. 16 and 17, FIG. 18 illustrates a case in which the same TB is repeatedly transmitted through two or more slots via slot aggregation or blind retransmission. As described with reference to FIG. 16, FIG. 18 illustrates that a start PRB index of last PSCCH (or a last PRB index of last PSCCH) transmitted by a V2X transmission UE may be associated with a start PRB index of PSFCH transmitted by a V2X reception UE.

Referring to FIG. 18, the V2X transmission UE may transmit PSCCH and PSSCH in slot n−K and repeatedly transmit PSCCH and PSSCH in slot n. The V2X reception UE may obtain SL control information by decoding PSCCH and obtain information about time/frequency/code resources of PSSCH from the SL control information. In addition, the V2X reception UE may obtain information about RV and NDI from the SL control information. Based on such information, the V2X reception UE may determine whether TB transmitted in the slot n is new TB or TB repeatedly transmitted in the slot n−K.

In addition, the V2X transmission and reception UEs may be configured with information about the number of aggregated slots (when slot aggregation is configured) or the maximum number of repetitive transmission (when blind retransmission is configured). Through such information, the V2X transmission UE and the V2X reception UE may determine a slot where last PSSCH of a certain TB is transmitted or whether PSSCH in a corresponding slot is last transmission.

Accordingly, as shown in FIG. 18, when the start PRB index of PSCCH is M in slot n, the start PRB index of PSFCH in slot n+L may also be M. As for another example, when the start PRB index of PSCCH in slot n is M, PSFCH may start from M+offset (or M−offset) in slot n+L. Here, a unit of offset is PRB and an offset value may be a fixed value identically used for all V2X UEs or a value differently configured for each resource pool. For example, the offset value may be 10 in a first resource pool and the offset value may be 20 in a second resource pool.

Similarly, a last PRB index of PSCCH transmitted by the V2X transmission UE from slot n may be associated with a start PRB index of PSFCH transmitted by the V2X reception UE from slot n+L.

In FIG. 18, PSCCH and PSSCH are transmitted in the same slot, but an embodiment of the disclosure is not limited thereto. The information about the number of RBs configuring PSFCH may use at least one of the methods described with reference to FIGS. 10, 11, 14, and 15.

FIG. 18 illustrates PSSCH that is repeatedly transmitted via at least two slots (repetitive transmission via blind retransmission or via slot aggregation). Here, in a slot where PSSCH is transmitted, PSCCH including control information of corresponding PSSCH may also be transmitted. In FIG. 12, because the start PRB index of the last transmitted PSCCH and the start PRB index of PSFCH are associated with each other, when the V2X reception UE is unable to decode the last transmitted PSCCH, the V2X reception UE may be unable to obtain information about the start PRB index of PSFCH. In this regard, the V2X reception UE may determine the start PRB index of PSFCH by using the start PRB index of last PSCCH that is received by itself (or successfully decoded by itself).

Meanwhile, PSCCH may be transmitted always at the same frequency location regardless of the number of repetitive transmissions or the number of slots used in slot aggregation. In this case, the V2X reception UE may determine the start PRB index of PSFCH from the start PRB index of corresponding PSCCH, based on arbitrary PSCCH among PSCCHs that are received by itself (or successfully decoded by itself).

In groupcast or unicast communication, HARQ-ACK/NACK information transmitted by one V2X reception UE may be transmitted via one PSFCH resource or two PSFCH resources. When transmitted via one PSFCH resource, the above-described methods may be applied. However, when transmitted via two PSFCH resources (i.e., when one PSFCH resource is used for HARQ-ACK transmission and the remaining PSFCH resource is used for HARQ-NACK transmission), a method for notifying start points of two PSFCH resources is required.

When the two PSFCH resources are continuously present, a start PRB index of a first PSFCH resource may be derived from a start PRB index of PSSCH as described above. In other words, the start PRB index of the first PSFCH may be, in the above example, M or M+offset (or M−offset). Thereafter, the start PRB index of the second PSFCH resource may be determined based on the number of PRBs configuring the first PSFCH resource. For example, when it is assumed that the number of PRBs configuring the first PSFCH resource is [X1], the start PRB index of the second PSFCH resource may be M+[X1] or M+offset+[X1] (or M−offset−[X1]). Here, [X1] may be a fixed value or may be configured from a gNB or the V2X transmission UE.

When the two PSFCH resources are not continuous, the start PRB index of the first PSFCH resource may be derived from the start PRB index of PSCCH as described above, and the start PRB index of the second PSFCH resource may be configured via a separate offset. For example, the start PRB index of the first PSFCH may be, in the above example, M or M+offset1 (or M−offset1). In addition, the start PRB index of the second PSFCH resource may be M+offset2 or M+offset1+offset2 (or M−offset1−offset2). Here, offset1 denotes a difference between the start PRB index of PSCCH and the start PRB index of first PSFCH resource, and offset2 denotes a difference between the start PRB index of the first PSFCH resource and the start PRB index of the second PSFCH resource.

As for another example, the start PRB index of the second PSFCH resource may be M+[X1]+offset2 or M+offset1+[X1]+offset2 (or M−offset1−[X1]−offset2). Here, [X1] indicates the number of PRBs configuring the first PSFCH resource and may be a fixed value or configured by the gNB or V2X transmission UE. In addition in the above example, offset1 may denote a difference between the start PRB index of PSCCH and the start PRB index of first PSFCH resource. In addition, offset2 denotes a difference between the start PRB index of the first PSFCH resource and the start PRB index of the second PSFCH resource.

Although not described in FIG. 18, one of the methods described with reference to FIGS. 13B through 13D may be applied to FIG. 18.

Figure 19:
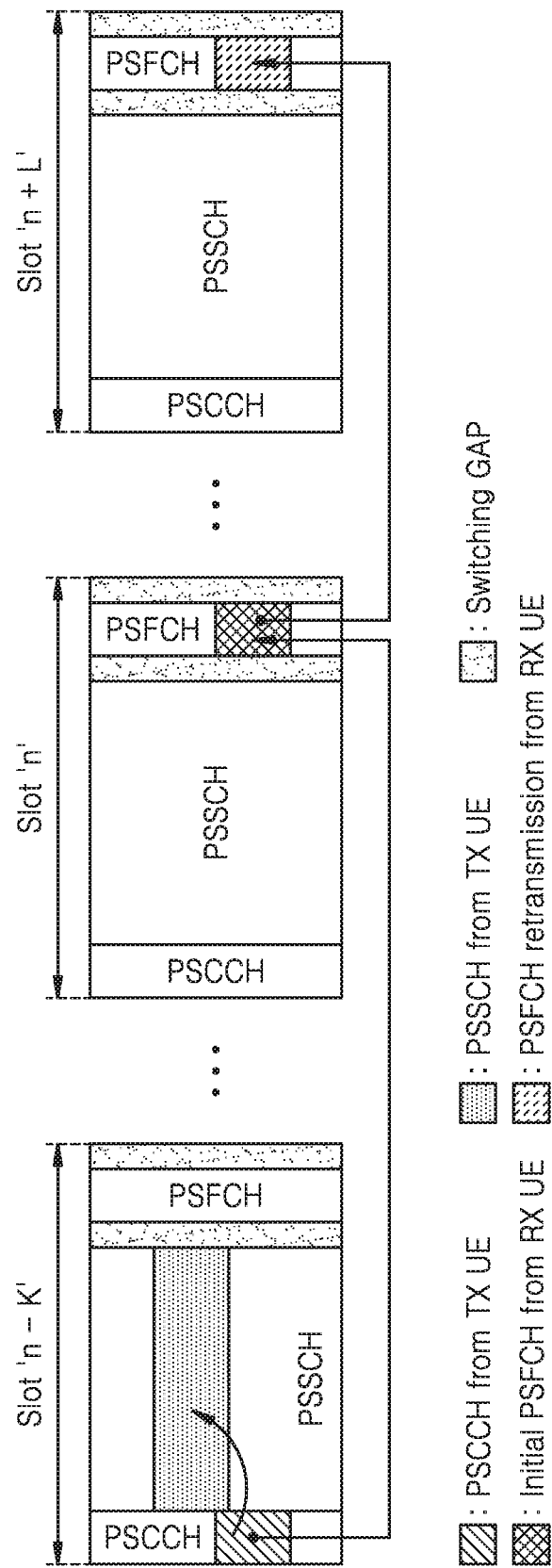
FIG. 19 is a diagram illustrating of frequency resource allocation of a sidelink feedback channel according to an embodiment of the disclosure.

FIG. 19 is a diagram illustrating frequency resource allocation of an S: feedback channel according to an embodiment of the disclosure.

Unlike FIGS. 16 through 18, FIG. 19 illustrates a case in which PSFCH is repeatedly transmitted. In this case, a start PRB index (or a last PRB index) of PSCCH may indicate a start PRB index of PSFCH that is initially transmitted via one of the methods described with reference to FIGS. 16 through 18.

Referring to FIG. 19, it may be assumed that a V2X transmission UE receiving PSFCH and a V2X reception UE transmitting PSFCH pre-verified the number of repetitive transmission of PSFCH. For example, the number of repetitive transmission of PSFCH may be included in resource pool configuration information and configured by a gNB or pre-configured when there is no gNB.

Accordingly, one of following methods may be used as a method of configuring a start PRB index of PSFCH that is transmitted $X^{th}$, wherein X is an integer greater than 1

For example, a PRB index that is the same as a start PRB index of PSFCH that is initially transmitted may be used. As for another example, when an offset value is applied in determining the start PRB index of PSFCH that is initially transmitted, the offset value may be identically applied. More particularly, when the start PRB index of PSFCH that is initially transmitted is M+offset (or M−offset), the start PRB index of PSFCH that is transmitted second may be M+offset+offset (or M−offset−offset). In the above example, M denotes the start PRB index or last PRB index of PSCCH.

As for another example, different offset values may be used every PSFCH transmission. In other words, when the start PRB index of PSFCH that is initially transmitted is M+offset 1 (or M−offset 1), the start PRB index of PSFCH that is transmitted second may be M+offset 1+offset2 (or M−offset 1−offset2). Here, offset 1 and offset 2 may be configured by the gNB or may be pre-configured when there is no gNB.

The number of PRBs configuring PSFCH may be the same for initial transmission and retransmission of PSFCH. As for another example, the number of PRBs used for initial transmission of PSFCH and the number of PRBs used for retransmission of PSFCH may be different from each other. For example, when the number of PRBs used for initial transmission is Y1, the number of PRBs used for second transmission may be Y1+Z1. Here, Z1 may be a fixed value or a value that is configured by the gNB or pre-configured.

The number of PRBs of PSFCH that is transmitted third may be Y1+Z1+Z2. Here, Z2 and Z1 may be the same value or different values. Similarly, Z2 may be a fixed value or a value that is configured by the gNB or pre-configured. The methods described above may be applied to the number of PRBs of PSFCH that is transmitted fourth.

The start PRB index described with reference to FIGS. 10, 11, 14, 15, 16, 17, 18, and 19 may denote a start index of a sub-channel or a lowest control channel element (CCE) index. Here, the sub-channel denotes a set of continuous PRBs or a set of discontinuous PRBs, and may be interpreted as a resource block group (RBG). In addition, CCE denotes a control channel component configuring a control channel, and one CCE may be configured of N PRBs. Here, N may be an integer greater than 1.

In FIGS. 10, 11, 14, 15, 16, 17, 18, and 19, methods of allocating frequency resources of PSFCH via the number of PRBs configuring PSFCH and a start PRB index of PSFCH have been described. However, when the number of PRBs configuring PSFCH is always fixed, the frequency resources of PSFCH may be allocated via the start PRB index of PSFCH or a last PRB index of PSFCH. Here, a start index of PRB may be interpreted as a start index of sub-channel or lowest CCE index.

Although not described in FIG. 19, one of the methods described with reference to FIGS. 13B through 13D may be applied to FIG. 19.

Figure 20A:
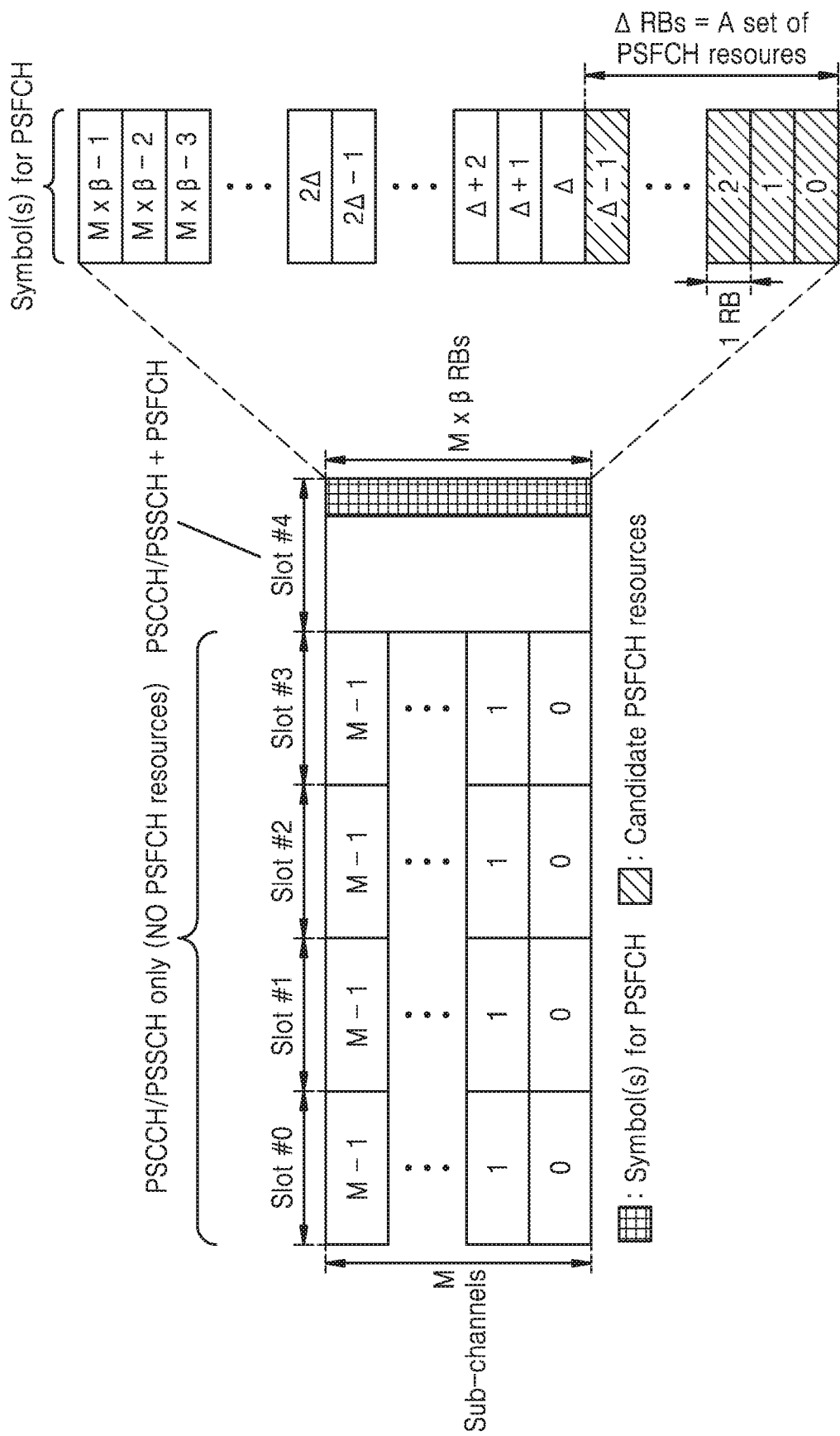
FIG. 20A is a diagram illustrating of frequency resource allocation of a sidelink feedback channel according to an embodiment of the disclosure.
Figure 20B:
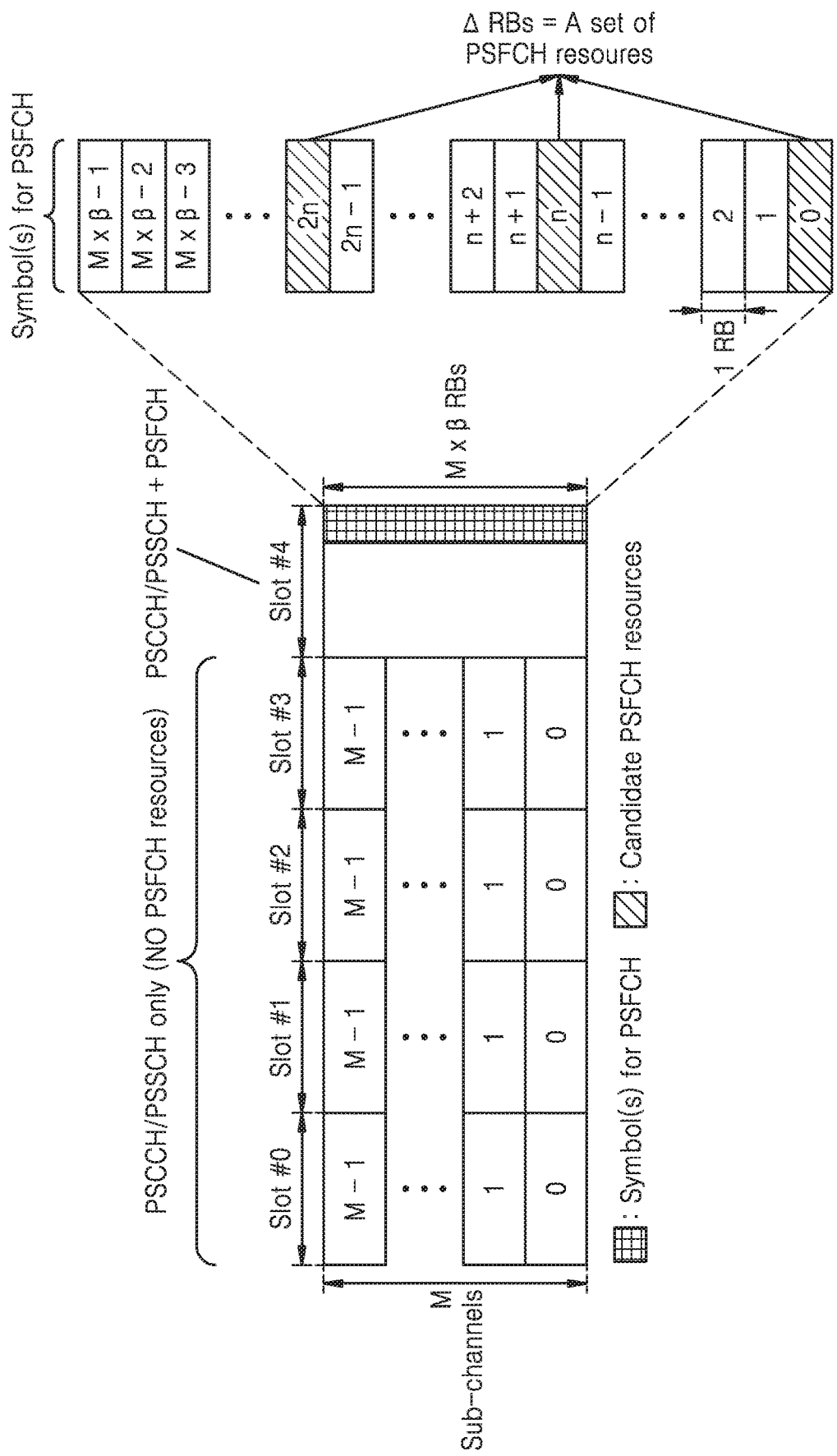
FIG. 20B is a diagram illustrating of frequency resource allocation of a sidelink feedback channel according to an embodiment of the disclosure.

FIGS. 20A and 20B are diagrams illustrating of frequency resource allocation of an SL feedback channel according to various embodiments of the disclosure.

Referring to FIGS. 20A and 20B, they are specified drawings of FIGS. 13B through 13D, wherein M in FIGS. 20A and 20B may denote the number of sub-channels of PSSCH configuring a SL bandwidth or one SL bandwidth part (BWP) present in the LS bandwidth. Here, one PSSCH sub-channel may be configured of at least one RB, and as defined in FIGS. 13B and 13C, the number of RBs configuring one PSSCH sub-channel may be defined as β. Here, β may have a value among 10, 15, 20, 50, 75, and 100, and as described with reference to FIGS. 6 and 7, the value of β may be obtained when an SL UE receives resource pool information (i.e., information about the number of RBs configuring a PSSCH sub-channel may be included in resource pool configuration information). In addition, as defined in FIGS. 13B and 13C, the number of RBs configuring PSFCH transmitted by one reception UE may be defined as γ. γ may have a value among integers greater than 1 (for example, 2, 4, or the like), and γ may be configured in the SL resource pool information like the value of β or may be a fixed value throughout resource pools without separate configuration unlike the value of β (for example, γ=1 in all resource pools).

In addition, as described with reference to FIGS. 12 and 13B through 13D, a PSFCH transmission resource (or a PSFCH reception source, hereinafter referred to as a PSFCH source) may be present for each N slots, wherein N may be 1, 2, o 4. For example, N=1 may indicate that the PSFCH resource is present for each SL slot, and N=2 and N=4 may respectively indicate that the PSFCH resource is present for each two SL slots (N=2) and for each SL slots (N=4). In addition, as described with reference to FIG. 12, a minimum difference between a time point when a reception UE received PSCCH/PSSCH from a transmission UE and a time point when the reception UE transmitted PSFCH to the transmission UE may be defined as K slots, and such K slots may denote a minimum time required for the reception UE to receive SL control information (PSCCH) from the transmission UE to decode SL data (PSSCH) and prepare for transmission of an SL feedback channel. In other words a value of K may be determined with sufficient margin in consideration of processing time capability of a UE. For example, the value of K may have a value among 1, 2, and 3, and K=1 may be supported by a UE having fast processing time capability (i.e., high processing time capability) and K=3 may be supported by a UE having slow processing time capability (i.e., low processing time capability). K=1 may denote that, when the reception UE received PSCCH/PSSCH in SL slot index n, the reception UE needs to transmit PSFCH in a slot after SL slot index n+1. In addition, K=2 and K=3 may denote that, when the reception UE received PSCCH/PSSCH in SL slot index n, the reception UE needs to transmit PSFCH respectively in a slot after SL slot index n+2 (K=2) and a slot after SL slot index n+3 (K=3).

According to an embodiment of the disclosure, N and K may be configured with one value for each SL resource pool, and different values may be set for N and K for each resource pool. For example, in a first resource pool, N=N1 and K=K1, and in a second resource pool, N=N2 and K=K2. Here, N1 and N2 may be the same or different from each other, and K1 and K2 may be the same or different from each other. When an SL UE is within coverage of a gNB (in-coverage), the SL UE may be configured with corresponding information from the gNB via system information and RRC. In the case of out-of-coverage without a gNB, the SL UE may use the values of N and K included in the pre-configured resource pool information. When the values of N and K are not included in the resource pool configuration information, the transmission UE and the reception UE that are to perform SL transmission and reception in the corresponding resource pool may not operate SL HARQ in the corresponding resource pool.

Meanwhile, the two UEs that are to perform unicast communication may negotiate the processing time capability of the UEs during PC5-RRC connection establishment process described with reference to FIG. 3, and use the value of K corresponding to a result of the negotiation. For example, it may be assumed that a UE-A and a UE-B that are to perform unicast communication respectively have fast processing time capability (capability A or processing time A1) and low processing time capability (capability B or processing time B1). Thereafter, when one resource pool capable of performing unicast communication is configured and at least two values of K are configured in the resource pool, the UE-A and UE-B may negotiate to perform unicast communication by using a greater value of K based on the slowest processing time capability (capability B or processing time B1).

As for another example, when at least two resource pools capable of performing unicast communication are configured and one value of K is configured in each resource pool, the UE-A and UE-B may negotiate to perform unicast communication in a resource pool where a greater value of K is configured based on the slowest processing time capability (capability B or processing time B1). In the above examples, a plurality of values of K capable of satisfying the slowest processing time capability (capability B or processing time B1) of the UE-A and UE-B may be present. In this case, the UE-A and UE-B may negotiate to perform unicast communication by using the smallest value of K among the plurality of values of K. As for another example, when at least two resource pools capable of performing unicast communication are configured and at least two values of K are configured in each resource pool, the UE-A and UE-B may negotiate to perform unicast communication by using a value of K that satisfies the slowest processing time capability (capability B or processing time B1) of the UE-A and UE-B. Here, when the plurality of values of K satisfying the slowest processing time capability (capability B or processing time B1) of the UE-A and UE-B are present, the UE-A and UE-B may negotiate to perform unicast communication by using the smallest value of K among the plurality of values of K.

FIGS. 20A and 20B show examples when N=4 and K=1 are configured in the SL resource pool information, and a reception UE-A that received PSCCH/PSSCH in an SL slot index 0 may transmit PSFCH in a slot after an SL slot index 1 (K=1). Here, because a PSFCH resource is present only in a slot index 4 (N=4), the reception UE-A may transmit PSFCH in a slot index 4. As for another example, a reception UE-B that received PSCCH/PSSCH in an SL slot index 1 may transmit PSFCH in a slot after an SL slot index 2 (K=1). Here, because a PSFCH resource is present only in a slot index 4 (N=4), the reception UE-B may transmit PSFCH in a slot index 4 like the reception UE-A. As for another example, a reception UE-C that received PSCCH/PSSCH in an SL slot index 2 may transmit PSFCH in a slot after an SL slot index 3 (K=1). Here, because a PSFCH resource is present only in a slot index 4 (N=4), the reception UE-C may transmit PSFCH in a slot index 4 like the reception UE-A and the reception UE-B. As for another example, a reception UE-D that received PSCCH/PSSCH in an SL slot index 3 may transmit PSFCH in a slot after an SL slot index 4 (K=1). Here, because a PSFCH resource is present only in a slot index 4 (N=4), the reception UE-D may transmit PSFCH in a slot index 4 like the reception UE-A, the reception UE-B, and the reception UE-C.

As described above, the PSFCH resource is not present in the slot indexes 0, 1, 2, and 3, and may be present only in the slot index 4. In FIGS. 20A and 20B, a PSFCH symbol (when PSFCH is configured of one symbol) or PSFCH symbols (when PSFCH is configured of two or more symbols) present in the slot index 4 are located in an SL bandwidth or throughout SL BWPs within the SL bandwidth. Accordingly, the PSFCH symbol(s) may be configured of M×β RBs in a frequency axis. The number of symbols configuring PSFCH in a time axis may be included in resource pool information as described with reference to FIGS. 9A and 9B and may be implicitly or explicitly configured. When the number of symbols configuring PSFCH is explicitly configured in the resource pool information, such as 1, 2, or 3, a structure of PSFCH transmitted by one reception UE may be as shown in FIGS. 9A and 9B.

According to an embodiment of the disclosure, the number of symbols configuring PSFCH may be implicitly configured in the resource pool information via whether PSFCH is repeatedly transmitted or the number of repetitive transmissions. For example, when the basic number of symbols of PSFCH is defined as 1 in the time axis and the repetitive transmission is configured in the resource pool information, the number of symbols of PSFCH transmitted by the reception UE from the resource pool may be 2. In addition, when the repetitive transmission is not configured in the resource pool information, the number of symbols of PSFCH transmitted by the reception UE may be 1 Similarly, when the number of symbols of PSFCH is defined as 2 in the time axis and the repetitive transmission is configured in the resource pool information, the number of symbols of PSFCH transmitted by the reception UE from the resource pool may be 4. In addition, when the repetitive transmission is not configured in the resource pool information, the number of symbols of PSFCH transmitted by the reception UE may be 2. As for another example, when the basic number of symbols of PSFCH is defined as 1 in the time axis and the number of repetitive transmission=2 is configured in the resource pool information, the number of symbols of PSFCH transmitted by the reception UE from the resource pool may be 2. In addition, when the number of repetitive transmission=4 is configured in the resource pool information, the number of symbols of PSFCH transmitted by the reception UE may be 4. When the number of repetitive transmission is not configured in the resource pool information or the number of repetitive transmission=0 is configured, the number of symbols of PSFCH transmitted by the reception UE from the resource pool may be 1.

Although not shown in FIGS. 20A and 20B, a case in which the PSFCH symbol(s) are located in the SL bandwidth or the SL BWP in the frequency axis may be considered. In addition, although not shown in FIGS. 20A and 20B, the slot 4 may include GAP as described with reference to FIG. 7.

As described above, the reception UE that received PSCCH and PSSCH in at least one slot among slot indexes 0 through 3 may transmit SL HARQ feedback to the transmission UE by using at least one PSFCH resource configured in the slot 4. Here, the mapping relationship between the PSSCH resource and the PSFCH resource (or between PSCCH resource and PSFCH resource) described with reference to FIGS. 13B through 13D may be applied. In other words, the reception UE may obtain information about a location of PSFCH frequency resource (or a start point of PSFCH frequency resource) to be transmitted via a combination of a slot index where PSSCH is received and a start index of a sub-channel where PSSCH is received. In addition, the transmission UE may obtain information about a location of PSFCH frequency resource (or a start point of PSFCH frequency resource) to be received via a combination of a slot index where PSSCH is transmitted and a start index of a sub-channel where PSSCH is transmitted (or an index of a start sub-channel).

It has been described above that in the mapping relationship between the PSSCH resource and the PSFCH resource or the mapping relationship between the PSSCH resource and the PSFCH resource described with reference to FIGS. 13B through 13D, the slot index of PSSCH and the index of the start sub-channel are associated with the location of the PSFCH frequency resource (or the start point of the PSFCH frequency resource) to be actually transmitted (or actually received). In generalization, as shown in FIGS. 20A and 20B, the slot index of PSSCH and the index of the start sub-channel may be associated with start points of PSFCH frequency resource candidates (candidate PSFCH resources) configured of one or more PSFCH frequency resources instead of the location of the PSFCH frequency resource (or the start point of the PSFCH frequency resource) to be actually transmitted (or actually received). Here, when the number of PSFCH candidates is one, the slot index of PSSCH and the index of the star sub-channel may be the same as the mapping relationship between the PSSCH resource and the PSFCH frequency resource or the mapping relationship between the PSSCH resource and the PSFCH frequency or code (or frequency and code) described with reference to FIGS. 13B through 13D. However, when the PSFCH candidates are two or more, the slot index of PSSCH and the index of the star sub-channel may be associated with one PSSCH time and frequency resource and frequency or code (or frequency and code) resources of a plurality of PSFCH candidates.

More particularly, as shown in FIG. 20A, a set of candidate PSFCH frequency resources configured of Δ PSFCH resources may be considered. For convenience of description, in FIG. 20A, the candidate PSFCH frequency resources configured of PSFCH frequency resource indexes 0 to Δ−1 may be defined as a candidate PSFCH frequency resource set index 0. In addition, the candidate PSFCH frequency resources configured of PSFCH frequency resource indexes Δ to 2Δ−1 may be defined as a candidate PSFCH frequency resource set index 1. In generalization, there may be total (M×β)/Δ sets of candidate PSFCH frequency resources configured of Δ PSFCH resources from index 0 to index (M×β)/Δ−1 based on a lowest frequency (or highest frequency). However, such indexing is only an example and as described with reference to FIGS. 13B through 13D, a start index of the set of candidate PSFCH frequency resources may not be 0 according to a configured (or pre-configured or fixed) offset value. For example, when an offset is 3, the set of candidate PSFCH frequency resources configuring PSFCH frequency indexes 3Δ to 3Δ−1 may correspond to index 0.

According to an embodiment of the disclosure, the start index of the set of candidate PSFCH frequency resources (or indexes of start candidate PSFCH frequency resources) may be associated with the PSSCH slot index and the start sub-channel index (or the start index of sub-channel) as follows. PSSCH received from a start sub-channel index m of a slot index I (or a start index m of a sub-channel) may denote a start point of a set of candidate PSFCH frequency resources configured of Δ PSFCH candidates. For example, according to the mapping relationship between the PSSCH frequency resource and the PSFCH frequency resource described with reference to FIG. 13B, PSSCH transmitted from a start sub-channel index 0 of a slot index 0 (or a start index 0 of a sub-channel) in FIG. 20A may denote an index 0 of a set of candidate PSFCH resources configured of PSFCH frequency resource indexes 0 to Δ−1 in a slot index Δ. In addition, PSSCH transmitted from a start sub-channel index 1 of the slot index 0 (or a start index 1 of the sub-channel) may denote an index 1 of a set of candidate PSFCH frequency resources configured of PSFCH frequency resource indexes Δ to 2Δ−1 in the slot index 4.

In the above examples, it has been described that the slot index 0 of PSSCH and the start sub-channel index 0 (or the start index 0 of sub-channel) are associated with the index 0 of the set of candidate PSFCH frequency resources. However, as described above, the slot index 0 of PSSCH and the start sub-channel index 0 (or the start index 0 of sub-channel) may be associated an index Q of a set of candidate PSFCH frequency resources, according to a configured (or pre-configured or fixed) offset value Q. In generalization, the slot index I of PSSCH and the start sub-channel index m (or the start index m of sub-channel) may be associated with an index δ of a set of candidate PSFCH frequency resources. Here, as described above, the set of candidate PSFCH frequency resources having the index δ may include Δ candidate PSFCH resources. A value of Δ may be included in resource pool information configured by a gNB via system information or RRC. In the case of out-of-coverage without a gNB, the value of Δ may be included in pre-configured resource pool information.

Meanwhile, according to an embodiment of the disclosure, the value of Δ indicating the PSFCH frequency resources configuring one set of candidate PSFCH frequency resources may not be included in resource pool configuration information but may be a fixed value. For example, the value of Δ may be defined by a function of β

(the number of RBs configuring a PSSCH sub-channel) and γ (the number of RBs configuring PSFCH used by one UE to transmit or receive one PSFCH). For example, Δ=floor (β/γ) and at this time, floor( ) may be a function indicating rounding off of a decimal point. As for another example, Δ=ceil(β/γ) and at this time, ceil( ) may be a function indicating rounding up of a decimal point. In this case, separate signaling for configuring the value of Δ in the resource pool information may be omitted.

In FIG. 20A, it is illustrated that PSFCH frequency resources configuring one set of candidate PSFCH frequency resources are continuously located in one set of candidate PSFCH frequency resources. On the other hand, in FIG. 20B, it is illustrated that PSFCH frequency resources configuring one set of candidate PSFCH frequency resources are discontinuously located in one set of candidate PSFCH frequency resources. For example, in FIG. 20B, Δ PSFCH frequency resources having PSFCH frequency resource indexes 0, n, and 2n through (Δ−n) configure one set of candidate PSFCH frequency resources. Here, each PSFCH frequency resource may have an offset n and each offset n may be configured in the resource pool information. According to an embodiment of the disclosure, when offset n=1, FIG. 20B may be the same as FIG. 20A. Thus, various embodiments of the disclosure described with reference to FIG. 20A may be applied to FIG. 20B.

In FIGS. 20A and 20B, a reception UE that determined an index of one set of candidate PSFCH resources configured of Δ PSFCH frequency resources may transmit, to a transmission UE, PSFCH by using at least one of Δ PSFCH frequency resources, via the slot index of PSSCH and the index of the start sub-channel (or the start index of sub-channel). Here, a method, performed by the reception UE, of selecting a PSFCH frequency resource may vary and one or a combination of at least two of the above methods may be used.

For example, as described with reference to FIG. 13D, the reception UE may select one PSFCH frequency resource to be actually transmitted among Δ PSFCH frequency resources via source ID. More particularly, the reception UE may select one PSFCH frequency resource via a modular operation between the source ID and Δ. Here, as described with reference to FIG. 11, the source ID may be configured by [Y] bits, wherein [Y1] bits of the source ID may be transmitted via PSCCH and the remaining [Y2] bits may be included in MAC PDU transmitted via PSSCH. The source ID used for the modular operation may denote the [Y] bits or the [Y1] bits transmitted via PSCCH.

As for another example, the reception UE may randomly select one PSFCH frequency resource to be actually transmitted among Δ PSFCH frequency resources.

As for another example, the reception UE may select, as the PSFCH frequency resource to be actually transmitted, one PSFCH frequency resource having the lowest (or highest) index among the Δ PSFCH frequency resources.

In the above example, the reception UE selects one PSFCH frequency resource is selected among the Δ PSFCH frequency resources, but an embodiment of the disclosure is not limited thereto. For example, the reception UE may select two or more PSFCH frequency resources among the Δ PSFCH frequency resources. In this case, examples of selecting one PSFCH frequency resource may be expanded.

For example, when the reception UE selects a plurality of PSFCH frequency resources based on the source ID, the reception UE may select one PSFCH frequency resource via the modular operation described above and select a continuous PSFCH frequency resource based on the selected PSFCH frequency resource. In other words, when a PSFCH frequency resource index 6 is selected via the modular operation based on the source ID, the reception UE may select the plurality of PSFCH frequency resources in an order of indexes 6, 7, 8, and so on (an ascending order). Alternatively, the reception UE may select the plurality of PSFCH frequency resources in an order of indexes 6, 5, 4, and so on (a descending order).

According to an embodiment of the disclosure, when the reception UE randomly selects the plurality of PSFCH frequency resources, the reception UE may randomly select one PSFCH frequency resource and select a continuous PSFCH frequency resource based on the selected PSFCH frequency resource. In other words, when the PSFCH frequency resource index 6 is selected for random selection, the UE may select the plurality of PSFCH frequency resources in the order of indexes 6, 7, 8, and so on (the ascending order) or in the order of indexes 6, 5, 4, and so on (the descending order). As another example of randomly selecting the plurality of PSFCH frequency resources, the reception UE may randomly select the plurality of PSFCH frequency resources among the Δ PSFCH frequency resources.

When the plurality of PSFCH frequency resources are selected based on the lowest (or highest) index among the Δ PSFCH frequency resources, the reception UE may select the plurality of PSFCH frequency resources according to an ascending order or descending order of indexes based on the selected lowest (or highest index).

Meanwhile, it may be required to determine whether to transmit one PSFCH via one PSFCH frequency resource or transmit two or more PSFCHs via two or more PSFCH frequency resources, among the Δ PSFCH frequency resources. For example, in a slot where a PSFCH resource is configured (i.e., the slot index 4 in FIGS. 20A and 20B), the determination may be associated with a HARQ-ACK and/or HARQ-NACK bit number to be transmitted by the reception UE. More particularly, when the HARQ-ACK and/or HARQ-NACK bit number to be transmitted by the reception UE is 1, one PSFCH may be transmitted via one PSFCH frequency resource. When the HARQ-ACK and/or HARQ-NACK bit number to be transmitted by the reception UE is 2, two PSFCHs may be transmitted via two PSFCH frequency resources.

As for another example, the number of PSFCHs to be transmitted by the reception UE may be configured in the resource pool information, and the reception UE may transmit HARQ feedback by selecting the number of PSFCH frequency resources equal to the number of configured PSFCHs, based on the source ID, the random selection, or the lowest (or highest) frequency index.

In the above examples, the method of determining the index of the set of candidate PSFCH resources configured of Δ by the slot index of PSSCH and the start sub-channel index (or the start index of sub-channel) has been mainly described. However, the above examples may be expanded to a method of determining an index of a set of PSFCH code resource candidates configured of Δ PSFCH code resources by the slot index of PSSCH or the start sub-channel index (or the start index of sub-channel).

Meanwhile, the method of selecting a PSFCH frequency resource described above may be used unicast communication and in HARQ operation option 1 of groupcast communication described with reference to FIG. 13D. This is because, as described with reference to FIG. 13D, HARQ operation option 2 of groupcast communication may require the number of PSFCH frequency and/or code resources equal to the number of reception UEs because each reception UE participating in the groupcast communication needs to transmit HARQ feedback to a transmission UE. In other words, the transmission UE may need to determine from which one of different reception UEs in a group the HARQ feedback is transmitted, and one of following methods may be considered.

For example, as described with reference to FIG. 13D, a higher layer in the groupcast may provide group information for groupcast communication. Here, as described with reference to FIG. 13D, the group information may include at least one of group ID and the number of group members participating in the groupcast communication. More particularly, when one PSFCH frequency resource is selected based on the group information, as described with reference to FIG. 13D, the reception UE may select one PSFCH frequency resource via a modular operation between the group ID and the number of group members and transmit HARQ feedback from the PSFCH frequency resource. When the reception UE needs to select a plurality of PSFCH frequency resources, the reception UE may select one PSFCH frequency resource via the modular operation and select a continuous PSFCH frequency resource based on the selected PSFCH frequency resource. In other words, when a PSFCH frequency resource index 6 is selected via the modular operation between the group ID and the number of group members, the reception UE may select the plurality of PSFCH frequency resources in an order of indexes 6, 7, 8, and so on (an ascending order). Alternatively, the reception UE may select the plurality of PSFCH frequency resources in an order of indexes 6, 5, 4, and so on (a descending order). The above examples may be expanded to selecting of one PSFCH code resource or a plurality of PSFCH code resources.

Meanwhile, a method of selecting a group information-based PSFCH frequency (or code) resource may be operated as follows in addition to a method of selecting one PSFCH or a plurality of PSFCHs based on a source ID, random selection, or lowest (or highest) frequency index. For example, the reception UE may select one PSFCH frequency resource via the modular operation between the group ID and the number of group members and select one PSFCH code resource based on the source ID, random selection, or lowest (or highest) code index. The reception UE may transmit the selected PSFCH frequency resource by using a code selected by the reception UE.

As for another example, the reception UE may select one PSFCH frequency resource based on the source ID, random selection or lowest (or highest) frequency index, and select one PSFCH code resource via the modular operation between the group ID and the number of group members. The reception UE may transmit the selected PSFCH frequency resource by using a code selected by the reception UE.

In the above examples, as described above with reference to FIGS. 9A and 9B, a code resource (or code) may denote a resource and different sequences (and a cyclic shift applied a sequence) distinguished by using a code, such as a scrambling code or an orthogonal cover code.

Figure 21A:
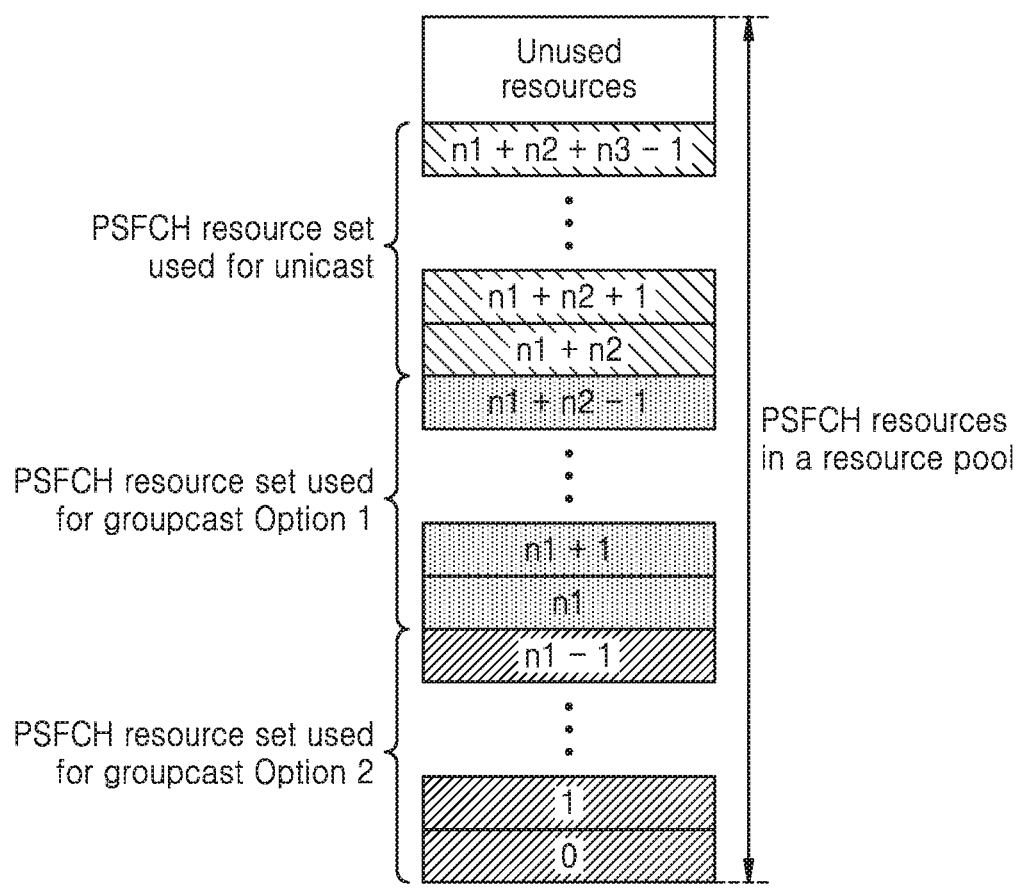
FIG. 21A is a diagram illustrating of frequency resource allocation of a sidelink feedback channel according to an embodiment of the disclosure.
Figure 21B:
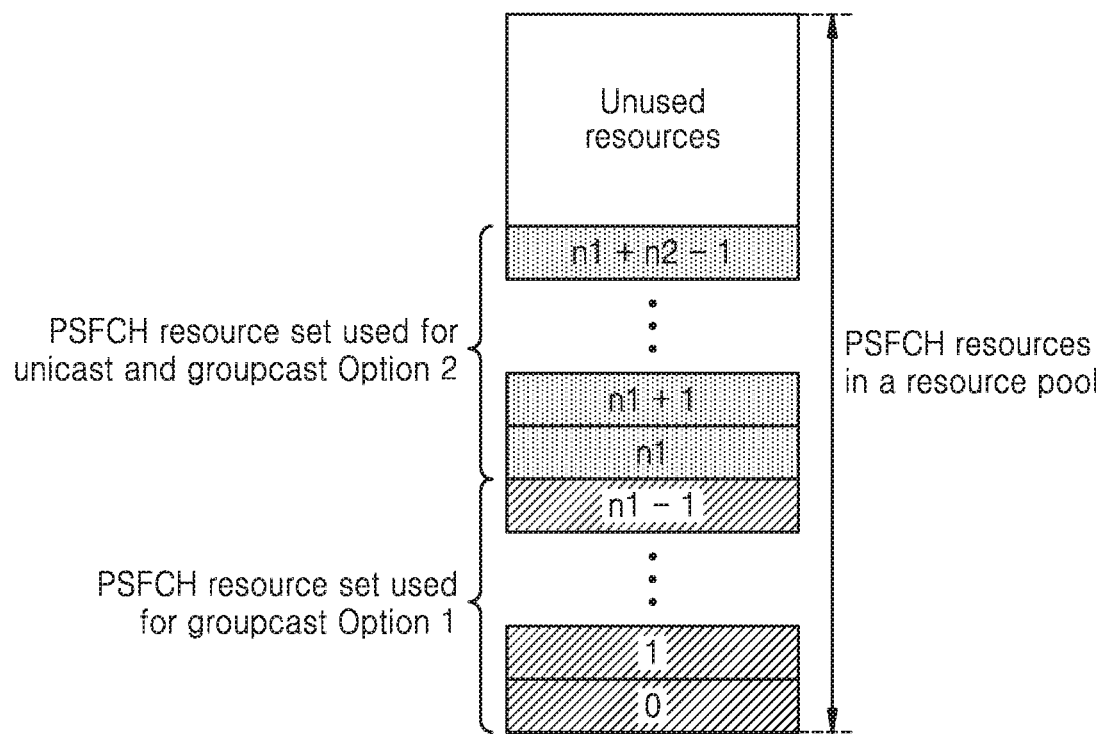
FIG. 21B is a diagram illustrating of frequency resource allocation of a sidelink feedback channel according to an embodiment of the disclosure.

FIGS. 21A and 21B are diagrams illustrating frequency resource allocation of an SL feedback channel according to various embodiments of the disclosure.

As described above with reference to FIGS. 9A through 13D, there may be two options (option 1 and option 2) for groupcast communication according to SL HARQ operation. Meanwhile, as described with reference to FIG. 4, unicast, groupcast, and broadcast communications may be performed in one resource pool. For example, in a resource pool A, a UE-1 and UE-2 may perform PC5-RRC connection establishment procedure described in FIG. 4, and then perform unicast communication. Thereafter, in the same resource pool A, a UE-3 may perform groupcast communication with other UEs and a UE-4 may perform broadcast communication with other UEs. As for another example, in the resource pool A, one UE may perform two or more of unicast, groupcast, and broadcast communications with the same or different UEs.

In the various scenarios described above, different interferences may occur in a transmission UE receiving PSFCH according to a PSFCH transmitting method of reception UEs transmitting PSFCH. More particularly, as described with reference to FIGS. 9A through 13D, in the case of groupcast HARQ option 1, reception UEs transmitting PSFCH in the same group may transmit NACK by using the same time/frequency or same time/frequency/code resource. In other words, each reception UE in the same group transmits one sequence indicating HARQ NACK and a receiver of the transmission UE that received HARQ NACK may overlappingly receive sequences transmitted from two or more reception UEs. Accordingly, the reception power strength of PSFCH received in the corresponding time/frequency resource is increased, thereby interfering with reception of another PSFCH received via an adjacent frequency at the same time. This may be referred to an in-band emission (IBE) and reception performance of PSFCH may severely deteriorate due to IBE. As for another example, in the case of groupcast HARQ option 2, the reception UEs transmitting PSFCH at the same time in the same group may transmit HARQ-ACK or HARQ-NACK by using independent frequency resources, in principle. However, when the number of reception UEs transmitting PSFCH in the group is large, as described with reference to FIG. 13D, FDM may be unable to be performed between different PSFCHs due to insufficiency of PSFCH frequency resources. Accordingly, some PSFCH resources may need to perform code division multiplexing (CDM). In this case, as in the groupcast option 1, the reception performance of PSFCH may severely deteriorate due to IBE.

In order to prevent IBE, methods shown in FIGS. 21A and 21B may be used.

Referring to FIG. 21A, it illustrates a case in which sets of PSFCH frequency resources usable for HARQ feedback transmission of unicast, groupcast option 1, and groupcast option 2 are divided in a resource pool where PSFCH resources are configured.

Referring to FIG. 21B, unlike FIG. 21A, it illustrates a case in which sets of PSFCH frequency resources usable for HARQ feedback transmission of unicast communication and groupcast option 1 and sets of PSFCH frequency resources usable for HARQ feedback transmission of groupcast option 2 are divided.

For example, in FIG. 21A, the set of PSFCH frequency resources usable for HARQ feedback transmission of groupcast option 2 (PSFCH resource set used for groupcast option 2) may be configured of n1 RBs or n1 PSFCH sub-channels (from indexes 0 to n1−1). In addition, the set of PSFCH frequency resources usable for HARQ feedback transmission of groupcast option 1 (PSFCH resource set used for groupcast option 1) may be configured of n2 RBs or n2 PSFCH sub-channels (from indexes n1 to n1+n2−1). In addition, the set of PSFCH frequency resources usable for HARQ feedback transmission of unicast communication (PSFCH resource set used for unicast) may be configured of n3 RBs or n3 PSFCH sub-channels (from indexes n1+n2 to n1+n2+n3−1). Similarly, in FIG. 21B, the set of PSFCH frequency resources usable for HARQ feedback transmission of groupcast option 1 may be configured of n1 RBs or n1 PSFCH sub-channels (from indexes 0 to n1−1), and the set of PSFCH frequency resources usable for HARQ feedback transmission of unicast or groupcast option 2 may be configured of n2 RBs or n2 PSFCH sub-channels (from indexes n1 to n1+n2−1).

In FIGS. 21A and 21B, the sets of PSFCH frequency resources for HARQ feedback transmission of unicast, groupcast option 1, and groupcast option 2 are illustrated as being continuous in a frequency axis, but this is only an example and the sets of PSFCH frequency resources for HARQ feedback transmission may be discontinuous in the frequency axis.

Meanwhile, the PSFCH frequency resource may be configured of M RBs in a resource pool as in FIG. 7 or the resource pool may be configured of M frequency resources as in FIG. 6 (i.e., a symbol used for PSFCH transmission and reception may use all M RBs in the resource pool where PSFCH is configured). In this case, n1+n2+n3<M in FIG. 21A and n1+n2<M in FIG. 21B. In other words, in FIG. 21A, M−(n1+n2+n3) frequency resources among M PSFCH frequency resources may not be used for PSFCH transmission and reception. In addition, in FIG. 21B, M−(n1+n2) frequency resources among M PSFCH frequency resources may not be used for PSFCH transmission and reception. In such a resource pool, an unused PSFCH frequency resource may be used by another UE in the corresponding resource pool to transmit SL control information or data information or may be used for FDM of different PSFCH formats.

In other words, in FIG. 21A, n1+n2+n3 PSFCH frequency resources may be used as PSFCH frequency resources for transmission and reception of PSFCH format transmitted based on a sequence described with reference to FIG. 9A or 9B, and the remaining M−(n1+n2+n3) PSFCH frequency resources may be used as PSFCH frequency resources for transmission and reception of another PSFCH format transmitted based on channel encoding described with reference to FIG. 9A or 9B. Similarly, in FIG. 21B, n1+n2 PSFCH frequency resources may be used as PSFCH frequency resources for transmission and reception of PSFCH format transmitted based on a sequence described with reference to FIG. 9A or 9B, and the remaining M−(n1+n2) PSFCH frequency resources may be used as PSFCH frequency resources for transmission and reception of another PSFCH format transmitted based on channel encoding described with reference to FIG. 9A or 9B. Although not shown in FIG. 21A, n1+n2+n3=M and although not shown in FIG. 21B, n1+n2=M. This may indicate that M PSFCH frequency resources are all assigned (i.e., a frequency resource of PSFCH is unable to be frequency-divided with SL control information and data information in a PSFCH symbol) or the same PSFCH format is used in M PSFCH frequency resources.

In addition, in FIGS. 21A and 21B, n1, n2, and n3 may have the same value or different values. In addition, a mapping order of PSFCH frequency resources for HARQ feedback of groupcast option 2, groupcast option 1, and unicast communication of FIG. 21A is only an example and is not limited thereto. Similarly, a mapping order of PSFCH frequency resources for HARQ feedback of groupcast option 2, groupcast option 1, and unicast communication of FIG. 21B is only an example and is not limited thereto.

As described with reference to FIGS. 10, 11, 13B, 13C, 13D, 14, 15, 16, 17, 18, 19, 20A, and 20B, a start point of a PSFCH frequency resource to be transmitted by each reception UE (i.e., a start RB index of PSFCH or a start sub-channel index of PSFCH) may be associated with a start RB index of PSCCH or PSSCH transmitted by each transmission UE (or start sub-channel index) and/or a slot index of PSCCH or PSSCH transmitted by each transmission UE. Accordingly, in the examples of FIGS. 21A and 21B, information about a start point and end point of a frequency resource set usable by PSFCH (or the start point of frequency resource set of PSFCH) for HARQ feedback transmission of unicast, groupcast option 1, and groupcast option 2 may be required.

For example, a PSFCH transmission frequency resource used for HARQ feedback transmission of unicast communication may be determined by, as described with reference to FIGS. 13B and 13C, a slot index of PSCCH or PSSCH received by the reception UE and a start sub-channel index of PSCCH or PSSCH (or a start RB index). Here, configuration of an offset value may be required for a UE that received unicast to transmit PSFCH from a PSFCH frequency resource set (i.e., from indexes n1+n2 to n1+n2+n3−1) for unicast communication shown in FIG. 21A. In other words, in FIGS. 13B and 13C, a UE that received PSCCH or PSSCH from a slot index 0 and a start sub-channel index (or start RB index) 0 transmits PSFCH having an index 0. When the mapping principle of FIG. 13B is applied to FIG. 21A, the UE that received PSCCH or PSSCH from the slot index 0 and the start sub-channel index (or start RB index) 0 via unicast communication may transmit PSFCH having an index n1+n2 (i.e., offset by n1+n2). In addition, the UE that received PSCCH or PSSCH from the slot index 0 and a start sub-channel index (or start RB index) 1 via unicast communication may transmit PSFCH having an index n1+n2+1. Similarly, when the mapping principle of FIG. 13C is applied to FIG. 21A, the UE that received PSCCH or PSSCH from the slot index 0 and the start sub-channel index (or start RB index) 0 via unicast communication may transmit PSFCH having an index n1+n2 (i.e., offset by n1+n2). This is identical to when the mapping principle of FIG. 13B is applied. However, when the mapping principle of FIG. 13C is applied, the UE that received PSCCH or PSSCH from a slot index 1 and the start sub-channel index (or start RB index) 0 via unicast communication may transmit PSFCH having an index n1+n2+1

Such mapping principles of FIGS. 13B and 13C may be applied to FIG. 21B as follows. When the mapping principle of FIG. 13B is applied to FIG. 21B, the UE that received PSCCH or PSSCH from the slot index 0 and the start sub-channel index (or start RB index) 0 via unicast communication may transmit PSFCH having an index n1 (i.e., offset by n1). In addition, the UE that received PSCCH or PSSCH from the slot index 0 and a start sub-channel index (or start RB index) 1 via unicast communication may transmit PSFCH having an index n1+1. Similarly, when the mapping principle of FIG. 13C is applied to FIG. 21B, the UE that received PSCCH or PSSCH from the slot index 0 and the start sub-channel index (or start RB index) 0 via unicast communication may transmit PSFCH having an index n1 (i.e., offset by n1). This is identical to when the mapping principle of FIG. 13B is applied. However, when the mapping principle of FIG. 13C is applied, the UE that received PSCCH or PSSCH from a slot index 1 and the start sub-channel index (or start RB index) 0 via unicast communication may transmit PSFCH having an index n1+1

The offset value described above may be included in resource pool configuration information.

Configuration of PSFCH transmission frequency resource used for HARQ feedback transmission option 1 of groupcast communication may be identical to the configuration of PSFCH transmission frequency resource used for HARQ feedback transmission of unicast communication. In other words, configuration of a PSFCH transmission frequency resource used for HARQ feedback transmission option 1 of groupcast communication may be determined by a slot index of PSCCH or PSSCH received by two or more reception UEs and a start sub-channel index of PSCCH or PSSCH (or a start RB index). More particularly, when the mapping principle of FIG. 13B is applied to FIG. 21A, the UE that received PSCCH or PSSCH from the slot index 0 and the start sub-channel index (or start RB index) 0 via groupcast communication option 1 may transmit PSFCH having an index n1 (i.e., offset by n1). In addition, the UE that received PSCCH or PSSCH from the slot index 0 and a start sub-channel index (or start RB index) 1 via groupcast communication option 1 may transmit PSFCH having an index n1+1. Similarly, when the mapping principle of FIG. 13C is applied to FIG. 21A, the UE that received PSCCH or PSSCH from the slot index 0 and the start sub-channel index (or start RB index) 0 via groupcast communication option 1 may transmit PSFCH having an index n1 (i.e., offset by n1). This is identical to when the mapping principle of FIG. 13B is applied. However, when the mapping principle of FIG. 13C is applied, the UE that received PSCCH or PSSCH from a slot index 1 and the start sub-channel index (or start RB index) 0 via groupcast communication option 1 may transmit PSFCH having an index n1+1

Such mapping principles of FIGS. 13B and 13C may be applied to FIG. 21B as follows. When the mapping principle of FIG. 13B is applied to FIG. 21B, the UE that received PSCCH or PSSCH from the slot index 0 and the start sub-channel index (or start RB index) 0 via groupcast communication option 1 may transmit PSFCH having an index 0 (i.e., offset by 0). In addition, the UE that received PSCCH or PSSCH from the slot index 0 and a start sub-channel index (or start RB index) 1 via group communication option 1 may transmit PSFCH having an index 1. Similarly, when the mapping principle of FIG. 13C is applied to FIG. 21B, the UE that received PSCCH or PSSCH from the slot index 0 and the start sub-channel index (or start RB index) 0 via groupcast communication option 1 may transmit PSFCH having an index 0 (i.e., offset by 0). This is identical to when the mapping principle of FIG. 13B is applied. However, when the mapping principle of FIG. 13C is applied, the UE that received PSCCH or PSSCH from a slot index 1 and the start sub-channel index (or start RB index) 0 via groupcast communication option 1 may transmit PSFCH having an index 1.

Meanwhile, configuration of PSFCH transmission frequency resource used for HARQ feedback transmission option 2 of groupcast communication may be different from the configuration of PSFCH transmission frequency resource used for HARQ feedback transmission of unicast communication or for HARQ feedback transmission option 1 of groupcast communication. This is because in HARQ feedback transmission option 2 of groupcast communication, the reception UEs in the group that received PSCCH and PSSCH from the transmission UE need to independently transmit PSFCH by using different time/frequency/code resources. Accordingly, the number of PSFCH resources needs to be increased in proportion to the number of reception UEs in the group (i.e., PSFCH transmission UEs). In this regard, a method of transmitting different PSFCH time/frequency/code resources between different reception UEs in a group performing groupcast communication may be required. One of the methods described with reference to FIGS. 13A through 13D may be used as such method.

For example, in FIG. 21A, the UE that received PSCCH or PSSCH from the slot index 0 and the start sub-channel index (or start RB index) 0 via groupcast communication option 2 may transmit PSFCH starting from an index 0 (i.e., start PSFCH from offset by 0). Here, the number of reception UEs in the group performing groupcast communication may be G0. As described with reference to FIG. 13D, each reception UE may receive the number of group members participating in the groupcast communication (G0 reception UEs+1 transmission UE=G0+1) and its group ID from a higher layer. Accordingly, each reception UE may determine that G0 independent PSFCH frequency resources are required for a PSFCH frequency resource set starting from the index 0. Each reception UE may identify a PSFCH resource usable by itself from PSFCH starting from the index 0 via its group ID (for example, modulo operation described in FIG. 13D). When the mapping principle of FIG. 13B is applied to FIG. 21A, the UEs that received PSCCH or PSSCH from the slot index 0 and the start sub-channel index (or start RB index) 1 via groupcast communication option 2 may transmit PSFCH starting from PSFCH index 1. Each reception UE may receive the number of group members participating in the groupcast communication (G1 reception UEs+1 transmission UE=G1+1) and its group ID from a higher layer. Accordingly, each reception UE may determine that G1 independent PSFCH frequency resources are required for a PSFCH frequency resource set starting from the index 1. Each reception UE may identify a PSFCH resource usable by itself from PSFCH starting from the index 0 via its group ID (for example, modulo operation described in FIGS. 13D, 20A, and 20B).

In addition, when the mapping principle of FIG. 13C is applied to FIG. 21A, the UEs that received PSCCH or PSSCH from the slot index 1 and the start sub-channel index (or start RB index) 0 via groupcast communication option 2 may transmit PSFCH starting from PSFCH index 1. Each reception UE may receive the number of group members participating in the groupcast communication (G1 reception UEs+1 transmission UE=G1+1) and its group ID from a higher layer. Accordingly, each reception UE may determine that G1 independent PSFCH frequency resources are required for a PSFCH frequency resource set starting from the index 1. Each reception UE may identify a PSFCH resource usable by itself from PSFCH starting from the index 0 via its group ID (for example, modulo operation described in FIGS. 13D, 20A, and 20B).

Similarly, in FIG. 21B, the UE that received PSCCH or PSSCH from the slot index 0 and the start sub-channel index (or start RB index) 0 via groupcast communication option 2 may transmit PSFCH starting from an index n1 (i.e., start PSFCH from offset by n1). Here, the number of reception UEs in the group performing groupcast communication may be G0. As described with reference to FIG. 13D, each reception UE may receive the number of group members participating in the groupcast communication (G0 reception UEs+1 transmission UE=G0+1) and its group ID from a higher layer. Accordingly, each reception UE may determine that G0 independent PSFCH frequency resources are required for a PSFCH frequency resource set starting from the index n1. Each reception UE may identify a PSFCH resource usable by itself from PSFCH starting from the index n1 via its group ID (for example, modulo operation described in FIGS. 13D, 20A, and 20B). When the mapping principle of FIG. 13B is applied to FIG. 21B, the UEs that received PSCCH or PSSCH from the slot index 0 and the start sub-channel index (or start RB index) 1 via groupcast communication option 2 may transmit PSFCH starting from PSFCH index n1+1. Each reception UE may receive the number of group members participating in the groupcast communication (G1 reception UEs+1 transmission UE=G1+1) and its group ID from a higher layer. Accordingly, each reception UE may determine that G1 independent PSFCH frequency resources are required for a PSFCH frequency resource set starting from the index n1+1. Each reception UE may identify a PSFCH resource usable by itself from PSFCH starting from the index 0 via its group ID (for example, modulo operation described in FIGS. 13D, 20A, and 20B). When the mapping principle of FIG. 13C is applied to FIG. 21A, the UEs that received PSCCH or PSSCH from the slot index 1 and the start sub-channel index (or start RB index) 0 via groupcast communication option 2 may transmit PSFCH starting from PSFCH index n1+1. Each reception UE may receive the number of group members participating in the groupcast communication (G1 reception UEs+1 transmission UE=G1+1) and its group ID from a higher layer. Accordingly, each reception UE may determine that G1 independent PSFCH frequency resources are required for a PSFCH frequency resource set starting from the index n1+1. Each reception UE may identify a PSFCH resource usable by itself from PSFCH starting from the index n1+1 via its group ID (for example, modulo operation described in FIGS. 13D, 20A, and 20B).

Meanwhile, it has been mainly described that a method of determining a start index of PSFCH for unicast, groupcast HARQ option 1, and groupcast HARQ option 2 is associated with a slot index where PSSCH is received and/or a sub-channel index (or RB index) where PSSCH is received (or a slot index where PSCCH is received and/or a sub-channel index (or RB index) where PSCCH is received). However, in addition, as described with reference to FIG. 13D, a source ID or destination ID may be used. For example, the start point of PSFCH frequency resource set shown in FIGS. 21A and 21B may be found via the source ID and the index of PSFCH frequency resource usable by each reception UE for PSFCH transmission may be determined from the PSFCH frequency resource set via the association between PSSCH and PSFCH within each PSFCH frequency resource set.

The embodiments of the disclosure of FIGS. 21A and 21B may be used at the same time with the embodiments of the disclosure of FIGS. 20A and 20B. For example, in FIGS. 20A and 20B, it has been described that the slot index of PSSCH and the start index of sub-channel (or the index of start sub-channel) are associated with the start index of frequency and/or code resource of PSFCH or that the slot index of PSSCH and the start index of sub-channel (or the index of start sub-channel) are associated with the start index of frequency and/or code resource candidate set of PSFCH. Here, when defining the association between PSSCH resource and PSFCH resource, a mapping relationship may be defined such that the PSFCH resource (or a resource of PSFCH candidate set) is mapped to portions excluding the unused resource shown in FIGS. 21A and 21B.

Figure 22A:
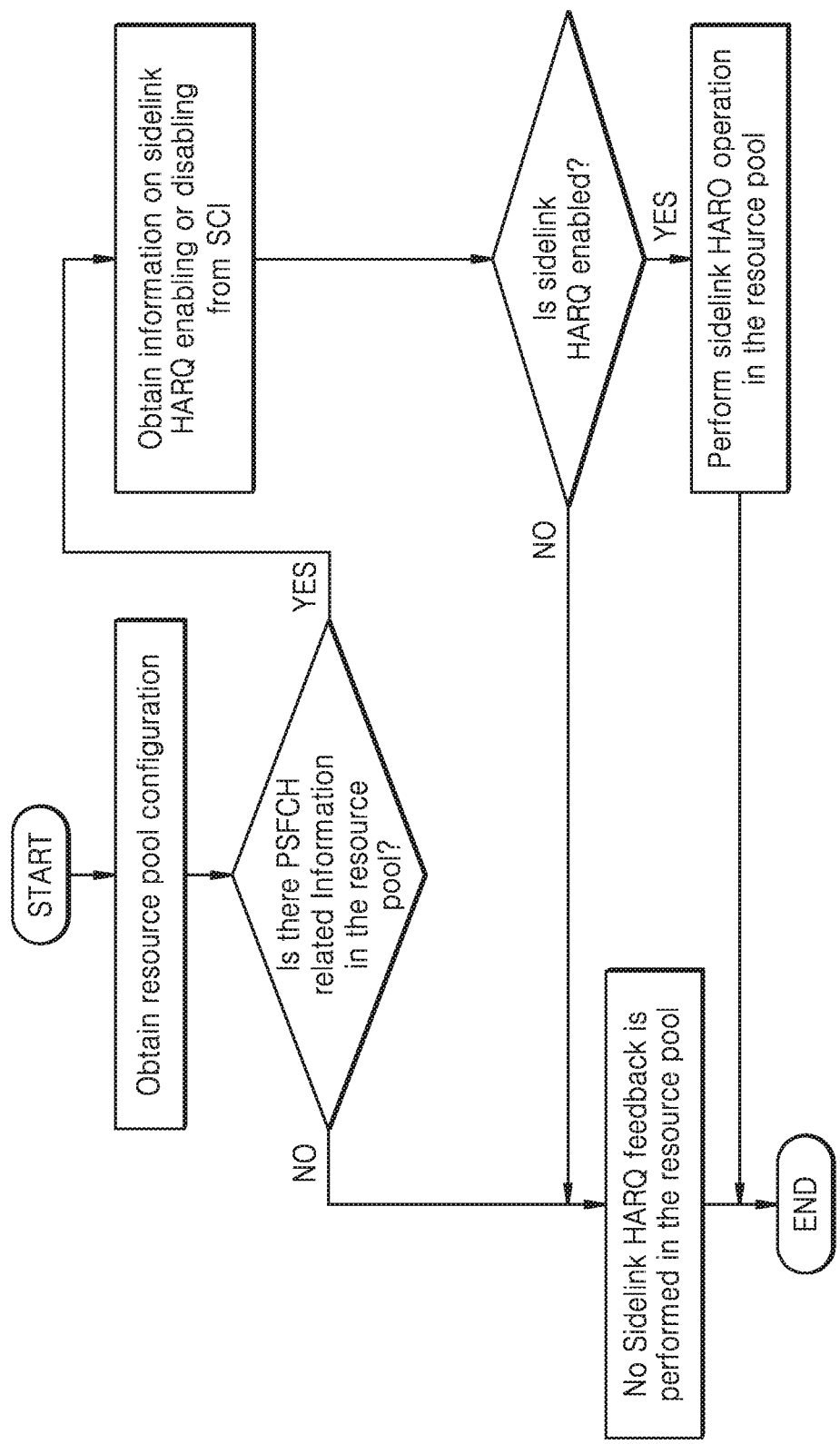
FIG. 22A is a flowchart of an operation of a reception UE for sidelink hybrid automatic request (HARQ) feedback transmission according to an embodiment of the disclosure.
Figure 22B:
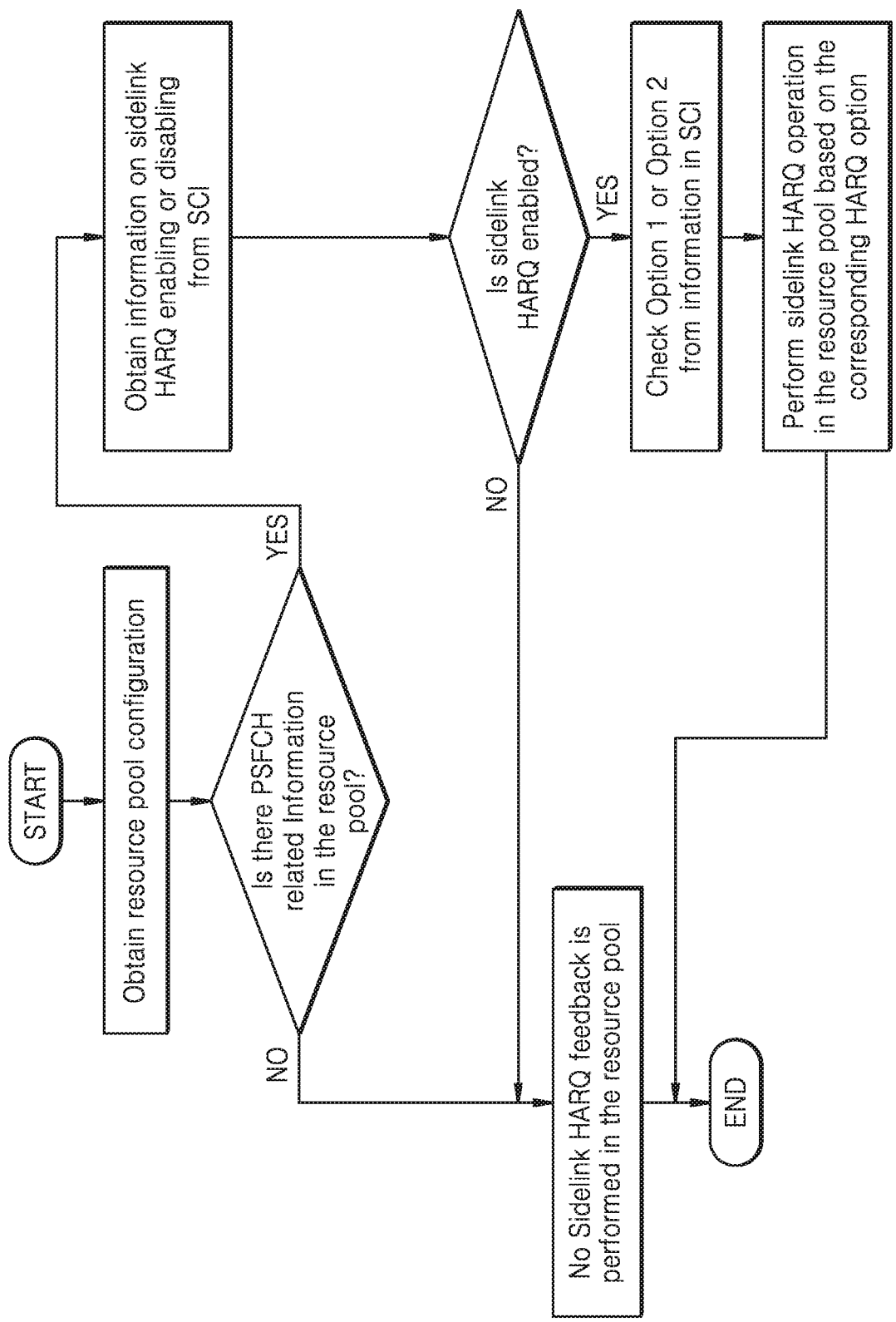
FIG. 22B is a flowchart of an operation of a reception UE for sidelink HARQ feedback transmission according to an embodiment of the disclosure.

FIGS. 22A and 22B are flowcharts of an operation of a reception UE for SL HARQ feedback transmission according to various embodiments of the disclosure. FIG. 22A illustrates an embodiment of the disclosure where unicast is used and FIG. 22B illustrates an embodiment of the disclosure where groupcast is used.

Referring to FIGS. 21A and 21B, UEs using unicast, groupcast (including option 1 and option 2), and broadcast communications in the same resource pool are co-present are illustrated. Here, HARQ feedback may not be operated in broadcast communication. In addition, as described with reference to FIG. 4, operation of HARQ feedback may be enabled or disabled in unicast and groupcast communication. In other words, as described above, the operation of HARQ feedback may be determined according to a cast method (unicast, groupcast, or broadcast), and various HARQ feedback operation methods (option 1 and option 2) may be present in a certain cast method (groupcast). In addition, in some cast methods (unicast or groupcast), the operation of HARQ feedback may be enabled or disabled. Accordingly, when the unicast, groupcast, and broadcast communications share the same resource pool (i.e., when the UEs performing unicast, groupcast, and broadcast communications are co-present in one resource pool), a signaling method for supporting the HARQ feedback operation method and enabling/disabling of HARQ operation may be required. In this regard, at least one of following examples may be considered.

Example 1

Whether to enable or disable SL HARQ operation may be explicitly or implicitly included in resource pool information configured by a gNB via system information or RRC information. In an out-of-coverage environment without a gNB, whether to enable/disable the SL HARQ operation may be explicitly or implicitly included in pre-configured resource pool information. A case in which whether to enable/disable the SL HARQ operation is explicitly configured or pre-configured may indicate that whether to enable or disable the SL HARQ operation is explicitly included in configuration information of the resource pool information via 1 bit, is explicitly included via 'Enable/Disable', or is explicitly included via 'On/Off'. On the other hand, a case in which whether to enable/disable the SL HARQ operation is implicitly configured or pre-configured may indicate that the SL HARQ operation is enabled when the resource pool configuration information includes a parameter related to the SL HARQ operation and is not enabled when the resource pool configuration information does not include the parameter related to the HARQ operation. Accordingly, V2X transmission UE and reception UEs that received the resource pool configuration information may determine whether to enable/disable the SL HARQ operation in the corresponding resource pool.

Meanwhile, as described above with reference to FIGS. 2A and 2B, broadcast communication may indicate that the V2X transmission UE broadcasts SL control information and data information to a plurality of unspecific UEs present around the V2X transmission UE. Accordingly, because the V2X transmission UE and the V2X reception UEs performing broadcast communication are unaware of each other's presence, it may be impossible to operate SL HARQ feedback. Here, when the V2X UEs performing broadcast communication share the resource pool with V2X UEs performing unicast or groupcast communication, i.e., when Example 1 is used, understanding of enabling of SL HARQ operation may be different between a transmission UE and a reception UE.

For example, the transmission UE may transmit SL data via broadcast communication but the reception UE may transmit HARQ feedback to the transmission UE based on enabling configuration information of HARQ operation included in the resource pool configuration information. Because the transmission UE used broadcast communication, the transmission UE does not expect feedback from the reception UE and thus may not receive the HARQ feedback transmitted from the reception UE. Due to such different understanding between the transmission UE and the reception UE, the reception UE unnecessarily transmits PSFCH, and thus power consumption increases and half-duplexing may occur. Here, according to the half-duplexing, in the case of a UE that is unable to perform SL transmission and reception simultaneously (for example, a UE in which an SL transmission RF chain and an SL reception RF chain are not separated), a reception UE may be unable to receive PSFCH from another UE in a corresponding resource pool due to unnecessary PSFCH transmission as described above.

The half-duplexing will now be described below. A case type (unicast, groupcast, or broadcast) may be determined in an application layer and an HARQ operation may be performed in a physical layer and an MAC layer. Accordingly, when data generated in an application layer of a transmission UE is broadcast communication, a physical layer and MAC layer of the transmission UE may determine not to perform an HARQ operation. Accordingly, as in Example 1, even when enabling information of HARQ operation is explicitly or implicitly included in resource pool information received by the transmission UE, the transmission UE may ignore the enabling information. However, a UE that received broadcast data from the transmission UE is unable to identify a cast type until an application layer of the reception UE receives the broadcast data, and thus a physical layer and MAC layer may be unable to identify whether the data is data of a broadcast type. Thus, the reception UE using Example 1 may transmit, to the transmission UE, HARQ feedback based on the enabling information of HARQ operation configured in a resource pool.

Thus, in order to resolve the half-duplexing, the physical layer and MAC layer of the reception UE may require a following method for verifying enabling of the HARQ operation.

Example 2

Referring to FIG. 22A, a transmission UE and a reception UE that are to perform unicast communication may obtain enabling information of SL HARQ operation via resource pool configuration information. Here, when the enabling information of SL HARQ operation is explicitly or implicitly configured in resource pool information for SL transmission, the transmission UE may transmit, to the reception UE, a 1-bit indicator of whether to enable HARQ operation via SCI. For example, '0' may denote disabling of SL HARQ operation and '1' may denote enabling of SL HARQ operation. The reception UE may transmit HARQ feedback to the transmission UE only when the enabling of SL HARQ operation is explicitly or implicitly configured in resource pool information for SL reception and at the same time, the 1-bit indicator of SCI transmitted by the transmission UE indicates enabling of SL HARQ operation. The HARQ feedback may not be transmitted to the transmission UE when the enabling of SL HARQ operation is explicitly or implicitly configured in the resource pool information for SL reception but the 1-bit indicator of SCI transmitted by the transmission UE indicates disabling of SL HARQ operation.

In the Example 2, disabling of the HARQ operation may be configured in the resource pool configuration information and the transmission UE may indicate enabling of the HARQ operation via the 1-bit indicator of SCI. This may indicate that a PSFCH resource for HARQ operation is not present in the resource pool, and thus the reception UE may not transmit the HARQ feedback to the transmission UE by prioritizing the resource pool configuration information. In other words, the reception UE may ignore the enabling of HARQ operation indicated by the 1-bit indicator of SCI transmitted by the transmission UE.

Meanwhile, in groupcast communication, a transmission UE and reception UEs may need to agree on whether to use option 1 or option 2. In this regard, following examples may be considered.

Example 3

HARQ operation information (option 1 or option 2) may be included in resource pool configuration information provided by a gNB via system or RRC signaling or pre-configured resource pool configuration information. Transmission and reception UEs using groupcast communication in a corresponding resource pool may operate one of option 1 and option 2 based on the HARQ operation information configured in the resource pool.

However, a method for the reception UE to identify whether to use option 1 or option 2 in groupcast communication may need to be considered. More particularly, whether to use option 1 or option 2 may be determined in an application layer (or a V2X layer between the application layer and an AS layer, hereinafter, the application layer may also be referred to as the V2X layer), and a physical layer and MAC layer of the transmission UE may receive whether to use option 1 or option 2 from its application layer. For example, the application layer may transmit, to the physical layer via the MAC layer, the number of group members of groupcast communication participated by the transmission UE and group ID information usable by the transmission UE. When such information is not received from the application layer, the MAC layer and physical layer of the transmission UE may operate option 1 because information about the group (i.e., the number of group members and group ID) is not known. Meanwhile, the MAC layer and the physical layer of the transmission UE that received the information about the group may operate option 2. Here, even when the information is provided from the application layer, the MAC layer and the physical layer of the transmission UE may operate option 1 according to a condition. For example, when the number of group members is equal to or greater than a certain value configured (or pre-configured) by a gNB via system information or RRC, the MAC layer and physical layer of the transmission UE may operate option 1. Alternatively, when the number of PSFCH resources is smaller than the number of group members, the MAC layer and physical layer of the transmission UE may operate option 1.

Based on the above examples, because whether to use option 1 or option 2 is determined in the application layer, a physical layer and MAC layer of the reception UE that received SL data from the transmission UE may be unable to verify whether to use option 1 or option 2. Thus, Example 3 may not be suitable like the enabling or disabling of the HARQ operation. In this regard, Example 4 below may be considered.

Example 4

Referring to FIG. 22B, a transmission UE and a reception UE that are to perform groupcast communication may obtain enabling information of SL HARQ operation via resource pool configuration information. Here, like the operation in unicast communication described above, the transmission UE may transmit, to the reception UE, SL HARQ feedback enabling information via SCI. In addition, the transmission UE may transmit, to the reception UE, a 1-bit indicator regarding SL HARQ operation information as below. For example, '0' may denote using of option 1 and '1' may denote using of option 2. The reception UE may transmit, to the transmission UE, HARQ feedback via PSFCH by using option 1 or option 2 according to the 1-bit indicator of SCI transmitted by the transmission UE. In other words, according to the above examples, when SL HARQ operation is explicitly or implicitly enabled in resource pool configuration information, 1-bit information indicating enabling or disabling of HARQ operation may be transmitted via SCI, and when HARQ operation is enabled via SCI, a 1-bit indicator regarding HARQ operation information may be additionally transmitted to the reception UE (i.e., whether to enable HARQ and whether to use HARQ feedback option 1 or option 2 may be indicated via 2 bits). For example, when enabling of HARQ is explicitly or implicitly configured in the resource pool configuration information, the transmission UE that is to perform groupcast communication in a corresponding resource pool may indicate following to the reception UE by using a 2-bit indicator of SCI. For example, '00' may denote that the reception UE does not transmit HARQ feedback. '01' may denote that the reception UE transmits HARQ feedback via groupcast option 1 and '10' may denote that the reception UE transmits HARQ feedback via groupcast option 2.

As described above, a physical layer and MAC layer may be unable to identify unicast, groupcast, and broadcast communication. Accordingly, regardless of unicast, broadcast, and broadcast communication, the number of bits configuring SCI may need to be equally maintained to reduce SCI decoding complexity of the reception UE. Accordingly, the transmission UE that transmits SL control information and data information by using broadcast communication described above may configure '00' for SCI such that the reception UE does not transmit HARQ feedback via PSFCH in a resource pool where HARQ operation is enabled. Upon receiving SCI, the physical layer and MAC layer of the reception UE may not transmit PSFCH according to '00' indicator of SCI even when a cast type is not identified. Similarly, the transmission UE that transmits SL control information and data information by using unicast or groupcast communication may configure '00' for SCI such that the reception UE does not transmit HARQ feedback via PSFCH in the resource pool where HARQ operation is enabled. Upon receiving SCI, the physical layer and MAC layer of the reception UE may not transmit PSFCH according to '00' indicator of SCI even when a cast type is not identified.

Meanwhile, in the examples of groupcast communication described above, it is assumed that enabling and disabling information of SL HARQ operation and SL HARQ operation information (option 1 or option 2) are independently transmitted to SCI via 1-bit indicator. In other words, to transmit the two pieces of information, an indicator configured of 2 bits may be required for SCI, as described above, because the physical layer and MAC layer of the reception UE are unable to identify a cast type, in order to reduce SCI decoding complexity of the reception UE, 2-bit information needs to be included in SCI regardless of the cast type. When the number of bits transmitted via SCI is increased, signaling overhead is increased and channel coding rate is increased, thereby deteriorating coverage performance of SCI. Accordingly, at least one of following methods may be used.

1) When HARQ operation is disabled in resource pool configuration information, a PSFCH resource for SL HARQ operation is not configured, and thus HARQ operation in unicast communication, HARQ option 1 operation in groupcast communication, HARQ option 2 operation in groupcast communication, and HARQ operation in broadcast communication may all be not possible.

2) When HARQ operation is enabled in resource pool configuration information, a PSFCH resource for SL HARQ operation is configured, and thus a transmission UE may indicate whether to operate HARQ via 1-bit of SCI to a reception UE. More particularly, transmission UEs performing unicast, groupcast, and broadcast communication may set an 1-bit indicator of SCI to '0' and transmit the 1-bit indicator to a reception UE when HARQ operation is to be disabled even when HARQ operation is enabled in corresponding resource pool configuration information. Thereafter, even when HARQ operation is enabled in the resource pool configuration information, the reception UE may not transmit HARQ feedback to the transmission UE. When the enabling of SL HARQ operation is configured in the resource pool configuration information and the transmission UE is to operate HARQ in unicast communication or via option 1 or option 2 in groupcast communication, the transmission UE may set the 1-bit indicator of SCI to '1' and transmit the 1-bit indicator to the reception UE. As described above, because the physical layer and MAC layer of the reception UE are unable to identify a cast type, when the 1-bit indicator of SCI is set to '1', the physical layer and MAC layer of the reception UE may be unable to determine whether the 1-bit indicator denotes HARQ feedback operation in unicast or in groupcast.

The HARQ feedback operation may be determined by the reception UE via source ID and/or destination ID included in SCI. For example, the source ID and/or destination ID may be divided into two sets and when the source ID and/or destination ID corresponding to a first set are detected, the physical layer and MAC layer of the reception UE may identify unicast communication from corresponding ID. In addition, when the source ID and/or destination ID corresponding to a second set are detected, the physical layer and MAC layer of the reception UE may identify groupcast communication from corresponding ID. A method of configuring the first and second sets may vary. For example, the transmission UE may set an indicator to '1' and transmit the source ID configured of 8 bits and the destination ID configured of 16 bits to the reception UE via SCI. Here, when the even number of source ID and/or destination ID are detected, the physical layer of the reception UE may determine unicast communication. When the odd number of source ID and/or destination ID are detected, the physical layer of the reception UE may determine groupcast communication. As for another example, the source ID configured of 8 bits and the destination ID configured of 16 bits may be converted into a decimal number and when the source ID and/or destination ID is equal to or greater than a certain threshold value (or greater than the threshold value), the physical layer of the reception UE may determine unicast communication.

The reception UE that identified groupcast communication via the above methods may additionally identify whether the source ID and/or destination ID denote HARQ option 1 or HARQ option 2 in groupcast communication. This may be performed as follows. For example, when SCI includes information about a location of the transmission UE (for example, zone ID or at least one of altitude or latitude of the transmission UE) and a range requirement, the physical layer of the reception UE may determine to perform groupcast HARQ option 1. When the above information is not included in SCI, the physical layer of the reception UE may determine to perform groupcast HARQ option 2.

Figure 23:
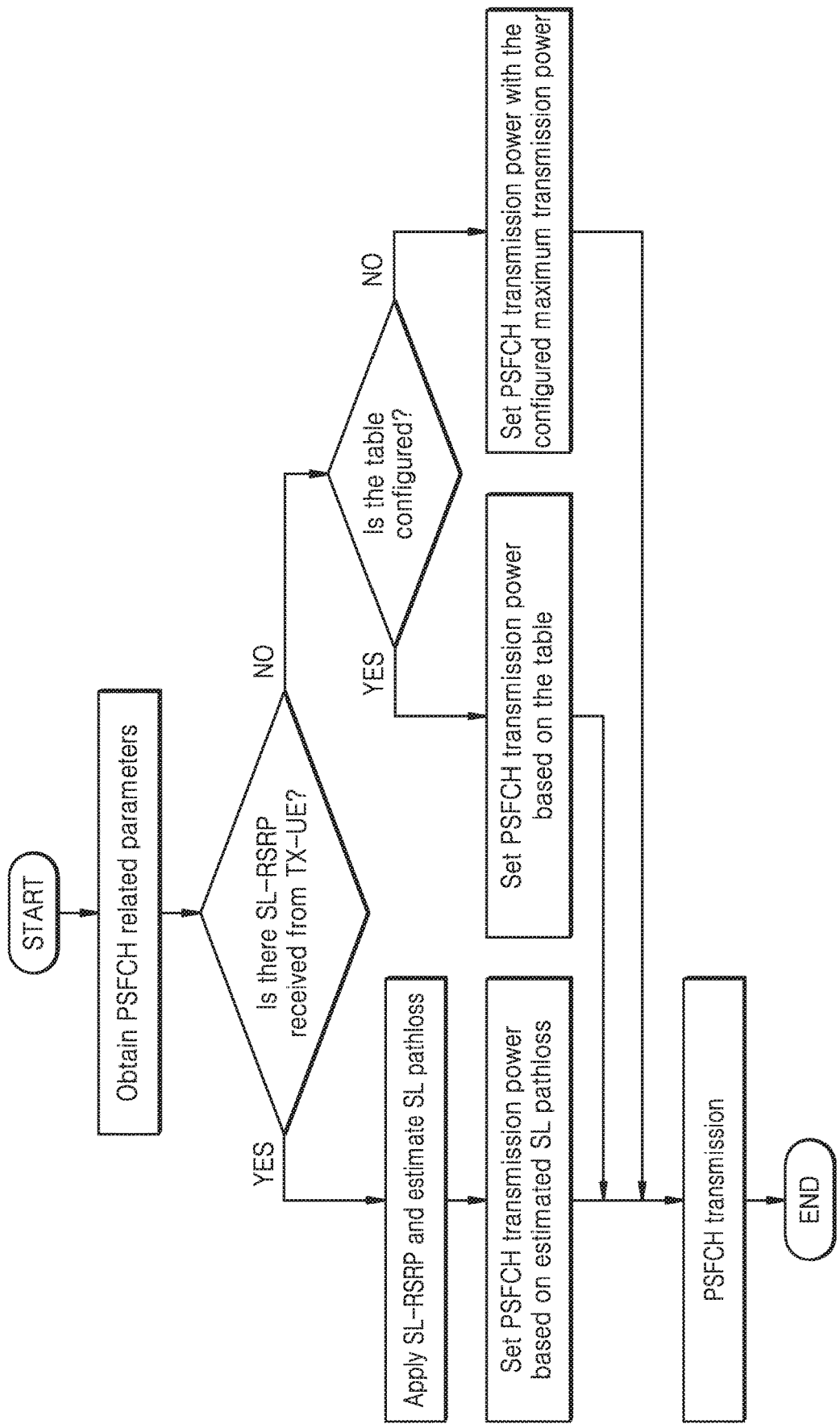
FIG. 23 is a flowchart of a transmission power control method of a sidelink feedback channel according to an embodiment of the disclosure.

FIG. 23 is a flowchart of a transmission power control method of an SL feedback channel according to an embodiment of the disclosure.

Referring to FIG. 23, a V2X transmission UE may perform SL transmission power control for PSCCH and PSSCH transmission. For the SL transmission power control, the V2X transmission UE may transmit an SL reference signal to a V2X reception UE and upon receiving the SL reference signal, the V2X reception UE may measure and report SL RSRP to the V2X transmission UE. Here, the SL RSRP may be measured by the V2X reception UE via CSI-RS or by using DMRS transmitted via an SL control channel or data channel Upon being reported the SL RSRP from the V2X reception UE, the V2X transmission UE may estimate a pathloss value from its transmission power and the reported SL RSRP and perform the SL transmission power control by reflecting the pathloss value.

Similarly, when the V2X reception UE needs to transmit PSFCH to the V2X transmission UE, the SL transmission power control may need to be performed. The SL transmission power control for PSFCH may be performed via at least one of following methods.

Method 1) The V2X reception UE may transmit PSFCH by using configured maximum transmission power. Here, the configured maximum transmission power may be configured by the V2X reception UE based on quality of service (QoS) received by the V2X reception UE from a higher layer or metric (for example, distance information) configured from the higher layer.

Method 2) The V2X reception UE may configure a transmission power value of PSFCH by using DL pathloss with a gNB and SL transmission power control parameters included in PSFCH resource pool configuration information. Here, the DL pathloss value with the gNB may be estimated by the V2X reception UE via secondary synchronization signal (SSS) transmitted by the gNB via DL or estimated by the V2X reception UE via SSS and DMRS of physical broadcast channel (PBCH). A signal through which the V2X reception UE estimates the DL pathloss may be included in resource pool information transmitted by the gNB to a V2X UE via system information or RRC configuration. When the V2X reception UE is present outside coverage of the gNB and thus unable to use the DL pathloss value for PSFCH transmission power control, the V2X reception UE may configure a PSFCH transmission power value by only using another transmission power control parameter without the DL pathloss value. As for another example, when the V2X reception UE is present in the coverage of the gNB, the method 2 may be used and when the V2X reception UE is present outside the coverage of the gNB, the method 1 may be used to configure PSFCH transmission power.

Method 3) The V2X transmission UE may notify the V2X reception UE of a transmission power value used for PSCCH or PSSCH transmission. Here, the V2X transmission UE may transmit information about the transmission power value to the V2X reception UE via SL control information or MAC CE. The V2X reception UE may measure SL RSRP via SL DMRS or SL CSI-RS transmitted from the V2X transmission UE through PSCCH or PSSCH and the transmission power value used for PSCCH or PSSCH transmission from the V2X transmission UE, and estimate an SL pathloss value by using the SL RSRP. The V2X reception UE may configure a transmission power value of PSFCH by using the estimated SL pathloss and SL transmission power parameters included in the PSFCH resource pool configuration information.

Method 4) A mapping relationship may be configured between PSFCH transmission power and an SL RSRP value measured by the V2X reception UE. Such a mapping relationship is shown in Table 2 below, and when the SL RSRP value measured by the V2X reception UE is $-X1$ dBm, the V2X reception UE may use Y1 dBm as PSFCH transmission power. Table 2 below may be pre-configured or configured by the gNB. Two or more mapping tables like Table 2 may be present by power class or QoS (for example, minimum communication range) of V2X UE. In Table 2, SL RSRP and PSFCH transmission power value are in one-to-one mapping relationship, but there may be one-to-many mapping relationship. In other words, two or more SL RSRP values may be mapped to one PSFCH transmission power value. In Table 2, SL RSRP values may have a difference of Z1 dB (that is, an operation size, granularity, or resolution SL RSRP values is Z1 dB). Similarly, PSFCH transmission power values may have a difference of Z2 dB (that is, an operation size, granularity, or resolution of PSFCH transmission power values is Z2 dB). Here, Z1 and Z2 may be the same or different from each other. Table 2 below is a mapping table between SL RSRP and PSFCH transmission power.

TABLE 2

| SL-RSRP | PSFCH transmission power value |
|---------|-------------------------------|
| $-X1$ dBm | Y1 dBm |
| ... | ... |
| $-XN$ dBm | YN dBm |

FIG. 23 is a diagram illustrating a PSFCH transmission power control method based on the examples above. More particularly, a V2X reception UE may obtain information configured by gNB or V2X transmission UE, or pre-configured PSFCH parameters. Here, the information about PSFCH parameters may include at least one of pieces of PSFCH-related information described with reference to FIG. 4. In addition, the information about the PSFCH parameters may include information about PSFCH transmission power in addition to the above information. When the V2X reception UE ever received a report on SL RSRP from the V2X transmission UE (that is, when the V2X reception UE includes SL RSRP information measured by the V2X transmission UE), the V2X reception UE may estimate SL pathloss. The V2X reception UE may configure PSFCH transmission power by using at least one of the estimated pathloss value or the obtained information about the PSFCH parameters. The V2X reception UE may transmit PSFCH to the V2X transmission UE by using the configured PSFCH transmission power value.

When the V2X reception UE never received the report on SL RSRP from the V2X transmission UE (that is, when the V2X reception UE does not include the SL RSRP information measured by the V2X transmission UE), the V2X reception UE may determine whether to configure the mapping table between the SL RSRP value and the PSFCH transmission power value as shown in Table 2. Upon being configured with a table such as Table 2, the V2X reception UE may configure a PSFCH transmission power value by selecting the PSFCH transmission power value mapped to the SL RSRP value measured by itself, and transmit PSFCH to the V2X transmission UE (method 4).

When the V2X reception UE is not configured with a table such as Table 2, the V2X reception UE may configure the PSFCH transmission power value via the method 1 or 2 described above and transmit PSFCH to the V2X transmission UE.

As for another example of FIG. 23, when the V2X reception UE determines that there is no SL RSRP information, the V2X reception UE does not determine whether to configure the table like Table 2, but may configure PSFCH transmission power value via the method 1 or 2 described above and transmit PSFCH to the V2X transmission UE.

As for another example of FIG. 23, the V2X reception UE may not determine the presence of SL RSRP information but may directly determine whether to configure the table like Table 2. When the table like Table 2 is configured, the V2X reception UE may configure a PSFCH transmission power value by selecting the PSFCH transmission power value mapped to the SL RSRP value measured by itself, and transmit PSFCH to the V2X transmission UE (method 4). When the V2X reception UE is not configured with the table like Table 2, the V2X reception UE may configure the PSFCH transmission power value via the method 1 or 2 described above and transmit PSFCH to the V2X transmission UE.

Figure 24:
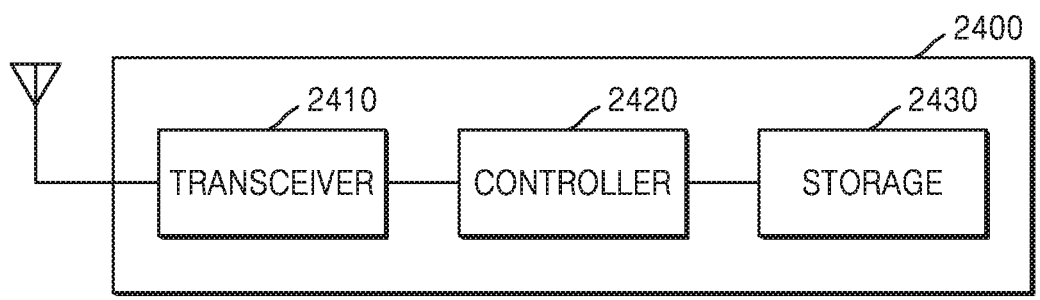
FIG. 24 is a block diagram illustrating internal structure of a transmission UE according to an embodiment of the disclosure.

FIG. 24 is a block diagram illustrating an internal structure of a transmission UE according to an embodiment of the disclosure.

Referring to FIG. 24, a transmission UE 2400 may include a transceiver 2410, a controller 2420, and a memory 2430. According to an embodiment of the disclosure, the memory 2430 may also be referred to as a storage 2430. However, the components of the transmission UE 2400 are not limited thereto. For example, the transmission UE 2400 may be implemented by more or fewer components than those described above. In addition, the transceiver 2410, controller 2420, and the memory 2430 may be implemented as a single chip.

According to an embodiment of the disclosure, the transceiver 2410 may transmit and receive a signal to and from a gNB or another UE. The signal may include synchronization signal, a reference signal, control information, and data. In this regard, the transceiver 2410 may include a RF transmitter for up-converting and amplifying a frequency of a transmitted signal, and a RF receiver for amplifying low-noise and down-converting a frequency of a received signal. In addition, the transceiver 2410 may receive and output, to the controller 2420, a signal through a wireless channel, and transmit a signal output from the controller 2420 through the wireless channel.

According to an embodiment of the disclosure, the memory 2430 may store a program and data required for operations of the transmission UE 2400. In addition, the memory 2430 may store control information or data included in a signal transmitted and received by the transmission UE 2400. The memory 2430 may be a storage medium, such as read-only memory (ROM), random access memory (RAM), a hard disk, a compact disc-ROM (CD-ROM), and a digital versatile disc (DVD), or a combination of storage media. In addition, the memory 2430 may be configured in a plurality of memories.

According to an embodiment of the disclosure, the controller 2420 may control a series of processes for the transmission UE 2400 to operate according to an embodiment of the disclosure. The controller 2420 may include at least one processor. The controller 2420 may include a plurality of processors and may execute the program stored in the memory 2430 to control a resource allocation method of a feedback channel according to embodiments of the disclosure and respective transmission and reception of SL feedback channels between UEs.

Figure 25:
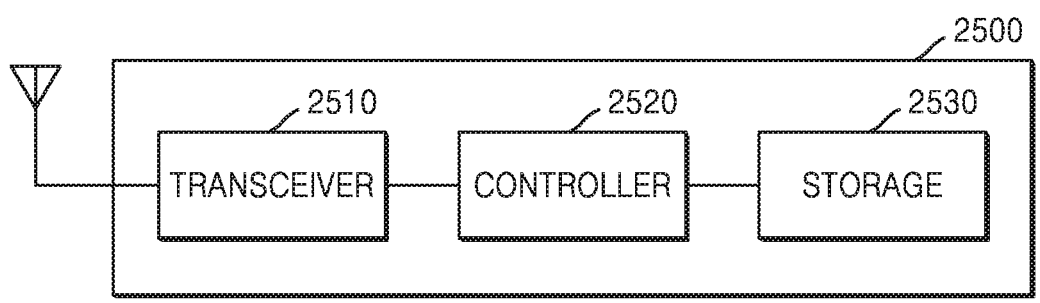
FIG. 25 is a block diagram illustrating internal structure of a reception UE according to an embodiment of the disclosure.

FIG. 25 is a block diagram illustrating an internal structure of a reception UE according to an embodiment of the disclosure.

Referring to FIG. 25, a reception UE 2500 may include a transceiver 2510, a controller 2520, and a storage 2530. However, the components of the reception UE 2500 are not limited thereto. For example, the reception UE 2500 may be implemented by more or fewer components than those described above. In addition, the transceiver 2510, controller 2520, and the storage 2530 may be implemented as a single chip.

According to an embodiment of the disclosure, the transceiver 2510 may transmit and receive a signal to and from a gNB or another UE. The signal may include synchronization signal, a reference signal, control information, and data. In this regard, the transceiver 2510 may include a RF transmitter for up-converting and amplifying a frequency of a transmitted signal, and a RF receiver for amplifying low-noise and down-converting a frequency of a received signal. In addition, the transceiver 2510 may receive and output, to the controller 2520, a signal through a wireless channel, and transmit a signal output from the controller 2520 through the wireless channel.

According to an embodiment of the disclosure, the storage 2530 may store a program and data required for operations of the reception UE 2500. In addition, the storage 2530 may store control information or data included in a signal transmitted and received by the reception UE 2500. The storage 1530 may be configured in a storage medium, such as ROM, RAM, a hard disk, CD-ROM, or DVD, or a combination thereof. In addition, the storage 2530 may be configured in a plurality of memories.

According to an embodiment of the disclosure, the controller 2520 may control a series of processes for the reception UE 2500 to operate according to an embodiment of the disclosure. The controller 2520 may include at least one processor. The controller 2520 may include a plurality of processors and may execute the program stored in the storage 2530 to control a resource allocation method of a feedback channel according to embodiments of the disclosure and respective transmission and reception of SL feedback channels between UEs.

Figure 26:
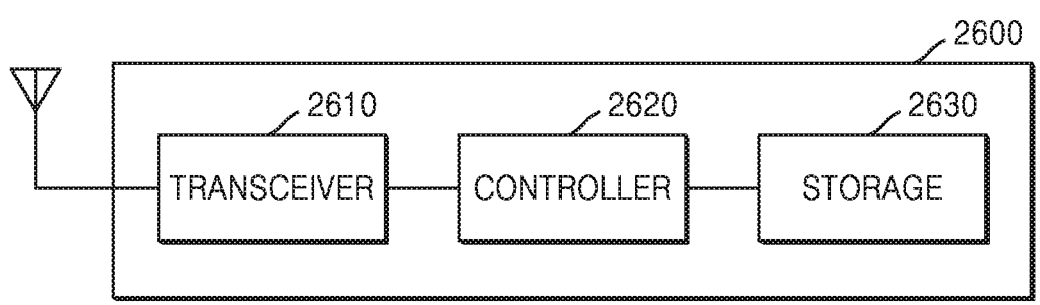
FIG. 26 is a block diagram illustrating internal structure of a gNodeB (gNB) according to an embodiment of the disclosure.

FIG. 26 is a block diagram illustrating an internal structure of a gNB according to an embodiment of the disclosure.

Referring to FIG. 26, a gNB 2600 may include a transceiver 2610, a controller 2620, and a storage 2630. However, the components of the gNB 2600 are not limited thereto. For example, the gNB 2600 may be implemented by more or fewer components than those described above. In addition, the transceiver 2610, controller 2620, and the storage 2630 may be implemented as a single chip.

According to an embodiment of the disclosure, the transceiver 2610 may transmit and receive a signal to and from a gNB or another UE. The signal may include synchronization signal, a reference signal, control information, and data. In this regard, the transceiver 2610 may include a RF transmitter for up-converting and amplifying a frequency of a transmitted signal, and a RF receiver for amplifying low-noise and down-converting a frequency of a received signal. In addition, the transceiver 2610 may receive and output, to the controller 2620, a signal through a wireless channel, and transmit a signal output from the controller 2620 through the wireless channel.

According to an embodiment of the disclosure, the storage 2630 may store a program and data required for operations of the gNB 2600. In addition, the storage 2630 may store control information or data included in a signal transmitted and received by the gNB 2600. The storage 2630 may be configured in a storage medium, such as ROM, RAM, a hard disk, CD-ROM, or DVD, or a combination thereof. In addition, the storage 2630 may be configured in a plurality of memories.

According to an embodiment of the disclosure, the controller 2620 may control a series of processes for the gNB 2600 to operate according to an embodiment of the disclosure. The controller 2620 may include at least one processor. The controller 2620 may include a plurality of processors and may execute the program stored in the storage 2630 to control a resource allocation method of a feedback channel according to embodiments of the disclosure and respective transmission and reception of SL feedback channels between UEs.

The methods according to the embodiments of the disclosure described in the claims or the detailed description of the disclosure may be implemented in hardware, software, or a combination of hardware and software.

When the methods are implemented in software, a computer-readable recording medium or computer program product having one or more programs (software modules) recorded thereon may be provided. The one or more programs recorded on the computer-readable recording medium or computer program product are configured to be executable by one or more processors in a device. The one or more programs include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

The embodiments of the disclosure provide an apparatus and method for effectively providing a service in a mobile communication system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal operating in a wireless communication system, the method comprising:
   acquiring sidelink resource pool information including physical sidelink feedback channel (PSFCH) configuration information;
   receiving, from another terminal, a physical sidelink shared channel (PSSCH);
   identifying, based on a preset mapping rule, a PSFCH frequency resource mapped on the received PSSCH, among PSFCH frequency resources, using the PSFCH configuration information; and
   reporting, to the other terminal, hybrid automatic request (HARQ) feedback information corresponding to the receiving of the PSSCH, based on the PSFCH frequency resource,
   wherein the preset mapping rule is that slot indexes on a first frequency of PSSCH resources pool are mapped to the PSFCH frequency resources from a start index of the PSFCH frequency resources, and slot indexes on a next frequency resource of the PSSCH resources pool are sequentially mapped to the PSFCH frequency resources.

2. The method of claim 1,
   wherein the PSFCH configuration information comprises at least one of information on duration from when the terminal receives the PSSCH from the other terminal to when the terminal reports the HARQ feedback information, information on a set of frequency resources for PSFCH in which the HARQ feedback information is reported, or information on a period of resources for transmission of the PSFCH,
   wherein the duration is in units of slots, and
   wherein the period is in units of slots.

3. The method of claim 1, wherein the reporting of the HARQ feedback information comprises:
   identifying at least one PSFCH frequency resource among frequency resources for the PSFCH, based on a modulo operation between a configured value or pre-configured value, and at least one identity (ID); and
   reporting, to the other terminal, the HARQ feedback information, based on the identified at least one PSFCH frequency resource.

4. The method of claim 1, wherein the reporting of the HARQ feedback information comprises:
   receiving, from the other terminal, sidelink control information (SCI) corresponding to the PSSCH including an indicator indicating whether to report the HARQ feedback information corresponding to the receiving of the PSSCH; and
   reporting, to the other terminal, the HARQ feedback information based on the indicator.

5. The method of claim 1, wherein the reporting of the HARQ feedback information comprises:
   receiving, from the other terminal, sidelink control information (SCI) corresponding to the PSSCH including an indicator indicating whether an HARQ feedback operation option 1 corresponding to the receiving of the PSSCH or an HARQ feedback operation option 2 corresponding to the receiving of the PSSCH is used; and reporting, to the other terminal, the HARQ feedback information based on the indicator.

6. The method of claim 1, wherein the reporting of the HARQ feedback information comprises:

reporting, to the other terminal, only a non-acknowledgement (NACK) signal based on a zone identity (ID) of the other terminal and information for a communication range requirement included in sidelink control information (SCI) corresponding to the PSSCH.

7. The method of claim 3, wherein the at least one ID is determined based on at least one of a source ID of the other terminal obtained from the PSSCH or an ID of the terminal indicated by a higher layer, and wherein the configured value or the pre-configured value are determined at least based on one or more frequency resources determined by at least a set of frequency resources for the PSFCH in which the HARQ feedback information is reported, and cyclic shift information associated with the PSFCH.

8. The method of claim 5, wherein the reporting, to the other terminal, the HARQ feedback information based on the indicator comprises:

when the indicator indicates that the HARQ feedback operation option 1 is used, reporting only a non-acknowledgement (NACK) signal to the other terminal; and when the indicator indicates that the HARQ feedback operation option 2 is used, reporting an acknowledgement (ACK) signal or an NACK signal.

9. A terminal in a wireless communication system, the terminal comprising:

a transceiver; and at least one processor configured to:
acquire sidelink resource pool information including physical sidelink feedback channel (PSFCH) configuration information,
receive, via the transceiver from another terminal, a physical sidelink shared channel (PSSCH),
identify, based on a preset mapping rule, a PSFCH frequency resource mapped on the received PSSCH, among PSFCH frequency resources, using the PSFCH configuration information, and
report, via the transceiver to the other terminal, hybrid automatic request (HARQ) feedback information corresponding to the receiving of the PSSCH, based on the PSFCH frequency resource, wherein the preset mapping rule is that slot indexes on a first frequency of PSSCH resources pool are mapped to the PSFCH frequency resources from a start index of the PSFCH frequency resources, and slot indexes on a next frequency resource of the PSSCH resources pool are sequentially mapped to the PSFCH frequency resources.

10. The terminal of claim 9, wherein the PSFCH configuration information comprises at least one of information on duration from when the terminal receives the PSSCH from the other terminal to when the terminal reports the HARQ feedback information, information on a set of frequency resources for PSFCH in which the HARQ feedback information is reported, or information on a period of resources for transmission of the PSFCH, wherein the duration is in units of slots, and wherein the period is in units of slots.

11. The terminal of claim 9, wherein the at least one processor is further configured to:

identify at least one PSFCH frequency resource among frequency resources for the PSFCH, based on a modulo operation between a configured value or pre-configured value, and at least one identity (ID), and report, via the transceiver to the other terminal, the HARQ feedback information, based on the identified at least one PSFCH frequency resource.

12. The terminal of claim 9, wherein the at least one processor is further configured to:

receive, via the transceiver from the other terminal, sidelink control information (SCI) corresponding to the PSSCH including an indicator indicating whether to report the HARQ feedback information corresponding to the receiving of the PSSCH, and report, via the transceiver to the other terminal, the HARQ feedback information based on the indicator.

13. The terminal of claim 9, wherein the at least one processor is further configured to:

receive, via the transceiver from the other terminal, sidelink control information (SCI) corresponding to the PSSCH including an indicator indicating whether an HARQ feedback operation option 1 corresponding to the receiving of the PSSCH or an HARQ feedback operation option 2 corresponding to the receiving of the PSSCH is used, and report, via the transceiver to the other terminal, the HARQ feedback information based on the indicator.

14. The terminal of claim 9, wherein the at least one processor is further configured to:

report, via the transceiver to the other terminal, only a non-acknowledgement (NACK) signal based on a zone identity (ID) of the other terminal and information for a communication range requirement included in sidelink control information (SCI) corresponding to the PSSCH.

15. The terminal of claim 11, wherein the at least one ID is determined based on at least one of a source ID of the other terminal obtained from the PSSCH or an ID of the terminal indicated by a higher layer, and wherein the configured value or the pre-configured value are determined at least based on one or more frequency resources determined by at least a set of frequency resources for the PSFCH in which the HARQ feedback information is reported, and cyclic shift information associated with the PSFCH.

16. The terminal of claim 13, wherein the at least one processor is further configured to:

when the indicator indicates that the HARQ feedback operation option 1 is used, report only a non-acknowledgement (NACK) signal to the other terminal, and when the indicator indicates that the HARQ feedback operation option 2 is used, report an acknowledgement (ACK) signal or an NACK signal.

* * * * *